US012116146B2

United States Patent
Palombini et al.

(10) Patent No.: US 12,116,146 B2
(45) Date of Patent: *Oct. 15, 2024

(54) SYSTEM FOR THERMAL MANAGEMENT GROUND SERVICE EQUIPMENT AND A METHOD OF USE

(71) Applicant: BETA AIR, LLC, South Burlington, VT (US)

(72) Inventors: John Charles Palombini, South Burlington, VT (US); Jake Pill, South Burlington, VT (US)

(73) Assignee: BETA Air, LLC, South Burlington, VT (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/121,788

(22) Filed: Mar. 15, 2023

(65) Prior Publication Data
US 2024/0308691 A1    Sep. 19, 2024

(51) Int. Cl.
| | |
|---|---|
| *B64F 5/40* | (2017.01) |
| *B64D 27/24* | (2006.01) |
| *B64D 33/08* | (2006.01) |
| *B60L 58/26* | (2019.01) |
| *B60L 58/32* | (2019.01) |

(Continued)

(52) U.S. Cl.
CPC ............... *B64F 5/40* (2017.01); *B64D 27/24* (2013.01); *B64D 33/08* (2013.01); *B60L 58/26* (2019.02); *B60L 58/32* (2019.02); *B60L 58/33* (2019.02); *B60L 58/34* (2019.02); *B60L 2240/545* (2013.01)

(58) Field of Classification Search
CPC . B64F 5/40; B64D 27/24; B60L 58/26; B60L 58/32; B60L 58/33; B60L 58/34; B60L 2240/545
USPC ............................................................ 62/77
See application file for complete search history.

(56) References Cited

U.S. PATENT DOCUMENTS

| | | | |
|---|---|---|---|
| 6,186,254 B1 * | 2/2001 | Mufford ............ | H01M 8/04723 |
| | | | 429/465 |
| 10,727,551 B2 * | 7/2020 | Muniz ................... | H01M 10/46 |

(Continued)

FOREIGN PATENT DOCUMENTS

WO    2021/062305 A1    4/2021

*Primary Examiner* — Joel M Attey
(74) *Attorney, Agent, or Firm* — Hoffman Warnick LLC

(57) ABSTRACT

A system for thermal management ground service equipment and a method of use is disclosed. The system may include ground service equipment, wherein the ground service equipment may be configured to manage a temperature of a power source of an electric aircraft. The ground service equipment may include a coolant source, wherein the coolant source may include a reservoir containing a coolant. The ground service equipment may include a coolant heating system, wherein the coolant heating system may be configured to increase thermal energy of the coolant. The coolant heating system may include an electric resistance heating element. The system may include a controller communicatively connected to the ground service equipment, wherein the controller may be configured to receive an optimal temperature of the coolant and control the electric resistance heating element of the coolant heating system to increase the thermal energy of the coolant to the optimal temperature.

19 Claims, 14 Drawing Sheets

(51) Int. Cl.
*B60L 58/33* (2019.01)
*B60L 58/34* (2019.01)

(56) References Cited

U.S. PATENT DOCUMENTS

| | | | | |
|---|---|---|---|---|
| 11,479,146 | B2 | 10/2022 | Mllanueva | |
| 11,993,397 | B1* | 5/2024 | Palombini | B60L 58/26 |
| 2014/0035513 | A1* | 2/2014 | Kroenke | B60L 58/21 |
| | | | | 320/152 |
| 2015/0054460 | A1* | 2/2015 | Epstein | B60L 58/27 |
| | | | | 320/109 |
| 2021/0104935 | A1* | 4/2021 | Morrison | H02K 9/227 |
| 2023/0015559 | A1* | 1/2023 | Villanueva | B64C 39/024 |
| 2023/0130832 | A1* | 4/2023 | Dunn | H02J 7/0048 |
| | | | | 320/109 |
| 2023/0182535 | A1* | 6/2023 | Shey | B60H 1/00885 |
| | | | | 62/160 |

\* cited by examiner

SYSTEM FOR THERMAL MANAGEMENT GROUND SERVICE EQUIPMENT AND A METHOD OF USE

FIELD OF THE INVENTION

The present invention generally relates to the field of electric aircraft. In particular, the present invention is directed to a system for thermal management ground service equipment and a method of use.

BACKGROUND

Electric vehicles present a great promise for the future. Specifically, electric aircraft will allow human flight to be performed without need to burn fossil fuels. Flight preparations for the electric aircraft are vital for optimizing safe and efficient operation. Such preparations can require a multitude of complex operations. Existing solutions are not sufficient.

SUMMARY OF THE DISCLOSURE

In an aspect, a system for thermal management ground service equipment is disclosed. The system may include ground service equipment, wherein the ground service equipment may be configured to manage a temperature of a power source of an electric aircraft. The ground service equipment may include a coolant source, wherein the coolant source may include a reservoir containing a coolant. The ground service equipment may include a coolant heating system, wherein the coolant heating system may be configured to increase thermal energy of the coolant. The coolant heating system may include an electric resistance heating element. The system may include a controller communicatively connected to the ground service equipment, wherein the controller may be configured to receive an optimal temperature of the coolant, and control the electric resistance heating element of the coolant heating system to increase the thermal energy of the coolant to the optimal temperature control the coolant heating system.

In another aspect, a method for controlling thermal energy of a coolant is disclosed. The method may include receiving, using a controller and a user input device of ground service equipment, a user input from a user, wherein the user input comprises an optimal temperature of a power source of an electric aircraft, activating, using the controller, a coolant heating system of the ground service equipment, wherein the coolant heating system comprises an electric resistance heating element, and heating, using the electric resistance heating element of the coolant heating system, a coolant to the optimal temperature of the power source of the electric aircraft. These and other aspects and features of non-limiting embodiments of the present invention will become apparent to those skilled in the art upon review of the following description of specific non-limiting embodiments of the invention in conjunction with the accompanying drawings.

BRIEF DESCRIPTION OF THE DRAWINGS

For the purpose of illustrating the invention, the drawings show aspects of one or more embodiments of the invention. However, it should be understood that the present invention is not limited to the precise arrangements and instrumentalities shown in the drawings, wherein.

The drawings are not necessarily to scale and may be illustrated by phantom lines, diagrammatic representations and fragmentary views. In certain instances, details that are not necessary for an understanding of the embodiments or that render other details difficult to perceive may have been omitted.

DETAILED DESCRIPTION

At a high level, aspects of the present disclosure are directed to a system for thermal management ground service equipment and a method of use. The system may include ground service equipment, wherein the ground service equipment may be configured to manage a temperature of a power source of an electric aircraft. The ground service equipment may include a coolant source, wherein the coolant source may include a reservoir containing coolant. The ground service equipment may include a coolant heating system, wherein the coolant heating system may be configured to increase thermal energy of the coolant. The coolant heating system may include an electric resistance heating element. The system may include a controller communicatively connected to the ground service equipment, wherein the controller may be configured to receive an optimal temperature of the coolant, and control the electric resistance heating element of the coolant heating system to increase the thermal energy of the coolant to the optimal temperature control the coolant heating system.

Figure 1:
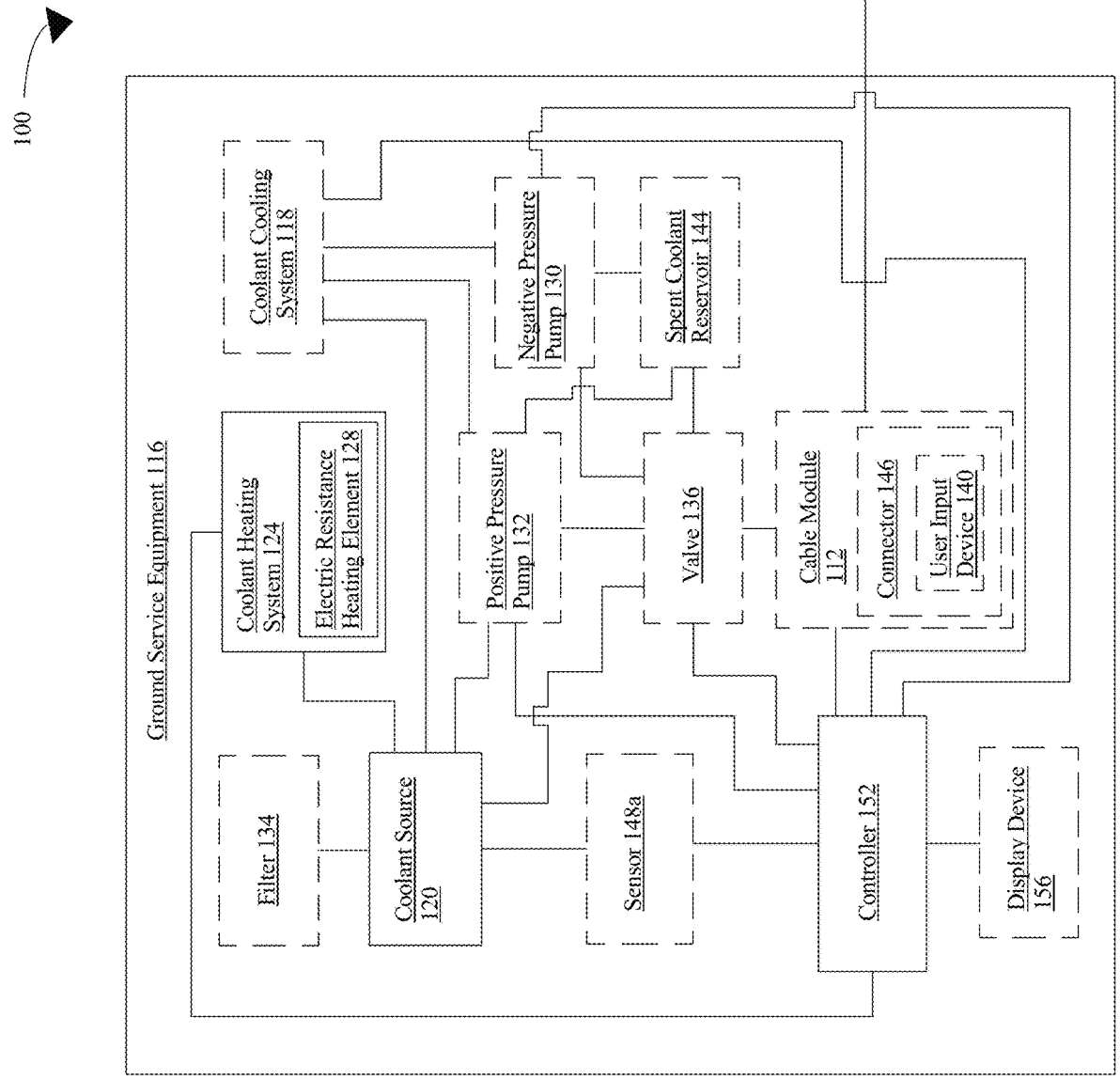
FIG. 1 is an exemplary embodiment of a system for thermal management ground service equipment.

Referring now to FIG. 1, an exemplary embodiment of a system 100 for thermal management ground service equipment is illustrated. In some embodiments, the system 100 may be used to service any electric vehicles on the ground. For the purposes of this disclosure, an "electric vehicle" is any electrically power means of human transport. As a non-limiting example, the electric vehicle may include an electric aircraft, electric motorcycle, electric watercraft, electric car, and the like. For the purposes of this disclosure, an "electric aircraft" is an electrically powered aircraft. Electric aircraft 104 may be capable of rotor-based cruising flight, rotor-based takeoff, rotor-based landing, fixed-wing cruising flight, airplane-style takeoff, airplane-style landing, and/or any combination thereof. "Rotor-based flight," as described in this disclosure, is where the aircraft generated lift and propulsion by way of one or more powered rotors coupled with an engine, such as a quadcopter, multi-rotor helicopter, or other vehicle that maintains its lift primarily using downward thrusting propulsors. "Fixed-wing flight," as described in this disclosure, is where the aircraft is capable of flight using wings and/or foils that generate lift caused by the aircraft's forward airspeed and the shape of the wings and/or foils, such as airplane-style flight. In an embodiment, electric aircraft 104 may include electric vertical takeoff and landing (eVTOL) aircraft. A "vertical take-off and landing aircraft," as used in this disclosure, is an aircraft that can hover, take off, and land vertically. In another embodiment, an electric aircraft 104 may include an electric conventional takeoff and landing (eCTOL) aircraft. For the purposes of this disclosure, a "conventional take-off and landing aircraft" is an aircraft taking off and landing horizontally from a conventional length runway in the distance. In another embodiment, an electric aircraft 104 may include an electric short takeoff and landing (eSTOL) aircraft. For the purposes of this disclosure, a "short takeoff and landing aircraft" is an aircraft that needs a shorter minimum horizontal distance to accelerate in order to ascend into the air than typical fixed wing types of aircrafts. In some embodiments, an electric aircraft 104 may include a sensor. The sensor disclosed herein may be consistent with a sensor disclosed below. Additionally, the electric aircraft 104 disclosed herein is further described in detail in FIG. 9.

With continued reference to FIG. 1, in some embodiments, an electric aircraft 104 may include a power source 108. As used in this disclosure, a "power source" is an electrical device and/or component used to store and provide electrical energy to an electrical vehicle and its electrical subsystems. As a non-limiting example, the power source 108 may include one or more battery cells, one or more battery modules, and/or one or more battery packs configured to provide electrical power to an electric aircraft 104 and/or an aircraft electrical subsystem. For the purposes of this disclosure, a "battery pack" is a set of battery modules. For the purposes of this disclosure, a "battery module" is a set of battery cells. For the purposes of this disclosure, a "battery cell" is a single anode and cathode separated by electrolyte, wherein the cell produces voltage and current. In some embodiments, a power source 108 may be one or more various types of batteries, such as a pouch cell battery, stack batteries, prismatic battery, lithium-ion cells, or the like. In some embodiments, the power source 108 may include a battery, flywheel, rechargeable battery, flow battery, glass battery, lithium-ion battery, ultra-battery, and the like thereof. In some embodiments, the power source 108 may include a thermal conduit, wherein the thermal conduit may provide a coolant flow in the power source 108. The thermal conduit disclosed herein is further described in detail with respect to FIGS. 3-8. The power source 108 disclosed herein may be further described with respect to FIGS. 2, 3, 5 and 6. Additionally without limitation, the power source 108 disclosed herein may be consistent with a power source found in U.S. patent application Ser. No. 17/574,978, filed on Jan. 13, 2022, and entitled "APPARATUSES AND METHODS FOR PRECONDITIONING A POWER SOURCE OF AN ELECTRIC AIRCRAFT," which is incorporated in its entirety herein by reference.

With continued reference to FIG. 1, in some embodiments, an electric aircraft 104 may include a port 110. For the purposes of this disclosure, a "port" is an interface that mates with a mating component and transmits and/or receives a signal on a computing device. "Mate," as used in this disclosure, is an action of attaching two or more components together. Mating may be performed using a mechanical or electromechanical means described in this disclosure. For example, without limitation mating may include an electromechanical device used to join electrical conductors and create an electrical circuit. In some cases, mating may be performed by way of gendered mating components. A gendered mate may include a male component or plug which is inserted within a female component or socket. In some cases, mating may be removable. In some cases, mating may be permanent. In some cases, mating may be removable, but requires a specialized tool or key for removal. Mating may be achieved by way of one or more of plug and socket mates, pogo pin contact, crown spring mates, and the like. In some cases, mating may be keyed to ensure proper alignment of a mating component. In some cases, mate may be lockable. As used in this disclosure, a "mating component" is a component that mates with at least another component. As a non-limiting example, a mating component may include a cable module 112. In some embodiments, a port 110 may be configured to mate with a cable module 112. The cable module 112 disclosed herein is further described below. As a non-limiting example, a port 110 may include a female component having a receptive form, receptive to a male component, a cable module 112. Alternatively or additionally, a port 110 may include a male component having a penetrative form that may include one or more plug pins, that may be protruding pins, that mates with a socket, a female component of a cable module 112.

With continued reference to FIG. 1, in some embodiments, a system 100 includes ground service equipment 116. For the purposes of this disclosure, "ground service equipment," also called "GSE" is a service equipment that supports an operation of an electric vehicle whilst on the ground. The ground service equipment 116 may support any electric vehicle disclosed herein. In some embodiments, the ground service equipment 116 may be connected to the electric vehicle 104 during a support. As a non-limiting example, the ground service equipment 116 may be connected to the electric aircraft 104 using a cable module 112, wherein the cable module is further described below. In some embodiments, ground service equipment 116 is configured to manage temperature of a power source 108 of an electric aircraft 104. For the purposes of this disclosure, "temperature" is a measure of the heat energy of a system. Temperature may be measured in Fahrenheit (° F.), Celsius (C.), Kelvin (° K), or another scale alone or in combination. Additionally without limitation, the ground service equipment 116 disclosed herein may be consistent with ground support equipment found in U.S. patent application Ser. No. 18/120,257, filed on Mar. 10, 2023, and entitled "A SYSTEM AND A METHOD FOR PRECONDITIONING A POWER SOURCE OF AN ELECTRIC AIRCRAFT," which is incorporated in its entirety herein by reference.

With continued reference to FIG. 1, in an embodiment, ground service equipment 116 may be configured to manage temperature of the power source 108 while charging an electric aircraft 104. For the purposes of this disclosure, "charging" refers to a process of increasing energy stored within a power source. As a non-limiting example, the power source 108 may include at least a battery and charging may include providing an electrical current to the at least a battery. In some embodiments, the ground service equipment 116 may be configured to heat the power source 108 while charging the electric aircraft 104. For the purposes of this disclosure, "heating" refers to a process of increasing thermal energy of a system. For the purposes of this disclosure, "thermal energy" refers to the energy contained within a system that is responsible for its temperature. In some embodiments, the ground service equipment 116 may be configured to cool the power source 108 while charging the electric aircraft 116. For the purposes of this disclosure, "cooling" refers to a process of removing thermal energy from a system. As a non-limiting example, the power source 108 may get heated while charging the power source 108, then the ground service equipment 116 may be configured to cool the power source 108 using a coolant. The coolant disclosed herein is further disclosed below.

With continued reference to FIG. 1, in another embodiment, ground service equipment 116 may be configured to manage temperature of the power source 108 while preconditioning the electric aircraft 104. For the purposes of this disclosure, "preconditioning" is a set of operations to intensify one or more electrical subsystems of an electric aircraft to prepare it for an operation. Preconditioning may include a set of operations to modify a temperature of component of an electric aircraft 104, wherein modifying includes preheating, and/or precooling. For the purposes of this disclosure, "preheating" refers to a process of heating a power source beforehand to prepare the power source to be used. This is so, at least in part to set the temperature of the power source 108 at the optimal temperature to its best operating temperature. Additionally or alternatively, this is so, at least in part to set the temperature of the power source 108 at an optimal temperature to prepare for the next process of a supporting an operation of an electric aircraft 104. For the purposes of this disclosure, an "optimal temperature" is a range of temperature at which a power source functions its best. When the power source 108 at a temperature off from the optimal temperature gets charged, the power source 108 may be damaged or lose its efficiency. As a non-limiting example, this is so, at least in part to set the temperature of the power source 108 at the optimal temperature to receive charging at a higher rate, resulting in an overall faster recharge time. As another non-limiting example, when the power source 108 at a temperature off from the optimal temperature gets charged, the power source 108 may be permanently damaged. For the purposes of this disclosure, "precooling" refers to a process of cooling a power source beforehand to prepare the power source to be used. This is so, at least in part to set the temperature of the power source 108 at the optimal temperature to prepare for the next process of a supporting an operation of an electric aircraft 104. As a non-limiting example, this is so, at least in part to set the temperature of the power source 108 at a temperature to receive charging at a higher rate, resulting in an overall faster recharge time. Persons skilled in the art, upon reviewing the entirety of this disclosure, will be aware of the various embodiments of power source preconditioning as described herein.

With continued reference to FIG. 1, in some embodiments, ground service equipment 116 may manage a temperature of a power source 108 of an electric aircraft 104 using a coolant. For the purposes of this disclosure, "coolant" is any flowable heat transfer medium. As a non-limiting example, the coolant may include a liquid, a gas, a solid, and/or a fluid. In some embodiments, the coolant may include a compressible fluid and/or a non-compressible fluid. In some embodiments, the coolant may include ethylene glycol, propylene glycol, and the like. In some embodiments, the coolant may include a non-conductive liquid such as a fluorocarbon-based fluid, such as without limitation Fluorinert™ from 3M of Saint Paul, Minnesota, USA. In some cases, the coolant may include air. In some embodiments, the ground service equipment 116 may obtain the coolant from a coolant source 120. The coolant source 120 disclosed herein is further described below.

With continued reference to FIG. 1, ground service equipment 116 includes a coolant source 120. For the purposes of this disclosure, a "coolant source" is an origin, generator, or reservoir of a coolant. In an embodiment, the coolant source may be external of the ground service equipment 116. In another embodiment, the coolant source 120 may be inside of the ground service equipment 116. In some embodiments, the coolant source 120 may include corrosion-resistant outer housing as the coolant source may come into contact with the liquid or material within the housing, such as without limitation the coolant. For the purposes of this disclosure, "corrosion-resistant" refers to the ability to protect the substrate from corrosion. As a non-limiting example, the corrosion-resistant outer housing may include stainless steel, aluminum alloy, nickel-chromium alloy, iron-chromium-aluminum alloy, molybdenum disilicide, silicon carbide, copper, polypropylene, Polytetrafluoroethylene (PTFE), and the like.

With continued reference to FIG. 1, in some embodiments, ground service equipment 116 includes a coolant heating system 124. For the purposes of this disclosure, a "coolant heating system" is a system that is configured to increase thermal energy of a coolant. As a non-limiting example, the coolant heating system may heat a coolant from 65° F. to 75° F. In some embodiments, the coolant heating system 124 may include a shape of a tube, a plate, a film, a pipe, and the like. In an embodiment, the coolant heating system 124 may be immersed inside of a coolant source 120. In another embodiment, the coolant heating system 124 may wrap around the coolant source 120. In some embodiments, the coolant heating system 124 may be external to the coolant source 120. The coolant heating system 124 may be configured to increase thermal energy of a coolant using an electric resistance heating. In some embodiments, the coolant heating system 124 may include an immersion heater. For the purposes of this disclosure, an "immersion heater" is a heater that is immersed inside a coolant source and configured to heat a coolant inside of the coolant source using an electric resistance heating. The immersion heater may be inserted through the wall of a container to heat the coolant within. The immersion heater may use an electric resistance heating element 128 to heat the coolant inside of the coolant source 120 until it reaches an optimal temperature.

With continued reference to FIG. 1, a coolant heating system 124 includes an electric resistance heating element 128. The coolant heating system 124 may include the electric resistance heating element 128 embedded inside a housing, such as a corrosion-resistant outer housing of the coolant source 120, that can be attached or inserted to transfer heat. For the purposes of this disclosure, an "electric resistance heating element" is an element of a coolant heating system that is configured to increase thermal energy of a system using electric resistance heating. The electric resistance heating element 128 may convert electrical energy into heat through the process of Joule heating. Electric current through the element encounters resistance, resulting in heating of the element. In an embodiment, the electric resistance heating element 128 may include a resistance wire. For the purposes of this disclosure, a "resistance wire" is the actual resistance which is where the electrical load occurs. In some embodiments, the resistance wire may include a nichrome, Kanthal wire, Cupronicke alloy, etched foil, and the like. In some embodiments, the resistance wire may be straight, coiled, and the like. In another embodiment, the electric resistance heating element 128 may include a sheath. For the purposes of this disclosure, a "sheath" is a part which contacts a coolant to be heated. As a non-limiting example, the sheath may include stainless steel, superalloy, and the like. In another embodiment, the electric resistance heating element 128 may include an insulation. For the purposes of this disclosure, an "insulation" is an element that prevents the resistance wire contacting the sheath. In some embodiments, the electric resistance heating element 128 may include a seal. The seal may prevent any contaminants from entering the coolant heating system 124. Persons skilled in the art, upon reviewing the entirety of this disclosure, will be aware of the various electric resistance heating elements 128 used for the coolant heating system 124.

With continued reference to FIG. 1, for the purposes of this disclosure, an "electric resistance heating," or also called "joule heating" is a process by which the passage of an electric current through a conductor produces heat. For the purposes of this disclosure, "heat" is the flow of thermal energy. The Joule heating is also referred to, in this disclosure, as resistive, resistance, or Ohmic heating. Joule-Lenz law states that power of heat generated by a coolant heating system 124 is proportional to a product of its resistance and a square of the current, see below.

$$P \propto I^2 R$$

where P is power of heat generated, for example in Watts, I is electric current within the coolant heating system 124, for example in Amps, and R is resistance of the coolant heating system 124, for example in Ohms.

With continued reference to FIG. 1, in some embodiments, ground service equipment 116 may include a coolant cooling system 118. For the purposes of this disclosure, a "coolant cooling system" is a system configured to remove thermal energy from a coolant. As a non-limiting example, the coolant cooling system 118 may cool a coolant from 75° F. to 65° F. In some embodiments, the coolant cooling system 118 may be configured to remove thermal energy from the coolant to an optimal temperature. In some embodiments, the coolant cooling system 118 may include a fan, a heat exchanger, a heat sink, a chiller, and the like. In some embodiments, the coolant cooling system 118 may include a shape of a tube, a plate, a pipe, and the like. In some embodiments, the coolant cooling system 118 may include a liquid-to-liquid cooling system, closed-loop dry cooling system, open-loop evaporative system, closed-loop evaporative system, chilled water system, and the like. In an embodiment, the coolant cooling system 118 may be immersed inside of a coolant source 120. In another embodiment, the coolant cooling system 118 may wrap around the coolant source 120. In some embodiments, the coolant cooling system 118 may be external to the coolant source 120.

With continued reference to FIG. 1, ground service equipment 116 may include a pump. As used in this disclosure, a "pump" is a mechanical source of power that converts mechanical power into fluidic energy. Pump may include a substantially constant pressure pump (e.g., centrifugal pump) or a substantially constant flow pump (e.g., positive displacement pump, gear pump, and the like). Pump can be hydrostatic or hydrodynamic. A pump may generate flow with enough power to overcome pressure induced by a load at a pump outlet. A pump may generate a vacuum at a pump inlet, thereby forcing fluid from a reservoir into the pump inlet to the pump and by mechanical action delivering this fluid to a pump outlet. Hydrostatic pumps are positive displacement pumps. Hydrodynamic pumps can be fixed displacement pumps, in which displacement may not be adjusted, or variable displacement pumps, in which the displacement may be adjusted. Exemplary non-limiting pumps include gear pumps, rotary vane pumps, screw pumps, bent axis pumps, inline axial piston pumps, radial piston pumps, and the like. Pump may be powered by any rotational mechanical work source, for example without limitation and electric motor or a power take off from an engine. Pump may be in fluidic communication with a coolant source 120. In some cases, the coolant source 120 may be unpressurized and/or vented. Alternatively, the coolant source 120 may be pressurized and/or sealed. Additionally without limitation, the pump disclosed herein may be consistent with a pump found in U.S. patent application Ser. No. 18/120,257, filed on Mar. 10, 2023, and entitled "A SYSTEM AND A METHOD FOR PRECONDITIONING A POWER SOURCE OF AN ELECTRIC AIRCRAFT," which is incorporated in its entirety herein by reference.

With continued reference to FIG. 1, in some embodiments, a pump may be configured to provide a coolant flow between ground service equipment 116 and a power source 108 of an electric aircraft 104 to precondition the power source 108. In some embodiments, the pump may be configured to pump a coolant from a coolant source 120 to precondition the power source 108. As a non-limiting example, the pump may pump a coolant from the coolant source 120 to cool power source 108 of an electric aircraft 104. As another non-limiting example, the pump may pump a coolant from the coolant source 120 to heat the power source 108 of the electric aircraft 104. In some embodiments, the pump may be configured to pump a coolant from the coolant source 120 to cool and/or heat the power source 108 while charging. In some embodiments, the pump may be configured to pump a coolant from a spent coolant reservoir 144. In some embodiments, the pump may be configured to pump a coolant into the spent coolant reservoir 144 after a use of the coolant.

With continued reference to FIG. 1, in some embodiments, a pump may include a negative pressure pump 130. For the purposes of this disclosure, a "negative pressure pump" is a pump that pulls a coolant out of a power source of an electric aircraft. The negative pressure pump 130 may be consistent with a pump disclosed above. For the purposes of this disclosure, "negative pressure" is a pressure within a system that is less than the environment that surrounds the system. Consequently, if there is any leak or an outlet from the positively pressured system, air and/or any substance may get sucked into the surrounding environment. Using this, a ground service equipment 116 may use the negative pressure pump 130 to pump the coolant out of the power source 108 of the electric aircraft 104. In some embodiments, the negative pressure pump 130 may pump the coolant out of the power source 108 once preconditioning of the power source 108 is done by a positive pressure pump 132. In some embodiments, the negative pressure pump 130 may pump the coolant out of the power source 108 before preconditioning of the power source 104 is done by the positive pressure pump 132. In some embodiments, the negative pressure pump 130 may pump the coolant out of the power source 108 after charging is done. In some embodiments, the negative pressure pump 130 may pump the coolant out of the power source 108 before the charging is done. Additionally without limitation, the negative pressure pump 130 disclosed herein may be consistent with a negative pressure pump found in U.S. patent application Ser. No. 18/120,257, filed on Mar. 10, 2023, and entitled "A SYS- TEM AND A METHOD FOR PRECONDITIONING A POWER SOURCE OF AN ELECTRIC AIRCRAFT," which is incorporated in its entirety herein by reference.

With continued reference to FIG. 1, in some embodiments, a pump may include a positive pressure pump 132. For the purposes of this disclosure, a "positive pressure pump" is a pump that moves fluid using positive pressure. In some embodiments, the positive pressure pump 132 may be configured to pump a coolant into a power source 108 of an electric aircraft 104. As a non-limiting example, the positive pressure pump 132 may pump a coolant into a cooling circuit of the power source 108. For the purposes of this disclosure, a "cooling circuit" is a passage of a flow of a fluid. As a non-limiting example, the cooling circuit may allow a coolant flow in the power source 108. The cooling circuit is further described in detail with respect to FIGS. 3-4. The cooling circuit may include a thermal conduit. The thermal conduit disclosed herein may be consistent with a thermal conduit described with respect to FIGS. 6-8. For the purposes of this disclosure, "positive pressure" is a pressure within a system that is greater than the environment that surrounds the system. Consequently, if there is any leak or an outlet from the positively pressured system, it will egress into the surrounding environment. As a non-limiting example, the positive pressure pump 132 may obtain a cooled coolant from a coolant source 120 and pump the cooled coolant to cool the power source 108. As another non-limiting example, the positive pressure pump 132 may obtain a heated coolant from the coolant source 120 and pump the heated coolant into the power source 108. Additionally without limitation, the positive pressure pump 132 disclosed herein may be consistent with a positive pressure pump found in U.S. patent application Ser. No. 18/120,257, filed on Mar. 10, 2023, and entitled "A SYSTEM AND A METHOD FOR PRECONDITIONING A POWER SOURCE OF AN ELECTRIC AIRCRAFT," which is incorporated in its entirety herein by reference.

With continued reference to FIG. 1, ground service equipment may include a filter 134. For the purposes of this disclosure, a "filter" is a material or device that allows certain substances to pass through it, while keeping other substances out. In some embodiments, the filter 134 may include a deionizing filter. For the purposes of this disclosure, a "deionizing filter" is a filter that is configured to deionize a fluid. For the purposes of this disclosure, "deionization" refers to the removal of ions through the process of ion exchange, wherein the ions are electrically charged atoms or molecules found in a fluid that have either a net negative or positive charge. In some embodiments, the deionizing filter may be configured to remove mineral ions from the coolant. As a non-limiting example, the mineral ions may include cations, such as without limitation, sodium, calcium, iron, copper, and the like. As another non-limiting example, the mineral ions may include anions such as without limitation, chloride, sulfate, and the like. The deionizing filter may remove total dissolved solids from the coolant using ion exchange resins, controlling the electric charge of ions in the water to remove the total dissolved solids. The ion exchange resins may include cationic resin, wherein the cationic resin may include negatively charged sulfonic acid group. The cationic resin may attract positively charged ions in the coolant and release an equivalent amount of hydrogen ions. The ion exchange resins may include anionic resin, wherein the anionic resin may include positively charged ammonium group. The anionic resin may attract negatively charged and release an equivalent amount of hydroxide.

With continued reference to FIG. 1, in some embodiments, ground service equipment 116 may include a valve 136. For the purposes of this disclosure, a "valve" is a device for controlling a flow of fluid through a passage. In some embodiments, the valve 136 have a plurality of positions between fully open to fully closed. The valve 136 may be controlled by electrical, hydraulic, pneumatic actuators, and/or the like. For the purposes of this disclosure, an "actuator" is a component of a machine that is responsible for moving and/or controlling a mechanism or system. The actuator may, in some cases, require a control signal and/or a source of energy or power. In some cases, a control signal may be relatively low energy. Exemplary control signal forms include electric potential or current, pneumatic pressure or flow, or hydraulic fluid pressure or flow, mechanical force/torque or velocity, or even human power. In some cases, the actuator may have an energy or power source other than control signal. This may include a main energy source, which may include for example electric power, hydraulic power, pneumatic power, mechanical power, and the like. In some cases, upon receiving a control signal, the actuator may respond by converting source power into mechanical motion. In some cases, the actuator may be understood as a form of automation or automatic control.

With continued reference to FIG. 1, in some embodiments, an actuator may include a hydraulic actuator. The hydraulic actuator may consist of a cylinder or fluid motor that uses hydraulic power to facilitate mechanical operation. Output of the hydraulic actuator may include mechanical motion, such as without limitation linear, rotatory, or oscillatory motion. In some cases, the hydraulic actuator may employ a liquid hydraulic fluid. As liquids, in some cases, are incompressible, a hydraulic actuator can exert large forces. Additionally, as force is equal to pressure multiplied by area, the hydraulic actuators may act as force transformers with changes in area (e.g., cross sectional area of cylinder and/or piston). An exemplary hydraulic cylinder may consist of a hollow cylindrical tube within which a piston can slide. In some cases, the hydraulic cylinder may be considered single acting. The single acting may be used when fluid pressure is applied substantially to just one side of a piston. Consequently, a single acting piston can move in only one direction. In some cases, a spring may be used to give a single acting piston a return stroke. In some cases, a hydraulic cylinder may be double acting. The double acting may be used when pressure is applied substantially on each side of a piston; any difference in resultant force between the two sides of the piston causes the piston to move.

With continued reference to FIG. 1, in some embodiments, an actuator may include a pneumatic actuator. In some cases, the pneumatic actuator may enable considerable forces to be produced from relatively small changes in gas pressure. In some cases, the pneumatic actuator may respond more quickly than other types of actuators, for example hydraulic actuators. The pneumatic actuator may use compressible fluid (e.g., air). In some cases, the pneumatic actuator may operate on compressed air. Operation of hydraulic and/or pneumatic actuators may include control of one or more valves, circuits, fluid pumps, and/or fluid manifolds.

With continued reference to FIG. 1, an actuator may be an electric actuator. In some embodiments, the electric actuator may include any electromechanical actuators, linear motors, and the like. In some cases, the actuator may include an electromechanical actuator. The electromechanical actuator may convert a rotational force of an electric rotary motor into a linear movement to generate a linear movement through a mechanism. Exemplary mechanisms, include rotational to translational motion transformers, such as without limitation a belt, a screw, a crank, a cam, a linkage, a scotch yoke, and the like. In some cases, control of an electromechanical actuator may include control of electric motor, for instance a control signal may control one or more electric motor parameters to control electromechanical actuator. Exemplary non-limitation electric motor parameters include rotational position, input torque, velocity, current, and potential. The electric actuator may include a linear motor. The linear motors may differ from electromechanical actuators, as power from linear motors is output directly as translational motion, rather than output as rotational motion and converted to translational motion. In some cases, the linear motor may cause lower friction losses than other devices. The linear motors may be further specified into at least 3 different categories, including flat linear motor, U-channel linear motors and tubular linear motors. The linear motors may be directly controlled by a control signal for controlling one or more linear motor parameters. Exemplary linear motor parameters include without limitation position, force, velocity, potential, and current.

With continued reference to FIG. 1, in some embodiments, an actuator may include a mechanical actuator. In some cases, the mechanical actuator may function to execute movement by converting one kind of motion, such as rotary motion, into another kind, such as linear motion. An exemplary mechanical actuator may include a rack and pinion. In some cases, a mechanical power source, such as a power take off may serve as power source for the mechanical actuator. The mechanical actuators may employ any number of mechanisms, including for example without limitation gears, rails, pulleys, cables, linkages, and the like.

With continued reference to FIG. 1, in some embodiments, the valve 136 may include a non-return valve. For the purposes of this disclosure, a "non-return valve" is a valve that allows a fluid to flow in only one direction. In some embodiments, the valve 136 may include a control valve. For the purposes of this disclosure, a "control valve" is a valve used to control fluid flow by varying the size of the flow passage. As a non-limiting example, the valve 136 may open to allow the flow of the coolant. As another non-limiting example, the valve 136 may close to prevent the flow of the coolant. In some embodiments, the valve 136 may be configured to control a flow of a coolant between ground service equipment 116 and an electric aircraft 104. In an embodiment, a user may manually control a valve 136 to control a flow of coolant. As a non-limiting example, the user may manually turn, twist, or by any method to open and/or close the valve 136. For the purposes of this disclosure, a "user" is any person using a system. In some embodiments, the valve 136 may be communicatively connected to a controller 152. As a non-limiting example, the controller 152 may open and/or close the valve 136 as a function of a user input from a user input device 140. In an embodiment, the control valve 136 may be configured to control a flow of coolant as directed by a signal from a controller 152. In some embodiments, the control valve may be configured to control a pressure of a flow of coolant as directed by a signal from the controller 152. In another embodiment, the control valve may be configured to control a flow rate of coolant as directed by a signal from a controller 152. The user input device 140 and the controller 152 disclosed herein is further described below.

With continued reference to FIG. 1, in some embodiments, ground service equipment 116 may include a user input device 140. For the purposes of this disclosure, a "user input device" is any device that a user can input a user input. In an embodiment, the user input device 140 may include a touch screen. As a non-limiting example, a user may touch a screen to input a user input. In another embodiment, a flight controller of an electric aircraft 104 may be used to input a user input. In some embodiments, the flight controller may employ a wireless and/or wired communication to input the user input. The flight controller disclosed herein is further described with respect to FIG. 10. In some embodiments, the user input device 140 may include a switch. For the purposes of this disclosure, a "switch" is an electrical component that can disconnect or connect the conducting path in an electrical circuit. As a non-limiting example, the switch may include a toggle switch, rotary switch, mercury switch, push-button switch, reversing switch, relay, circuit breaker, and the like. In some embodiments, the user input device 140 may be communicatively connected to a controller 152. In some embodiments, the user input device 140 may be configured to transmit a user input to a controller 152. As a non-limiting example, a user may control a switch to generate the user input. In some embodiments, the user input device 140 may be configured to transmit the switch signal to the controller 152 to control a valve 136. As a non-limiting example, a user may turn on the switch to open the valve 136 to allow a flow of coolant. As another non-limiting example, the user may turn off the switch to fully close the valve 136 to stop the coolant flow. For the purposes of this disclosure, a "user input" is any data received from a user. As a non-limiting example, a user input may include 'start heating a coolant,' 'start cooling a coolant,' 'stop heating a coolant,' 'stop cooling a coolant,' 'open a valve 136,' 'close a valve 136,' and the like. As another non-limiting example, a user input may include an optimal temperature, an optimal flow rate, and the like.

With continued reference to FIG. 1, for the purposes of this disclosure, "communicatively connected" means connected by way of a connection, attachment or linkage between two or more relata which allows for reception and/or transmittance of information therebetween. For example, and without limitation, this connection may be wired or wireless, direct or indirect, and between two or more components, circuits, devices, systems, and the like, which allows for reception and/or transmittance of data and/or signal(s) therebetween. Data and/or signals therebetween may include, without limitation, electrical, electromagnetic, magnetic, video, audio, radio and microwave data and/or signals, combinations thereof, and the like, among others. A communicative connection may be achieved, for example and without limitation, through wired or wireless electronic, digital or analog, communication, either directly or by way of one or more intervening devices or components. Further, communicative connection may include electrically coupling or connecting at least an output of one device, component, or circuit to at least an input of another device, component, or circuit. For example, and without limitation, via a bus or other facility for intercommunication between elements of a computing device. Communicative connecting may also include indirect connections via, for example and without limitation, wireless connection, radio communication, low power wide area network, optical communication, magnetic, capacitive, or optical coupling, and the like. In some instances, the terminology "communicatively coupled" may be used in place of communicatively connected in this disclosure.

With continued reference to FIG. 1, in some embodiments, ground service equipment 116 may include a spent coolant reservoir 144. For the purposes of this disclosure, a "spent coolant reservoir" is a container configured to collect used coolant from the aircraft. The spent coolant reservoir 144 may be a container made of nonporous, nonreactive materials such as plastics or metals. The spent coolant reservoir 144 may be located within the ground service equipment 116 or separately from the ground service equipment 116. The spent coolant reservoir 144 may be used to store a coolant purged from an electric aircraft 104. The coolant in spent coolant reservoir 144 may be reused.

With continued reference to FIG. 1, in some embodiments, ground service equipment 116 may include a cable module 112. In some embodiments, the cable module 112 may be configured to deliver the coolant from ground service equipment 116 to an electric aircraft 104. For the purposes of this disclosure, a "cable module" is a cord which is configured to support communication between mating components. As a non-limiting examples, a port 110 of an electric aircraft 104 and ground service equipment 116 may be mating components. In some embodiments, a cable module 112 may be mechanically coupled to the ground service equipment 116. In some embodiments, the cable module 112 may be fluidically connected to the pump and/or a reservoir, such as without limitation a coolant source 120 and a spent coolant reservoir 144. For the purposes of this disclosure, "fluidically connected" means that fluid is able to flow from one of the fluidly connected elements to the other, notwithstanding any elements that temporarily or optionally restrict fluid flow, such as, as non-limiting examples, a valve 136. The cable module 112 may be removable from the ground service equipment 116. The cable module 112 may be permanently attached to the ground service equipment 116. In some embodiments, a cable module 112 may be communicatively connected to a controller 152. In some embodiments, the cable module 112 may include a user input device 140. As a non-limiting example, the cable module 112 may include a toggle switch. Additionally without limitation, more descriptions related to the cable module 112 may be found in U.S. patent application Ser. No. 17/752,248, filed on May 24, 2022, and entitled "GROUND SERVICE SYSTEMS AND DEVICES FOR AN ELECTRIC AIRCRAFT," and is incorporated in its entirety herein by reference.

With continued reference to FIG. 1, in some embodiments, a cable module 112 may include a connector 146. For the purposes of this disclosure, a "connector" is a distal end of a cord. In some embodiments, the connector 146 of the cable module 112 may be configured to interface with a port 110 of an electric aircraft 104. In some embodiments, the connector 146 may be configured to receive a user input from a user. The user input 136 disclosed herein is further described below. In some embodiments, the connector 146 may include a user input device 140. The user input device 140 disclosed herein is further described below. As a non-limiting example, the connector 146 may include a button that the user may push to start and/or stop pumping a coolant into a power source 108. The connector 146 may include a button that the user may push to start and/or stop pumping a coolant out of a power source 108. The connector 146 may include a switch that the user may control to start and/or stop pumping a coolant into a power source 108. The connector 146 may include a switch that the user may control to start and/or stop pumping a coolant out of a power source 108. The connector 146 may include a screen that the user may touch to start and/or stop pumping a coolant into a power source 108. The connector 146 may include a screen that the user may touch to start and/or stop pumping a coolant out of a power source 108. Additionally without limitation, the connector 146 of the cable module 112 may include any other element that enables a user to control to start and/or stop pumping in and/or pumping out a coolant to and/or from the power source 108. Additionally without limitation, the connector 146 disclosed herein may be consistent with a connector found in U.S. patent application Ser. No. 18/120,257, filed on Mar. 10, 2023, and entitled "A SYSTEM AND A METHOD FOR PRECONDITIONING A POWER SOURCE OF AN ELECTRIC AIRCRAFT," which is incorporated in its entirety herein by reference.

With continued reference to FIG. 1, in some embodiments, a system 100 may include at least a sensor 148. For the purposes of this disclosure, a "sensor" is a device that is configured to detect an input and/or a phenomenon and transmit information related to the detection. For example, and without limitation, the at least a sensor 148 may transduce a detected phenomenon, such as without limitation, temperature, voltage, current, pressure, and the like, into a sensed signal. The at least a sensor 148 may include any computing device as described in the entirety of this disclosure and configured to convert and/or translate a plurality of signals detected into electrical signals for further analysis and/or manipulation. Electrical signals may include analog signals, digital signals, periodic or aperiodic signal, step signals, unit impulse signal, unit ramp signal, unit parabolic signal, signum function, exponential signal, rectangular signal, triangular signal, sinusoidal signal, sinc function, or pulse width modulated signal. Any datum captured by the at least a sensor 148 may include circuitry, computing devices, electronic components or a combination thereof that translates into at least an electronic signal configured to be transmitted to another electronic component. In a non-limiting embodiment, the at least a sensor 148 may include a plurality of sensors comprised in a sensor suite. In one or more embodiments, and without limitation, the at least a sensor 148 may include a plurality of sensors. In one or more embodiments, and without limitation, the at least a sensor 148 may include one or more temperature sensors. For the purposes of this disclosure, a "temperature sensor" is a sensor that detects a temperature of a system. As a non-limiting example, the temperature sensor may measure a temperature of a coolant, a coolant source 120, a power source 108, and the like. Then, the temperature sensor may transmit a signal of the temperature of the coolant, the coolant source 120, the power source 108, and the like to a controller 152. In one or more embodiments, the at least a sensor 148 may include thermocouples, thermistors, thermometers, infrared sensors, resistance temperature sensors (RTDs), semiconductor based integrated circuits (ICs), a combination thereof, or another undisclosed sensor type, alone or in combination. For the purposes of this disclosure and as would be appreciated by someone of ordinary skill in the art, "temperature" is a measure of the heat energy of a system. Temperature, as measured by any number or combinations of sensors present within the at least a sensor 148, may be measured in Fahrenheit (° F.), Celsius (° C.), Kelvin (° K), or another scale alone or in combination. In some embodiments, the at least a sensor 148 may include a flow sensor. For the purposes of this disclosure, a "flow sensor" is a sensor that measures a flow of a fluid. The flow sensor may measure the flow of the fluid and then transmit a signal of the flow of the fluid to a controller 152. In an embodiment, the flow sensor may measure a volumetric flow rate. For the purposes of this disclosure, a "volumetric flow rate" refers to the volume of fluid that passes a measurement point over a period of time. In another embodiment, the flow sensor may measure a mass flow rate. For the purposes of this disclosure, a "mass flow rate" refers to the amount of mass of fluid that passes a specific point over a period of time. In some embodiments, the flow sensor may be configured to measure a speed of a flow. For the purposes of this disclosure, a "speed" of a flow refers to an indication of how fast a substance moves through a conduit from one place to another. In some embodiments, the flow sensor may be configured to measure a distance of a flow. For the purposes of this disclosure, a "distance" of a flow refers to a distance a substance moves over a period of time. As a non-limiting example, the flow sensor may measure a flow rate of a coolant between ground service equipment 116 and an electric aircraft 104. In some embodiments without limitation, the flow sensor may include ultrasonic meter, electromagnetic meter, Karman vortex meter, paddlewheel meter, floating element meter, thermal meter, differential pressure types meter, and the like. Persons skilled in the art, upon reviewing the entirety of this disclosure, will be aware of various ways in which steps, sequences of steps, and/or processing tasks to detect the flow of fluids for the disclosure.

With continued reference to FIG. 1, in some embodiments, at least a sensor 148*a* may be communicatively connected to a coolant source 120. The at least a sensor 148*a* communicatively connected to the coolant source 120 may detect and transmit a temperature of a coolant of the coolant source 120 to controller 152. As a non-limiting example, the at least a sensor 148*a* may detect the temperature of the coolant is 60° F. and transmit it to a controller 152. As another non-limiting example, the at least a sensor 148*a* may detect the temperature of the coolant is 70° F. as the coolant is getting heated by a coolant heating system 124 and transmit it to the controller 152. As another non-limiting example, the at least a sensor 148*a* may detect the temperature of the coolant is 75° F. after the coolant is heated by the coolant heating system 124 and transmit it to the controller 152. As another non-limiting example, the at least a sensor 14*a*8 may detect the temperature of the coolant is 70° F. as the coolant is getting cooled by a coolant cooling system 118 and transmit it to the controller 152. As a non-limiting example, at least a sensor 148*a* may detect the temperature of a coolant as the coolant is getting delivered from ground service equipment 116 and an electric aircraft 104.

With continued reference to FIG. 1, in some embodiments, at least a sensor 148*b* may be communicatively connected to a power source 108. The at least a sensor 148*b* communicatively connected to the power source 108 may detect and transmit a temperature of a power source 108. As a non-limiting example, the at least a sensor 148*b* may detect the temperature of the power source 108 is 50° F. and transmit it to a controller 152. As another non-limiting example, the at least a sensor 148*b* may detect the temperature of the power source 108 is 65° F. as the power source 108 is getting heated by ground service equipment 116 and transmit it to the controller 152. As another non-limiting example, the at least a sensor 148*b* may detect the temperature of the power source 108 is 75° F. after the coolant is heated by the ground service equipment 116 and transmit it to the controller 152. As another non-limiting example, the at least a sensor 148*b* may detect the temperature of the power source 108 is 70° F. as the power source 108 is getting cooled by the ground service equipment 116 and transmit it to the controller 152.

With continued reference to FIG. 1, a system 100 includes a controller 152. A controller 152 may include any computing device as described in this disclosure, including without limitation a microcontroller, microprocessor, digital signal processor (DSP) and/or system on a chip (SoC) as described in this disclosure. Computing device may include, be included in, and/or communicate with a mobile device such as a mobile telephone or smartphone. A controller 152 may include a single computing device operating independently, or may include two or more computing device operating in concert, in parallel, sequentially or the like; two or more computing devices may be included together in a single computing device or in two or more computing devices. A controller 152 may interface or communicate with one or more additional devices as described below in further detail via a network interface device. Network interface device may be utilized for connecting a controller 152 to one or more of a variety of networks, and one or more devices. Examples of a network interface device include, but are not limited to, a network interface card (e.g., a mobile network interface card, a LAN card), a modem, and any combination thereof. Examples of a network include, but are not limited to, a wide area network (e.g., the Internet, an enterprise network), a local area network (e.g., a network associated with an office, a building, a campus or other relatively small geographic space), a telephone network, a data network associated with a telephone/voice provider (e.g., a mobile communications provider data and/or voice network), a direct connection between two computing devices, and any combinations thereof. A network may employ a wired and/or a wireless mode of communication. In general, any network topology may be used. Information (e.g., data, software etc.) may be communicated to and/or from a computer and/or a computing device. A controller 152 may include but is not limited to, for example, a computing device or cluster of computing devices in a first location and a second computing device or cluster of computing devices in a second location. A controller 152 may include one or more computing devices dedicated to data storage, security, distribution of traffic for load balancing, and the like. A controller 152 may distribute one or more computing tasks as described below across a plurality of computing devices of computing device, which may operate in parallel, in series, redundantly, or in any other manner used for distribution of tasks or memory between computing devices. A controller 152 may be implemented using a "shared nothing" architecture in which data is cached at the worker, in an embodiment, this may enable scalability of system 100 and/or computing device.

With continued reference to FIG. 1, a controller 152 may be designed and/or configured to perform any method, method step, or sequence of method steps in any embodiment described in this disclosure, in any order and with any degree of repetition. For instance, a controller 152 may be configured to perform a single step or sequence repeatedly until a desired or commanded outcome is achieved; repetition of a step or a sequence of steps may be performed iteratively and/or recursively using outputs of previous repetitions as inputs to subsequent repetitions, aggregating inputs and/or outputs of repetitions to produce an aggregate result, reduction or decrement of one or more variables such as global variables, and/or division of a larger processing task into a set of iteratively addressed smaller processing tasks. The controller 152 may perform any step or sequence of steps as described in this disclosure in parallel, such as simultaneously and/or substantially simultaneously performing a step two or more times using two or more parallel threads, processor cores, or the like; division of tasks between parallel threads and/or processes may be performed according to any protocol suitable for division of tasks between iterations. Persons skilled in the art, upon reviewing the entirety of this disclosure, will be aware of various ways in which steps, sequences of steps, processing tasks, and/or data may be subdivided, shared, or otherwise dealt with using iteration, recursion, and/or parallel processing. Additionally without limitation, the controller 152 disclosed herein may be consistent with a computing device described with respect to FIG. 12

With continued reference to FIG. 1, a controller 152 is communicatively connected to ground service equipment 116. In some embodiments, the controller 152 may be configured to receive a user input from a user input device 140. The user input may be any user input disclosed in the entirety of this disclosure. The controller 152 is configured to control a coolant heating system 124. In some embodiments, the controller 152 may be configured to control the coolant heating system 124 as a function of the user input. As a non-limiting example, the controller 152 may initiate the coolant heating system 124 to heat a coolant of a coolant source 120 when the controller 152 receives a user input of 'start heating a coolant.' As another non-limiting example, the controller 152 may initiate the coolant heating system 124 to heat the coolant of the coolant source 120 when the controller 152 receives 'start heating a battery.' As another non-limiting example, the controller 152 may stop heating the coolant when the controller 152 receives 'stop heating a coolant.' As another non-limiting example, the controller 152 may activate the coolant heating system 124 to heat the coolant to 75° F. when the controller 152 receives an optimal temperature of the coolant, 75° F., from a user input device 140. In some embodiments, the controller 152 may be configured to control the coolant heating system 124 as a function of a predetermined temperature. As a non-limiting example, the controller may activate the coolant heating system 124 to be automatically heated to the predetermined temperature of a coolant. As another non-limiting example, the controller 152 may activate the coolant heating system 124 to be automatically heated to the predetermined temperature of a power source 108. For the purposes of this disclosure, a "predetermined temperature" is a temperature that is saved in a computing device as a default temperature for a component and/or a device. In some embodiments, the predetermined temperature may be stored in a database. The database disclosed herein is further described below. As a non-limiting example, the controller 152 may include a predetermined temperature of a coolant as 70° F. As a non-limiting example, the controller 152 may include a predetermined temperature of a power source 108 as 70° F.

With continued reference to FIG. 1, In some embodiments, a controller 152 may be communicatively connected to at least a sensor 148. In some embodiments, the controller 152 may be configured to receive a signal from the at least a sensor 148. The signal from the at least a sensor 148 disclosed herein is described above. In some embodiments, the controller 152 may be configured to control a coolant heating system 124 as a function of the signal from the at least a sensor 148 and a predetermined temperature. As a non-limiting example, the signal from the at least a sensor 148 may include a temperature of a power source 108. When the controller 152 receives the temperature of the power source 108 that is below a predetermined temperature of the power source 108, the controller 152 may activate the coolant heating system 124 to increase thermal energy of a coolant. As another non-limiting example, when the controller 152 receives the temperature of the coolant is heated to the predetermined temperature, the controller 152 may stop the coolant heating system 124. In some embodiments, the controller 152 may be configured to control the coolant heating system 124 as a function of a signal from at least a sensor 148 and the user input. As a non-limiting example, the signal from the at least a sensor 148 may include a temperature of a power source 108. When the controller 152 receives the temperature of the power source 108 that is below an optimal temperature of the power source 108 received from a user input device 140, the controller 152 may activate the coolant heating system 124 to increase thermal energy of a coolant. As another non-limiting example, when the controller 152 receives the temperature of the coolant is heated to the optimal temperature of the power source 108, the controller 152 may stop the coolant heating system 124. As another non-limiting example, the signal from the at least a sensor 148 may include a temperature of a coolant. When the controller 152 receives the temperature of the coolant that is below an optimal temperature of the coolant received from a user input device 140, the controller 152 may activate the coolant heating system 124 to increase thermal energy of the coolant. As another non-limiting example, when the controller 152 receives the temperature of the coolant is heated to the optimal temperature of the coolant, the controller 152 may stop the coolant heating system 124.

With continued reference to FIG. 1, in some embodiments, a system 100 may include a database. The database may be implemented, without limitation, as a relational database, a key-value retrieval database such as a NOSQL database, or any other format or structure for use as a database that a person skilled in the art would recognize as suitable upon review of the entirety of this disclosure. Database may alternatively or additionally be implemented using a distributed data storage protocol and/or data structure, such as a distributed hash table or the like. Database may include a plurality of data entries and/or records as described above. Data entries in a database may be flagged with or linked to one or more additional elements of information, which may be reflected in data entry cells and/or in linked tables such as tables related by one or more indices in a relational database. Persons skilled in the art, upon reviewing the entirety of this disclosure, will be aware of various ways in which data entries in a database may store, retrieve, organize, and/or reflect data and/or records as used herein, as well as categories and/or populations of data consistently with this disclosure.

With continued reference to FIG. 1, in some embodiments, a controller 152 may be configured to control a coolant cooling system 118. In some embodiments, the controller 152 may be configured to control the coolant cooling system 118 as a function of a user input. As a non-limiting example, the controller 152 may initiate the coolant cooling system 118 to cool a coolant of a coolant source 120 when the controller 152 receives a user input of 'start cooling a coolant.' As another non-limiting example, the controller 152 may initiate the coolant cooling system 118 to cool the coolant of the coolant source 120 when the controller 152 receives 'start cooling a battery.' As another non-limiting example, the controller 152 may stop cooling the coolant when the controller 152 receives 'stop cooling a coolant.' As another non-limiting example, the controller 152 may activate the coolant cooling system 118 to cool the coolant to 75° F. when the controller 152 receives an optimal temperature of the coolant, 75° F., from a user input device 140. In some embodiments, the controller 152 may be configured to control the coolant cooling system 118 as a function of a predetermined temperature. As a non-limiting example, the controller may activate the coolant cooling system 118 to be automatically cooled to the predetermined temperature of a coolant. As another non-limiting example, the controller 152 may activate the coolant cooling system 118 to be automatically cooled to the predetermined temperature of a power source 108. In some embodiments, a controller 152 may be configured to control the coolant cooling system 118 as a function of a signal from at least a sensor 148 and a predetermined temperature. As a non-limiting example, the signal from the at least a sensor 148*b* may include a temperature of a power source 108. When the controller 152 receives the temperature of the power source 108 that is above a predetermined temperature of the power source 108, the controller 152 may activate the coolant cooling system 118 to remove thermal energy from a coolant. As another non-limiting example, when the controller 152 receives the temperature of the coolant is cooled to the predetermined temperature, the controller 152 may stop the coolant cooling system 118. In some embodiments, the controller 152 may be configured to control the coolant cooling system 118 as a function of a signal from at least a sensor 148 and the user input. As a non-limiting example, the signal from the at least a sensor 148*b* may include a temperature of a power source 108. When the controller 152 receives the temperature of the power source 108 that is above an optimal temperature of the power source 108 received from a user input device 140, the controller 152 may activate the coolant cooling system 118 to remove thermal energy from a coolant. As another non-limiting example, when the controller 152 receives the temperature of the coolant that is cooled to the optimal temperature of the power source 108, the controller 152 may stop the coolant cooling system 118. As another non-limiting example, the signal from the at least a sensor 148*a* may include a temperature of a coolant. When the controller 152 receives the temperature of the coolant that is above an optimal temperature of the coolant received from a user input device 140, the controller 152 may activate the coolant cooling system 118 to remove thermal energy from the coolant. As another non-limiting example, when the controller 152 receives the temperature of the coolant is cooled to the optimal temperature of the coolant, the controller 152 may stop the coolant cooling system 118.

With continued reference to FIG. 1, in some embodiments, a controller 152 may be configured to control a valve 136. As another non-limiting example, the controller 152 may be configured to close the valve 136 to reduce a flow rate of the coolant. As another non-limiting example, the controller 152 may be configured to open the valve 136 to increase the flow rate of the coolant. In some embodiments, the controller 152 may be configured to control the valve 136 as a function of a predetermined flow rate of a coolant. As a non-limiting example, the controller 152 may automatically set a flow rate of a coolant to be the predetermined flow rate of the coolant open the valve 136 to flow the coolant at the predetermined flow rate. In some embodiments, the controller 152 may be configured to control the valve 136 as a function of an optimal flow rate of a coolant. As a non-limiting example, the controller 152 may automatically set a flow rate of a coolant to be the optimal flow rate of the coolant and open the valve 136 to flow the coolant at the optimal flow rate. In some embodiments, the controller 152 may be configured to control a valve as a function of a signal from at least a sensor 148, wherein the at least a sensor may be a temperature sensor. As a non-limiting example, the controller 152 may receive a temperature of a power source 108. When the temperature of the power source 108 is below and/or above an optimal temperature of the power source 108, the controller 152 may open and/or close the valve 136 to provide a coolant flow to the power source 108. As another non-limiting example, the controller 152 may receive a temperature of a coolant. Then, when the temperature of the coolant is heated and/or cooled to an optimal temperature, the controller 152 may open the valve 136 to start providing a coolant flow. In some embodiments, the controller 152 may be configured to control the valve 136 as a function of a signal from at least a sensor 148 and a predetermined flow rate of a coolant. As a non-limiting example, the signal from the at least a sensor 148 may include a flow rate of a coolant. When the controller 152 receives the flow rate of a coolant that is below and/or above a predetermined flow rate of a coolant, the controller 152 may open and/or close the control valve 136. In some embodiments, the controller 152 may be configured to control the valve 136 as a function of a signal from at least a sensor 148 and an optimal flow rate of a coolant. As a non-limiting example, the signal from the at least a sensor 148 may include a flow rate of a coolant. When the controller 152 receives the flow rate of a coolant that is below and/or above an optimal flow rate of a coolant received from a user input device 140, the controller 152 may open and/or close the control valve 136. For the purposes of this disclosure, a "predetermined flow rate" is a flow rate that is saved in a computing device as a default flow rate for a component and/or a device. The flow rate disclosed herein may be consistent with a coolant flow disclosed in the entirety of this disclosure. In some embodiments, the predetermined flow rate may be stored in a database. As a non-limiting example, the controller 152 may include a predetermined flow rate of a coolant as 350 L/h. As a non-limiting example, the controller 152 may include a predetermined flow rate of a coolant as be 550 L/h.

With continued reference to FIG. 1, in some embodiments, a controller 152 may be configured to control a positive pressure pump 132. As a non-limiting example, the controller 152 may activate the positive pressure pump 132. As another non-limiting example, the controller 152 may deactivate the positive pressure pump 132. In some embodiments, the controller 152 may be configured to control the positive pressure pump 132 as a function of a predetermined flow rate of a coolant. As a non-limiting example, the controller 152 may automatically set a flow rate of a coolant to be the predetermined flow rate of the coolant and the controller 152 may activate the positive pressure pump 132 to pump the coolant at the predetermined flow rate. In some embodiments, the controller 152 may be configured to control the positive pressure pump 132 as a function of an optimal flow rate of a coolant. As a non-limiting example, the controller 152 may automatically set a flow rate of a coolant to be the optimal flow rate of the coolant and the controller 152 may activate the positive pressure pump 132 to pump the coolant at the optimal flow rate. In some embodiments, the controller 152 may be configured to control the valve 136 as a function of a signal from at least a sensor 148 and a predetermined flow rate of a coolant. As a non-limiting example, the signal from the at least a sensor 148 may include a flow rate of a coolant. When the controller 152 receives the flow rate of a coolant that is below and/or above a predetermined flow rate of a coolant, the controller 152 may activate and/or deactivate the positive pressure pump 132. In some embodiments, the controller 152 may be configured to control the positive pressure pump 132 as a function of a signal from at least a sensor 148 and an optimal flow rate of a coolant. As a non-limiting example, the signal from the at least a sensor 148 may include a flow rate of a coolant. When the controller 152 receives the flow rate of a coolant that is below and/or above an optimal flow rate of a coolant received from a user input device 140, the controller 152 may activate and/or deactivate the positive pressure pump 132. Additionally without limitation, the controller 152 disclosed herein may be consistent with a controller found in U.S. patent application Ser. No. 18/120,257, filed on Mar. 10, 2023, and entitled "A SYSTEM AND A METHOD FOR PRECONDITIONING A POWER SOURCE OF AN ELECTRIC AIRCRAFT," which is incorporated in its entirety herein by reference.

With continued reference to FIG. 1, in some embodiments, a controller 152 may be configured to control a positive pressure pump 132 as a function of a signal from at least a sensor 148, wherein the at least a sensor 148 may be a temperature sensor. As a non-limiting example, the controller 152 may receive the signal from the temperature sensor, wherein the signal comprises a temperature of a power source 108 of an electric aircraft 104. When the temperature of the power source 108 is within a temperature optimal range, the controller 152 may not activate the positive pressure pump 132. For the purposes of this disclosure, a "temperature optimal range" is a range of values of the temperature of a power source that is close enough to an optimal temperature of the power source so the temperature within the range can be considered as the optimal temperature. As a non-limiting example, the temperature optimal range may include ±5° F., ±10° F., ±15° F., ±20° F., ±30° F., and the like. As a non-limiting example, when an optimal temperature of a power source 108 is 100° F., the temperature optimal range may include ±15° F., which gives a range of values of the temperature from 85° F. to 115° F. In an embodiment, a power source 108 with a temperature of a power source 108 that is within the temperature optimal range may indicate that the power source 108 does not need to be heated and/or cooled. In another embodiment, a power source 108 with a temperature that is outside of the temperature optimal range may indicate that the power source 108 needs to be heated and/or cooled. Then, the controller 152 may activate a positive pressure pump 132 to provide a heated and/or cooled coolant to the power source 108. In some embodiments, when the temperature of the power source 108 is an optimal temperature, the controller 152 may stop the positive pressure pump 132. As a non-limiting example, the controller 152 may receive a temperature of a power source 108 from a temperature sensor. When the optimal temperature is 100° F. and the temperature of the power source 108 is 100° F., the controller 152 may stop the positive pressure pump 132.

With continued reference to FIG. 1, in some embodiments, a controller 152 may be configured to control a negative pressure pump 130. As a non-limiting example, the controller 152 may activate the negative pressure pump 130. As another non-limiting example, the controller 152 may deactivate the negative pressure pump 130. In an embodiment, the controller 152 may be configured to activate the negative pressure pump 130 when the controller 152 deactivates a positive pressure pump 132. As a non-limiting example, the controller 152 may activate the negative pressure pump 130 five seconds after the controller 152 deactivates the positive pressure pump 132. As a non-limiting example, the controller 152 may activate the negative pressure pump 130 simultaneously when the controller 152 deactivates the positive pressure pump 132. The timing of the activation of the negative pressure pump 130 after deactivation of the positive pressure pump 132 may vary, for example without limitation, 1 second, 3 seconds, 5 seconds, 10 seconds, 15 seconds, and the like. In some embodiments, a controller 152 may be configured to control a negative pressure pump 130 as a function of a signal from at least a sensor 148, wherein the at least a sensor may be a temperature sensor. In some embodiments, the controller 152 may activate the negative pressure pump 130 when a temperature of a power source 108 is an optimal temperature. As a non-limiting example, the controller 152 may receive a temperature of a power source 108 that is being heated and/or cooled by ground service equipment 116. When the optimal temperature is 100° F. and the temperature of the power source 108 is 100° F., the controller 152 may activate the negative pressure pump 130. Additionally, without limitation, the controller 152 disclosed herein may be consistent with a controller found in U.S. patent application Ser. No. 18/120,257, filed on Mar. 10, 2023, and entitled "A SYSTEM AND A METHOD FOR PRECONDITIONING A POWER SOURCE OF AN ELECTRIC AIRCRAFT," which is incorporated in its entirety herein by reference.

With continued reference to FIG. 1, in some embodiments, a system 100 may include a display device 156. For the purposes of this disclosure, a "display device" is a device that conveys information visually. As a non-limiting example, the display device 156 may include smartphones, tablets, laptops, monitors, headsets, and the like. In an embodiment, the display device 156 may convey information in a text format. In some embodiments, the display device 156 may convey information in a video format. In some embodiments, the display device 156 may convey information in an audio format. In some embodiments, the display device 156 may convey information in animation. In some embodiments, ground service equipment 116 may include the display device 156. In some embodiments, an electric aircraft 104 may include the display device 156. In some embodiments, a controller 152 may be communicatively connected to the display device 156. In an embodiment, a controller 152 may be configured to display a temperature of a power source 108. In another embodiment, the controller 152 may be configured to display a temperature of a coolant. In some embodiments, the controller 152 may be configured to display a heating status of a coolant. For the purposes of this disclosure, a "heating status" refers to indication of how much a fluid is heated. In an embodiment, the heating status may include a comparison of a temperature of a coolant before getting thermal energy increased by a coolant heating system 124 and a temperature of the coolant after getting thermal energy increased by the coolant heating system 124. As a non-limiting example, the display device 156 may display the heating status by showing a temperature of a coolant before getting thermal energy increased by a coolant heating system 124, 65° F., and a temperature of the coolant as the coolant is getting thermal energy increased by the coolant heating system 124. As another non-limiting example, the display device 156 may display the heating status by showing the temperature of the coolant as the coolant is getting thermal energy increased by the coolant heating system 124 and an optimal temperature of the coolant.

Figure 2:
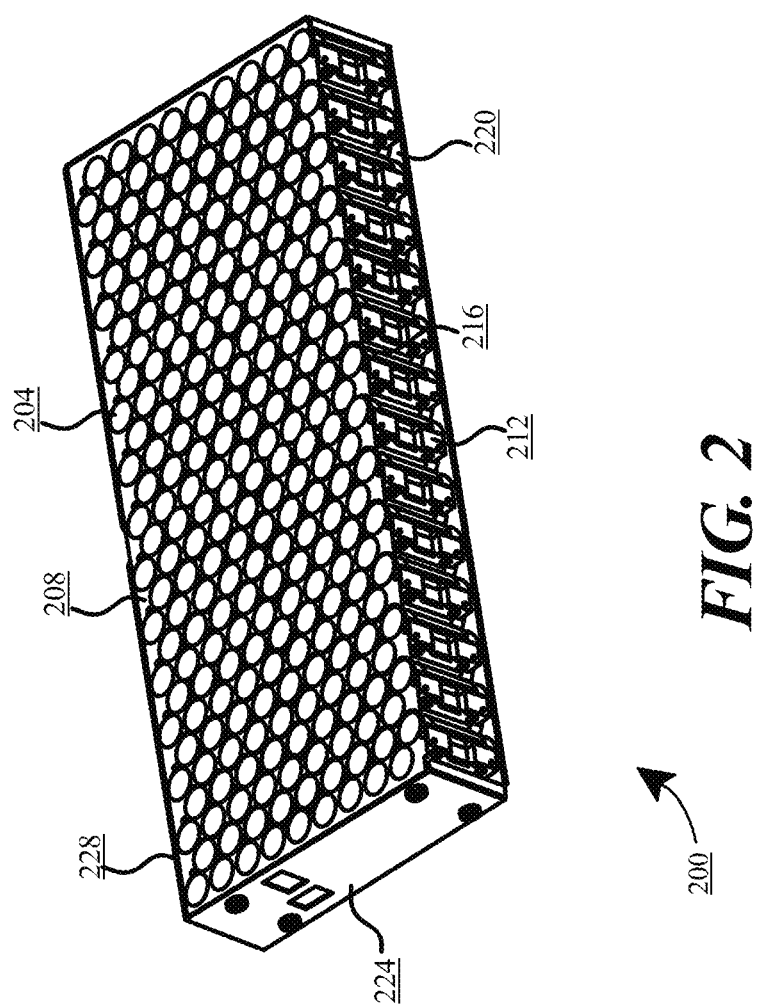
FIG. 2 schematically illustrates an exemplary battery module.

Referring now to FIG. 2, battery module 200 with multiple battery units 216 is illustrated, according to embodiments. Battery module 200 may comprise a battery cell 204, cell retainer 208, cell guide 212, protective wrapping, back plate 220, end cap 224, and side panel 228. Battery module 200 may comprise a plurality of battery cells, an individual of which is labeled 204. In embodiments, battery cells 204 may be disposed and/or arranged within a respective battery unit 216 in groupings of any number of columns and rows. For example, in the illustrative embodiment of FIG. 2, battery cells 204 are arranged in each respective battery unit 216 with 18 cells in two columns. It should be noted that although the illustration may be interpreted as containing rows and columns, that the groupings of battery cells in a battery unit, that the rows are only present as a consequence of the repetitive nature of the pattern of staggered battery cells and battery cell holes in cell retainer being aligned in a series. While in the illustrative embodiment of FIG. 2 battery cells 204 are arranged 18 to battery unit 216 with a plurality of battery units 216 comprising battery module 200, one of skill in the art will understand that battery cells 204 may be arranged in any number to a row and in any number of columns and further, any number of battery units may be present in battery module 200. According to embodiments, battery cells 204 within a first column may be disposed and/or arranged such that they are staggered relative to battery cells 204 within a second column. In this way, any two adjacent rows of battery cells 204 may not be laterally adjacent but instead may be respectively offset a predetermined distance. In embodiments, any two adjacent rows of battery cells 204 may be offset by a distance equal to a radius of a battery cell. This arrangement of battery cells 204 is only a non-limiting example and in no way precludes other arrangement of battery cells.

In embodiments, battery cells 204 may be fixed in position by cell retainer 208. For the illustrative purpose within FIG. 2, cell retainer 208 is depicted as the negative space between the circles representing battery cells 204. Cell retainer 208 comprises a sheet further comprising circular openings that correspond to the cross-sectional area of an individual battery cell 204. Cell retainer 208 comprises an arrangement of openings that inform the arrangement of battery cells 204. In embodiments, cell retainer 208 may be configured to non-permanently, mechanically couple to a first end of battery cell 204.

According to embodiments, battery module 200 may further comprise a plurality of cell guides 212 corresponding to each battery unit 216. Cell guide 212 may comprise a solid extrusion with cutouts (e.g. scalloped) corresponding to the radius of the cylindrical battery cell 204. Cell guide 212 may be positioned between the two columns of a battery unit 216 such that it forms a surface (e.g. side surface) of the battery unit 216. In embodiments, the number of cell guides 212 therefore matches in quantity to the number of battery units 216. Cell guide 212 may comprise a material suitable for conducting heat.

Battery module 200 may also comprise a protective wrapping woven between the plurality of battery cells 204. Protective wrapping may provide fire protection, thermal containment, and thermal runaway during a battery cell malfunction or within normal operating limits of one or more battery cells 204 and/or potentially, battery module 200 as a whole. Battery module 200 may also comprise a backplate 220. Backplate 220 is configured to provide structure and encapsulate at least a portion of battery cells 204, cell retainers 208, cell guides 212, and protective wraps. End cap 224 may be configured to encapsulate at least a portion of battery cells 204, cell retainers 208, cell guides 212, and battery units 216, as will be discussed further below, end cap may comprise a protruding boss that clicks into receivers in both ends of back plate 220, as well as a similar boss on a second end that clicks into sense board. Side panel 228 may provide another structural element with two opposite and opposing faces and further configured to encapsulate at least a portion of battery cells 204, cell retainers 208, cell guides 212, and battery units 216.

With continued reference to FIG. 2, in embodiments, battery module 200 can include one or more battery cells 204. In another embodiment, battery module 200 comprises a plurality of individual battery cells 204. Battery cells 204 may each comprise a cell configured to include an electrochemical reaction that produces electrical energy sufficient to power at least a portion of an electric aircraft. Battery cell 204 may include electrochemical cells, galvanic cells, electrolytic cells, fuel cells, flow cells, voltaic cells, or any combination thereof—to name a few. In embodiments, battery cells 204 may be electrically connected in series, in parallel, or a combination of series and parallel. Series connection, as used herein, comprises wiring a first terminal of a first cell to a second terminal of a second cell and further configured to comprise a single conductive path for electricity to flow while maintaining the same current (measured in Amperes) through any component in the circuit. Battery cells 204 may use the term 'wired', but one of ordinary skill in the art would appreciate that this term is synonymous with 'electrically connected', and that there are many ways to couple electrical elements like battery cells 204 together. As an example, battery cells 204 can be coupled via prefabricated terminals of a first gender that mate with a second terminal with a second gender. Parallel connection, as used herein, comprises wiring a first and second terminal of a first battery cell to a first and second terminal of a second battery cell and further configured to comprise more than one conductive path for electricity to flow while maintaining the same voltage (measured in Volts) across any component in the circuit. Battery cells 204 may be wired in a series-parallel circuit which combines characteristics of the constituent circuit types to this combination circuit. Battery cells 204 may be electrically connected in any arrangement which may confer onto the system the electrical advantages associated with that arrangement such as high-voltage applications, high-current applications, or the like.

As used herein, an electrochemical cell is a device capable of generating electrical energy from chemical reactions or using electrical energy to cause chemical reactions. Further, voltaic or galvanic cells are electrochemical cells that generate electric current from chemical reactions, while electrolytic cells generate chemical reactions via electrolysis. As used herein, the term 'battery' is used as a collection of cells connected in series or parallel to each other.

According to embodiments and as discussed above, any two rows of battery cells 204 and therefore cell retainer 208 openings are shifted one half-length so that no two battery cells 204 are directly next to the next along the length of the battery module 200, this is the staggered arrangement presented in the illustrated embodiment of FIG. 2. Cell retainer 208 may employ this staggered arrangement to allow more cells to be disposed closer together than in square columns and rows like in a grid pattern. The staggered arrangement may also be configured to allow better thermodynamic dissipation, the methods of which may be further disclosed hereinbelow. Cell retainer 208 may comprise staggered openings that align with battery cells 204 and further configured to hold battery cells 204 in fixed positions. Cell retainer 208 may comprise an injection molded component. Injection molded component may comprise a component manufactured by injecting a liquid into a mold and letting it solidify, taking the shape of the mold in its hardened form. Cell retainer 208 may comprise liquid crystal polymer, polypropylene, polycarbonate, acrylonitrile butadiene styrene, polyethylene, nylon, polystyrene, polyether ether ketone, to name a few. Cell retainer 208 may comprise a second cell retainer fixed to the second end of battery cells 204 and configured to hold battery cells 204 in place from both ends. The second cell retainer may comprise similar or the exact same characteristics and functions of first cell retainer 208. Battery module 200 may also comprise cell guide 212. Cell guide 212 includes material disposed in between two rows of battery cells 204. In embodiments, cell guide 212 can be configured to distribute heat that may be generated by battery cells 204.

According to embodiments, battery module 200 may also comprise back plate 220. Back plate 220 is configured to provide a base structure for battery module 200 and may encapsulate at least a portion thereof. Backplate 220 can have any shape and includes opposite, opposing sides with a thickness between them. In embodiments, back plate 220 may comprise an effectively flat, rectangular prism shaped sheet. For example, back plate 220 can comprise one side of a larger rectangular prism which characterizes the shape of battery module 200 as a whole. Back plate 220 also comprises openings correlating to each battery cell 204 of the plurality of battery cells 204. Back plate 220 may comprise a lamination of multiple layers. The layers that are laminated together may comprise FR-4, a glass-reinforced epoxy laminate material, and a thermal barrier of a similar or exact same type as disclosed hereinabove. Back plate 220 may be configured to provide structural support and containment of at least a portion of battery module 200 as well as provide fire and thermal protection.

According to embodiments, battery module 200 may also comprise first end cap 224 configured to encapsulate at least a portion of battery module 200. End cap 224 may provide structural support for battery module 200 and hold back plate 220 in a fixed relative position compared to the overall battery module 200. End cap 224 may comprise a protruding boss on a first end that mates up with and snaps into a receiving feature on a first end of back plate 220. End cap 224 may comprise a second protruding boss on a second end that mates up with and snaps into a receiving feature on sense board.

Battery module 200 may also comprise at least a side panel 228 that may encapsulate two sides of battery module 200. Side panel 228 may comprise opposite and opposing faces comprising a metal or composite material. In the illustrative embodiment of FIG. 2, a second side panel 228 is present but not illustrated so that the inside of battery module 200 may be presented. Side panel(s) 228 may provide structural support for battery module 200 and provide a barrier to separate battery module 200 from exterior components within aircraft or environment.

Figure 3:
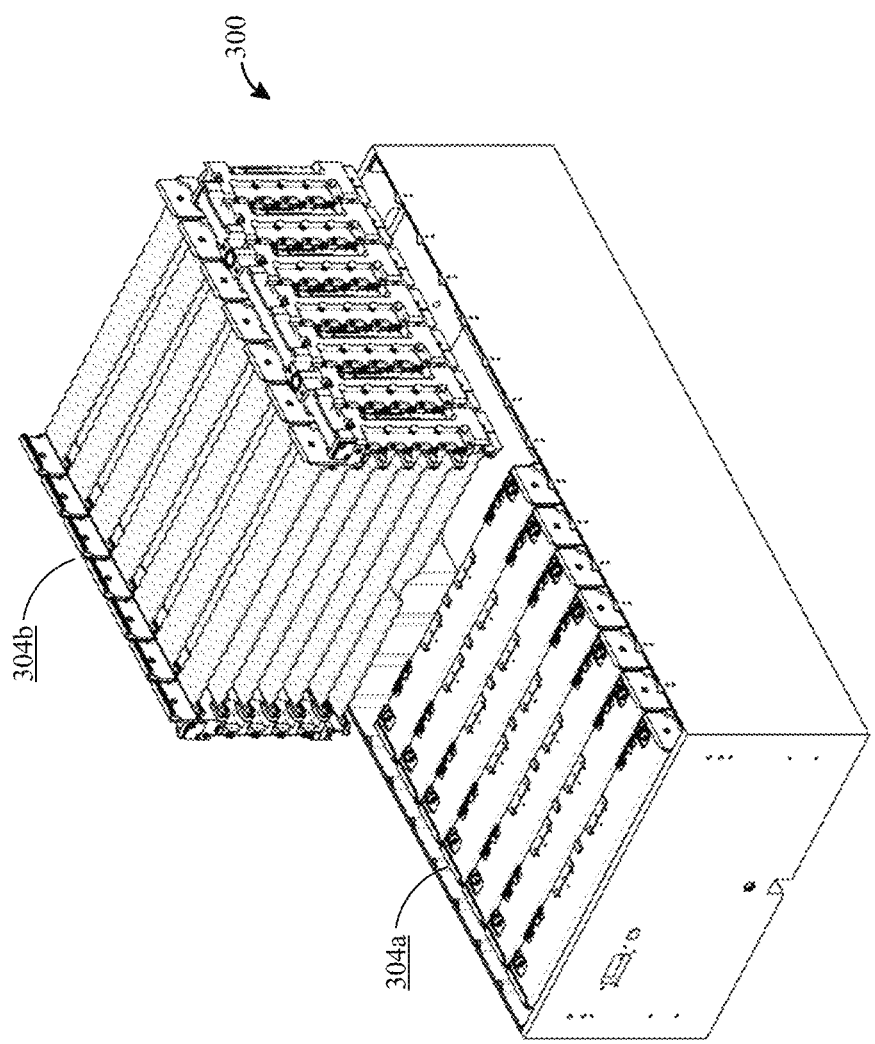
FIG. 3 is a schematic of an exemplary aircraft battery pack having a cooling circuit.

Referring now to FIG. 3, schematically illustrates an exemplary aircraft battery 300, in an isometric view. In some cases, aircraft battery 300 includes at least a cooling circuit 304. FIG. 3 illustrates aircraft battery 300 with one cooling circuit installed 304a and one cooling circuit uninstalled 304b. In some embodiments, battery 300 may include two or more cooling circuits 304a-b. Cooling circuits may be configured to allow coolant flow proximal battery module. In some cases, a thermal gradient between coolant and battery modules cools aircraft battery 300. Aircraft battery may be any type of battery described in this disclosure.

Figure 4:
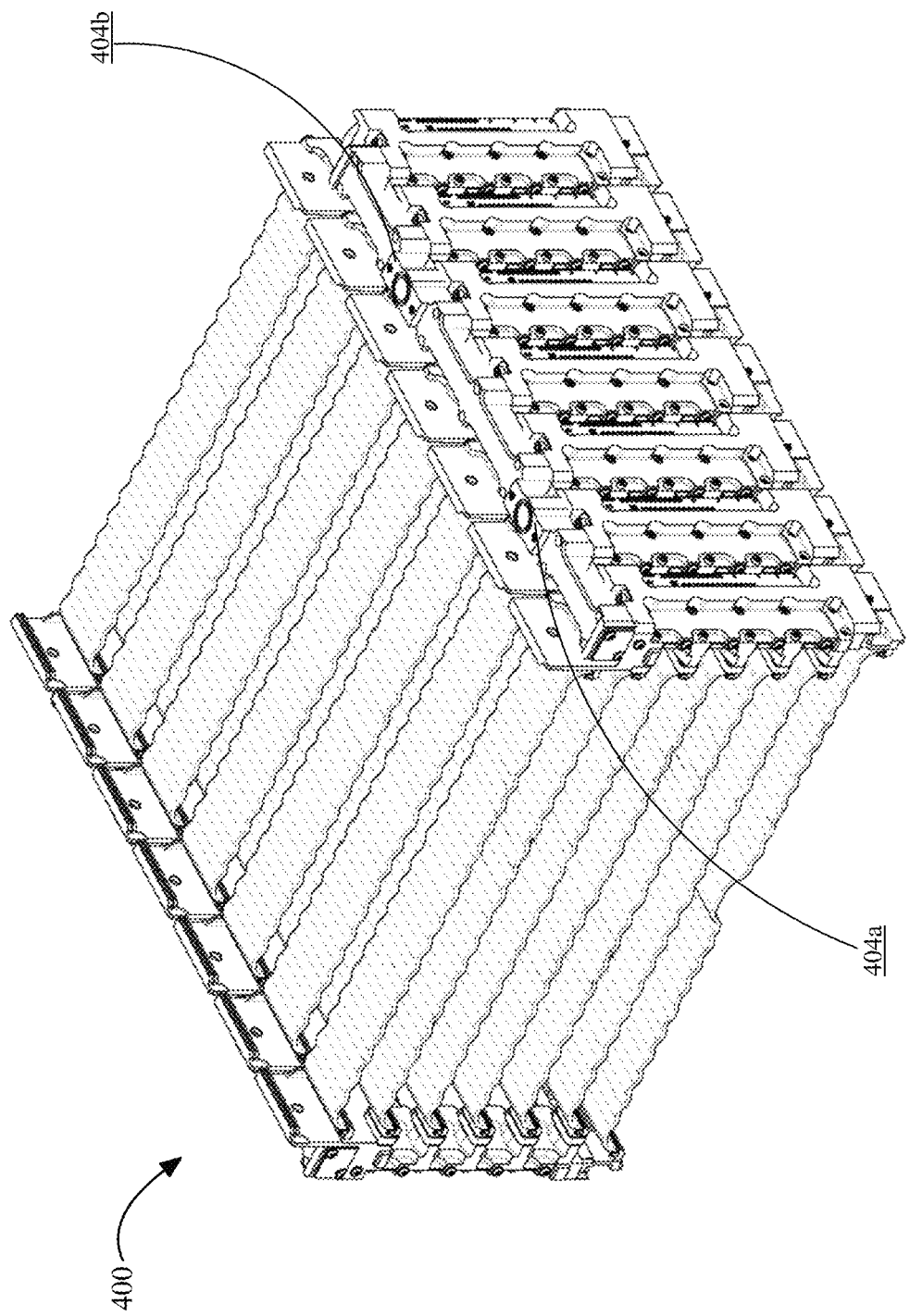
FIG. 4 schematically illustrates an exemplary cooling circuit.

Referring now to FIG. 4, schematically illustrates an exemplary cooling circuit 400, in an isometric view. In some cases, aircraft battery 300 may include a cooling circuit 400. Cooling circuit 400 may be configured to accept coolant flow, for example from connector and/or hose, and direct coolant proximal battery module and/or battery cells. In some cases, cooling circuit 400 may be configured to direct flow of coolant out of cooling circuit after it has passed through cooling circuit. In some cases, cooling circuit 400 may be configured to return coolant, for example to coolant source by way of one or more of connector and/or hose. Alternatively and/or additionally, cooling circuit 400 may direct or vent coolant out of cooling circuit substantially to atmosphere. In some embodiments, cooling circuit 400 may comprise one or more coolant fittings 404a-b. Coolant fittings 404a-b may be configured to accept a flow of coolant, for example from a coolant supply. Alternatively or additionally, coolant fittings 404a-b may be configured to return a flow of coolant, for example by way of a coolant return.

Figure 5:
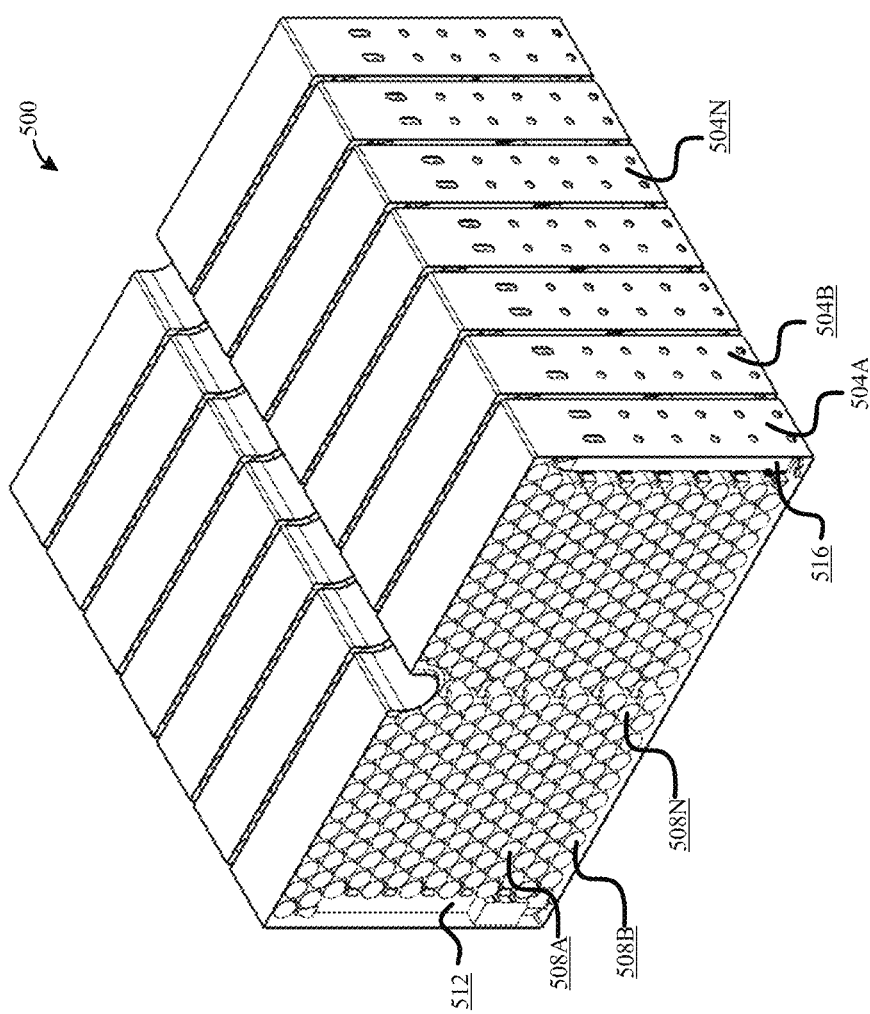
FIG. 5 is perspective drawings illustrating a battery pack, according to embodiments.

Referring now to FIG. 5, a perspective drawing of an embodiment of a battery pack with a plurality of battery modules disposed therein 500. The configuration of battery pack 500 is merely exemplary and should in no way be considered limiting. Battery pack 500 is configured to facilitate the flow of the media through each battery module of the plurality of battery modules to cool the battery pack. Battery pack 500 can include one or more battery modules 504A-N. Battery pack 500 is configured to house and/or encase one or more battery modules 504A-N. Each battery module of the plurality of battery modules 504A-N may include any battery module as described in further detail in the entirety of this disclosure. As an exemplary embodiment, FIG. 5 illustrates 7 battery modules 504A-N creating battery pack 500, however, a person of ordinary skill in the art would understand that any number of battery modules 504A-N may be housed within battery pack 500. In an embodiment, each battery module of the plurality of battery modules 504A-N can include one or more battery cells 508A-N. Each battery module 504A-N is configured to house and/or encase one or more battery cells 508A-N. Each battery cell of the plurality of battery cells 508A-N may include any battery cell as described in further detail in the entirety of this disclosure. Battery cells 508A-N may be configured to be contained within each battery module 504A-N, wherein each battery cell 508A-N is disposed in any configuration without limitation. As an exemplary embodiment, FIG. 5 illustrates 240 battery cells 508A-N housed within each battery module 504A-N, however, a person of ordinary skill in the art would understand that any number of battery units 508A-N may be housed within each battery module 504A-N of battery pack 500. Further, each battery module of the plurality of battery modules 504A-N of battery pack 500 includes circuit 512. Circuit 512 may include any circuit as described in further detail in the entirety of this disclosure. Each battery module of the plurality of battery modules 504A-N further includes second circuit 516. Second circuit 516 may include any circuit as described in further detail in the entirety of this disclosure. Persons skilled in the art, upon reviewing the entirety of this disclosure, will be aware of various configurations of the plurality of battery modules that may be utilized for the battery pack consistently with this disclosure.

Figure 6:
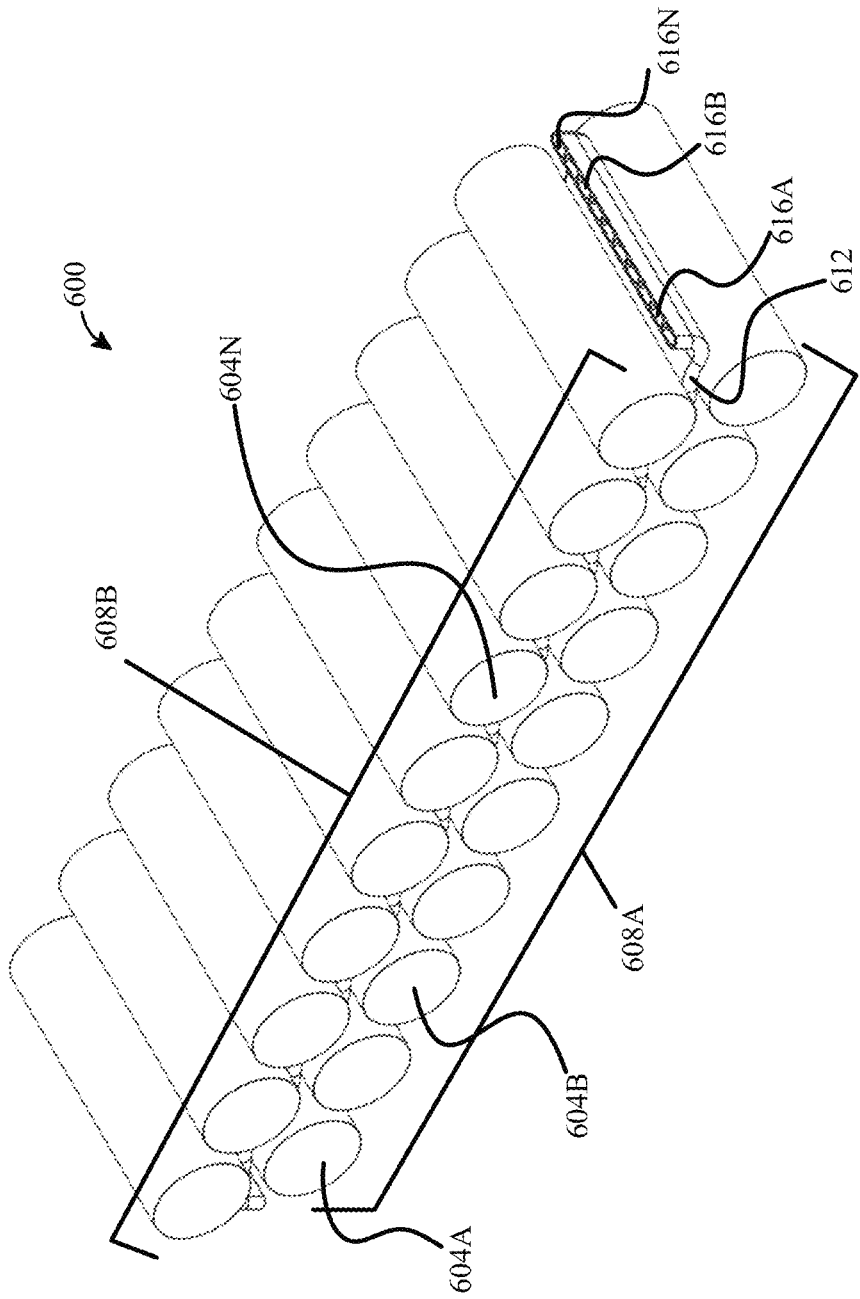
FIG. 6 is a perspective view illustrating a battery unit, according to embodiments.

Referring now to FIG. 6, a perspective view of an embodiment battery unit 600 is illustrated. Battery unit 600 may be configured to couple to one or more other battery units, wherein the combination of two or more battery units 600 forms at least a portion of a power source 108. Battery unit 600 is configured to include a plurality of battery cells 604A-N. The plurality of battery cells 604A-N may include any battery cell as described in the entirety of this disclosure. In the instant embodiment, for example and without limitation, battery unit 600 includes a first row 608A of battery cells 604A-N, wherein first row 608A of battery cells 604A-N is in contact with the first side of the thermal conduit, as described in further detail below. As a non-limiting example, row 608A of battery cells 604A-N is configured to contain ten columns of battery cells. Further, in the instant embodiment, for example and without limitation, battery unit 600 includes a second row 608B of battery cells 604A-N, wherein second row 608B of battery cells 604A-N is in contact with the second side of the thermal conduit, as described in further detail below. As a non-limiting example, second row 608B of battery cells 604A-N is configured to contain ten columns of battery cells. In the embodiment of FIG. 6, battery unit 600 is configured to contain twenty battery cells 604A-N in first row 608A and second row 608B. Battery cells 604A-N of battery unit 600 may be arranged in any configuration, such that battery unit 600 may contain any number of rows of battery cells and any number of columns of battery cells. Though the illustrated embodiment of FIG. 6 presents one arrangement for battery unit 600, one of skill in the art will understand that any number of arrangements may be used. In embodiments, battery unit 600 may contain any offset of distance between first row 608A of battery cells 604A-N and second row 608B of battery cells 604A-N, wherein the battery cells 604A-N of first row 608A and the battery cells 604A-N of second row 608B are not centered with each other. In the instant embodiment, for example and without limitation, battery unit 600 includes first row 608A and adjacent second row 608B each containing ten battery cells 604A-N, each battery cell 604 of first row 608A and each battery cell 604 of second row 608B are shifted a length measuring the radius of a battery cell, wherein the center of each battery cell 604 of first row 608A and each battery cell 604 of second row 608B are separated from the center of the battery cell in the adjacent column by a length equal to the radius of the battery cell. As a further example and without limitation, each battery cell of 604 of first row 608A and each battery cell 604 of second row 608B are shifted a length measuring a quarter the diameter of each battery cell, wherein the center of each battery cell of first row 608A and each battery cell of second row 608B are separated from the center of a battery cell in the adjacent column by a length equal to a quarter of the diameter of the battery cell. First row 608A of battery cells 604A-N and second row 608B of battery cells 604A-N of the at least a battery unit 600 may be configured to be fixed in a position by utilizing a cell retainer, as described in the entirety of this disclosure. The arrangement of the configuration of each battery cell 604A-N of first row 608A and each battery cell 604A-N of second row 608B of battery unit 600 in FIG. 6 is a non-limiting embodiment and in no way precludes other arrangements of each battery cell 604A-N of first row 608A and/or second row 608B. Each battery cell 604A-B may be connected utilizing any means of connection as described in the entirety of this disclosure. Persons skilled in the art, upon reviewing the entirety of this disclosure, will be aware of electrical connections that may be used to connect each battery cell consistently with this disclosure.

With continued reference to FIG. 6, in embodiments, battery unit 600 can include thermal conduit 612, wherein thermal conduit 612 has a first surface and a second opposite and opposing surface. Thermal conduit 612 may include any thermal conduit as described above in further detail in reference to FIGS. 1-5. The height of thermal conduit 612 may not exceed the height of battery cells 604A-N, as described in the entirety of this disclosure. For example and without limitation, in the embodiment of FIG. 6, the thermal conduit 612 is at a height that is equal to the height of each battery cell 604 of first row 608A and second row 608B. Thermal conduit 612 may be composed of any suitable material, as described above in further detail in reference to FIGS. 1-5. Thermal conduit 612 is configured to include an indent in the component for each battery cell 604 coupled to the first surface and/or the second surface of thermal conduit 612. Persons skilled in the art, upon reviewing the entirety of this disclosure, will be aware of components that may be used as thermal conduits consistently with this disclosure.

With continued reference to FIG. 6, thermal conduit 612, in embodiments, includes at least a passage 616A-N, wherein the at least a passage 616A-N comprises an opening starting at the first end of thermal conduit 612 and terminating at a second, opposing end of thermal conduit 612. The "passage", as described herein, is a horizontal channel with openings on each end of the thermal conduit. The at least a passage 616A-N is configured to have a hollow shape comprising one or more sides, at least two ends (e.g. a top and a bottom), and a length, wherein the hollow shape comprises a void having a shape the same as or different from the shape of the at least a passage 616A-N and terminating at an opposite, opposing second end of the shape. For example and without limitation, in the illustrative embodiment of FIG. 6, the at least a passage 616A-N comprise a rectangle shaped tubular shape. In embodiments, the tubular component runs effectively perpendicular to each battery cell 604A-N. In embodiments, the at least a passage 616A-N can be disposed such that it forms a void originating at a first side of the battery module and terminating at the second, opposite, and opposing side, of the battery module. According to embodiments, the at least a passage 616A-N and/or thermal conduit 612 may be composed utilizing any suitable material. For example and without limitation, thermal conduit 612 and/or the at least a passage 616A-N may be composed of polypropylene, polycarbonate, acrylonitrile butadiene styrene, polyethylene, nylon, polystyrene, polyether ether ketone, and the like.

With continued reference to FIG. 6, in embodiments, the at least a passage 616A-N may be disposed in the thermal conduit 612 such that the at least a passage is configured to allow the travel of a media from a first end of thermal conduit 612 to the second, opposite, and opposite end of thermal conduit 612. For example, the at least a passage 616A-N can be disposed to allow the passage of the media through the hollow opening/void of the at least a passage 616A-N. The media may include any media as described in the entirety of this disclosure. The hollow opening of thermal conduit 612 and/or the at least a passage 616A-N may be configured to be of any size and/or diameter. For example and without limitation, the hollow opening of the at least a passage 616A-N may be configured to have a diameter that is equal to or less than the radius of each battery cell 604A-N. The at least a passage 616A-N and/or thermal conduit 612 may have a length equal or less than the length of one row of battery cells 604A-N such that thermal conduit and/or the at least a passage is configured to not exceed the length of first row 608A and/or second row 608B of battery cells 604A-N. The opening of the at least a passage 616A-N can be configured to be disposed at each end of thermal conduit 612, wherein the at least a passage 616A-N may be in contact with each battery cell 604A-N in a respective battery unit 600 located at the end of each column and/or row of the battery unit 600. For example and without limitation, in the illustrative embodiment of FIG. 6, a battery unit 600 can contain two rows with ten columns of battery cells 604A-N and the opening of the at least a passage 616A-N on each end of thermal conduit 612 that is in contact with a respective battery cell 604A-N at the end of each of the two columns. Persons skilled in the art, upon reviewing the entirety of this disclosure, will be aware of various components that may be used as at least a passage consistently with this disclosure.

Figure 7:
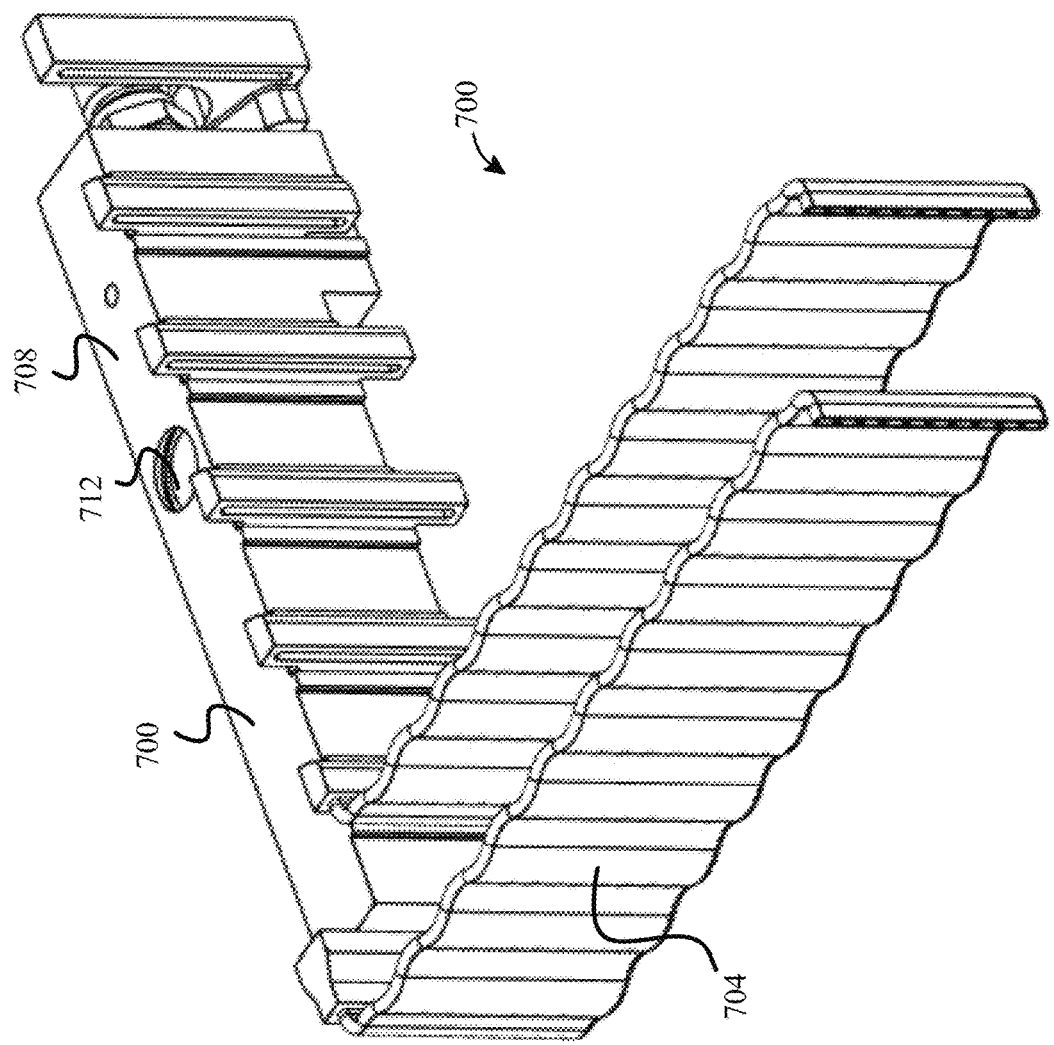
FIG. 7 is a prospective view illustrating a circuit coupled to a thermal conduit, according to embodiments.

Referring now to FIG. 7, an embodiment of circuit 700 coupled to thermal conduit 704 is illustrated. The configuration of circuit 700 and thermal conduit 704 is merely exemplary and should in no way be considered limiting. Circuit 700 and/or thermal conduit 704 is configured to facilitate the flow of the media through each battery module of the plurality of battery modules to cool the battery pack. The media may include any media described in further detail in the entirety of this disclosure. Circuit 700 can include any circuit as described above in further detail in reference to FIGS. 1-6. In the embodiment, circuit 700 is configured to couple to the first end of thermal conduit 704, wherein coupling is configured to facilitate the flow of the media from the circuit 700 to the first end of thermal conduit 704 through the at least a passage. The embodiment of FIG. 7 illustrates one configuration of circuit 700 coupled to thermal conduit 704, however this is non-limiting and may include circuit 700 coupled to thermal conduit 704 in any configuration. Coupling may include any coupling as described in further detail throughout the entirety of this disclosure. Circuit 700 may include any component configured to facilitate the flow of media to the battery pack by utilizing an electrical current. For example and without limitation, circuit 700 may include a printed circuit board, wherein the printed circuit board mechanically supports the electrical connection facilitating the flow of media to the battery pack. Circuit 700 is configured to include first end 708 and a second end, wherein the second end is opposite the first end of circuit 700. In the illustrated embodiment of FIG. 7, first end 708 of circuit 700 is in a plane perpendicular to the longitudinal axis of thermal conduit 704. First end 708 of circuit 700 is configured to include media feed component 712. The embodiment of circuit 700 illustrates media feed component 712 disposed only on first side 708 of circuit 700, however this is non-limiting and circuit 700 may include media feed component 712 disposed on the second end of circuit 700. The media feed component of circuit 700 is configured to allow the media to feed into circuit 700, the battery module and/or the battery pack, wherein the flow of media is initiated as a function of coupling media feed component 712 of circuit 700 to the media feeder of the thermal management apparatus. Media feed component 712 can include any media feed component as described in further detail above in reference to FIGS. 1-6. In the illustrated embodiment of FIG. 7, media feed component 712 is a threaded hole, wherein the media feeder of the thermal management apparatus is configured to couple to the threaded hole of media feed component 712, however this is non-limiting and media feed component may include, without limitation, a magnetic component, a latching mechanism, a pressure fit tubing mechanism, a nozzle mechanism, a hole, a flap, and the like.

With continued reference to FIG. 7, thermal conduit 704 can include any thermal conduit as described in further detail above in reference to FIGS. 1-4. The height of thermal conduit 704 may not exceed the height of each battery cell of the plurality of battery cells, as described in the entirety of this disclosure. Thermal conduit 704 may be composed of any suitable material, as described above in further detail in reference to FIGS. 1-6. Thermal conduit 704 may be configured to include any curvature of the first side and/or second side of thermal conduit 704. For example and without limitation the curvature of the first side and/or second side of thermal conduit 704 correlates at least a portion of a battery cell of the plurality of battery cells. As a further example and without limitation, in an embodiment, thermal conduit 704 is configured to include ten curves of the first surface of thermal conduit, wherein each curve is configured to contain the at least a portion of each battery cell of the plurality of battery cells adjacent to the first surface of thermal conduit 704. As a further example and without limitation, in the embodiment of FIG. 7, thermal conduit 704 is configured to include ten curves on the second surface of thermal conduit 704 wherein each curve is configured to contain the at least a portion of each battery cell of the plurality of battery cells adjacent to the second surface of thermal conduit 704. The embodiment of thermal conduit 704 illustrates ten curves on each surface of thermal conduit 704, however this is non-limiting and thermal conduit may include any number of curves on each surface of thermal conduit 704, wherein each curve corresponds to the at least a portion of a battery cell of the plurality of battery cells.

Figure 8:
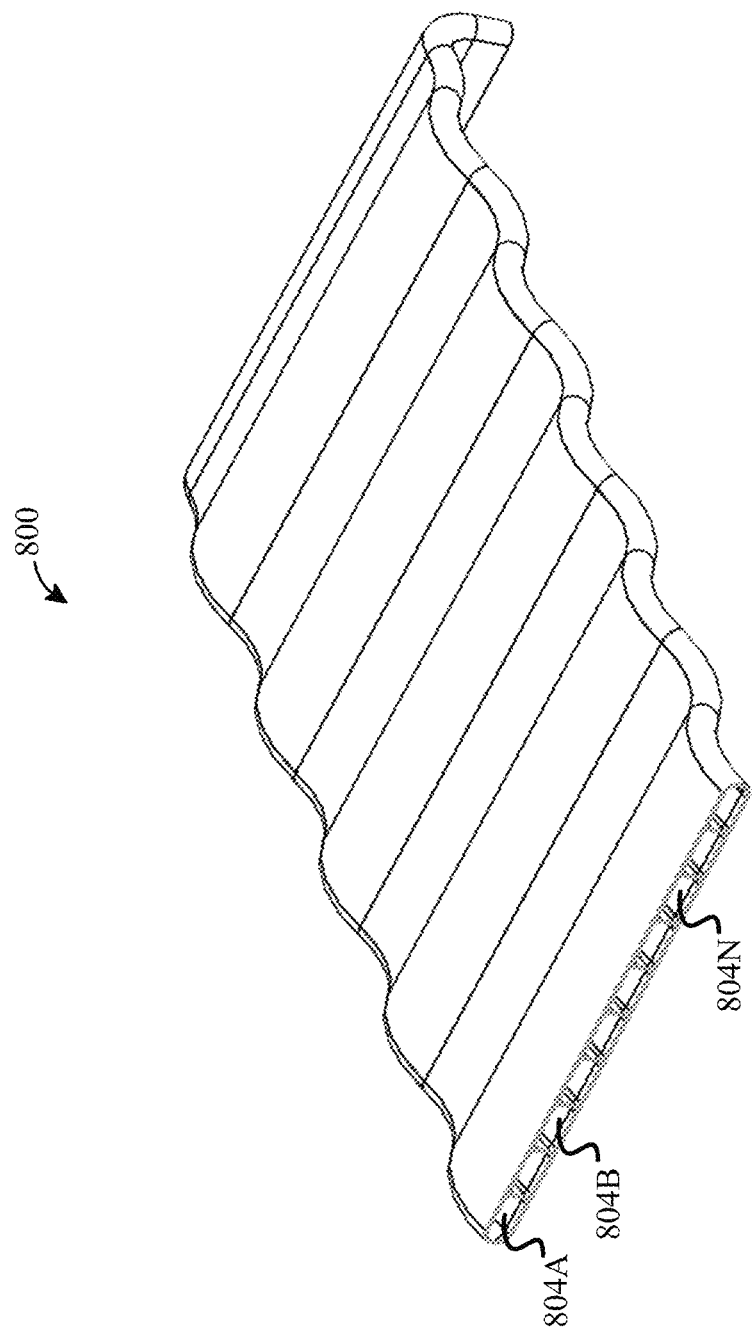
FIG. 8 is a cross-sectional view illustrating a thermal conduit, according to embodiments.

Referring now to FIG. 8, a cross-sectional view of thermal conduit 800 is presented. Thermal conduit 800 can include any thermal conduit as described in further detail above in reference to FIGS. 1-7. As described in further detail above in reference to FIGS. 1-7, thermal conduit 800 may be composed of any suitable material. Further, thermal conduit 800 may be configured to include any curvature of the first side and/or second side of the thermal conduit 800, as described in further detail in reference to FIGS. 1-7. Thermal conduit 800 is configured to at least a passage 804A-N. The at least a passage 804A-N can include any at least a passage as described in further detail above in reference to FIGS. 1-7. The at least a passage 804A-N is configured to have a hollow shape comprising one or more sides, at least two ends (e.g. a top and a bottom), and a length, wherein the hollow shape comprises a void having a shape the same as or different from the shape of the at least a passage 804A-N and terminating at an opposite, opposing second end of the shape, as described above in further detail above in reference to FIGS. 1-7. For example and without limitation, in the illustrative embodiment of FIG. 8, the at least a passage 804A-N comprise a rectangle shaped tubular shape. In embodiments, the tubular component runs effectively perpendicular to each battery cell and/or curvature of thermal conduit 800 configured to house each battery cell. In embodiments, the at least a passage 804A-N can be disposed such that it forms a void originating at a first side of the battery module and terminating at the second, opposite, and opposing side, of the battery module, as described in further detail in the entirety of this disclosure. According to embodiments, the at least a passage 804A-N and/or thermal conduit 800 may be composed utilizing any suitable material, as described in further detail above in reference to FIGS. 1-7. In embodiments, the at least a passage 804A-N may be disposed in the thermal conduit 800 such that the at least a passage is configured to allow the travel of a media from a first end of thermal conduit 800 to the second, opposite, and opposite end of thermal conduit 800, as described in further detail in the entirety of this disclosure.

Figure 9A:
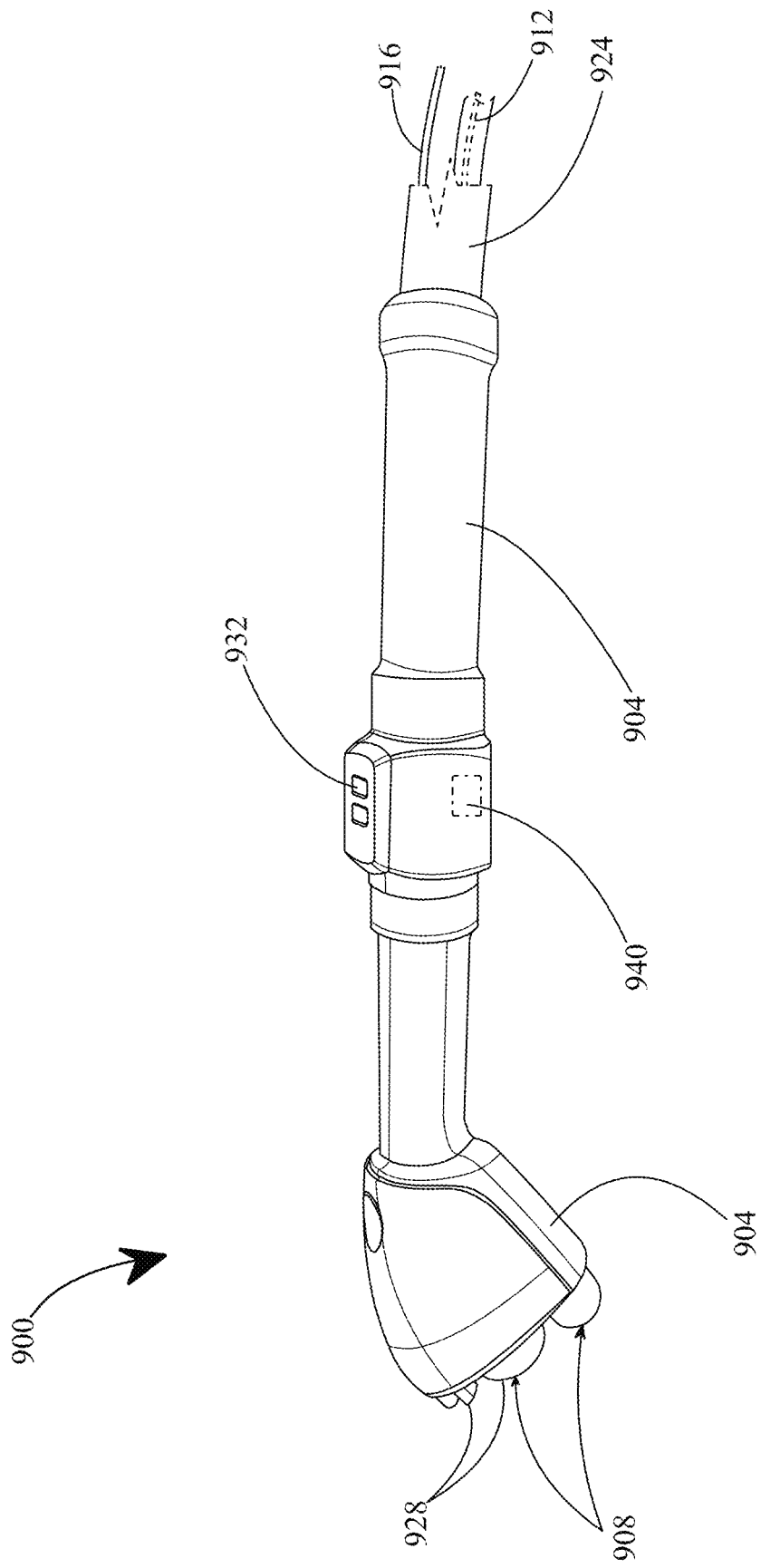
FIGS. 9A and 9B are exemplary schematics of exemplary embodiments of a portion of a cable module.
Figure 9B:
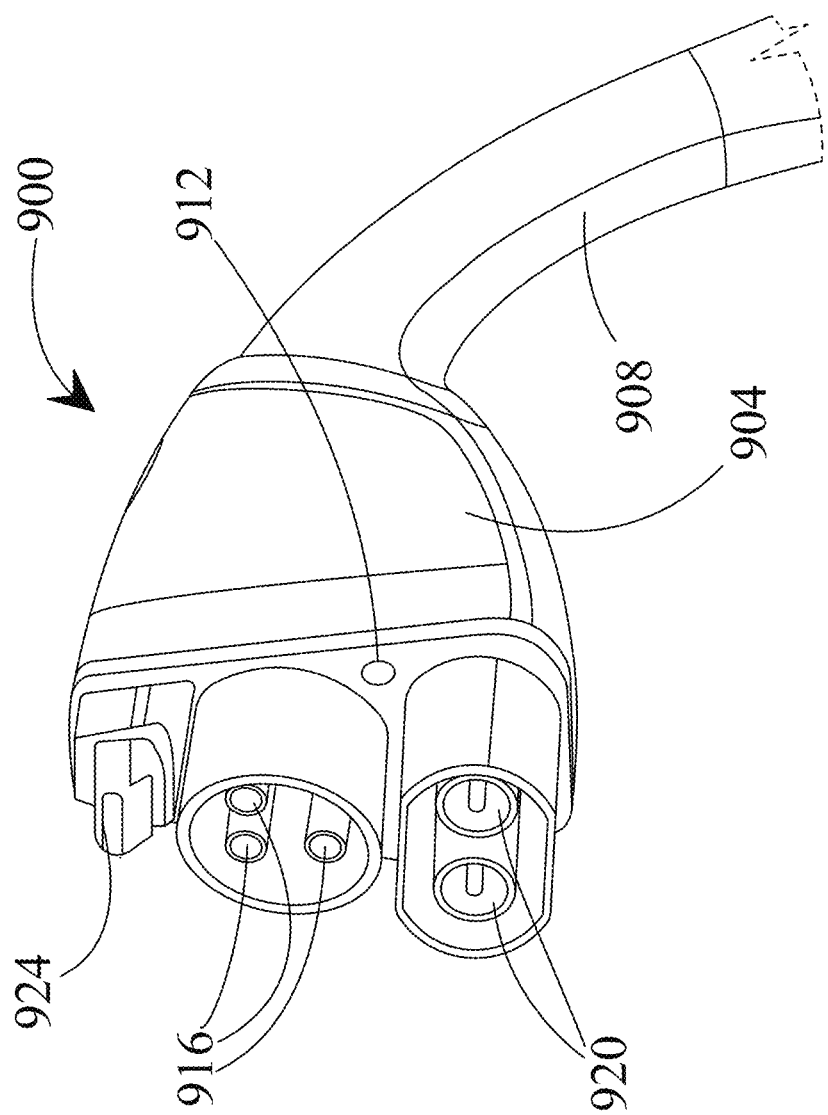

Now referring to FIGS. 9A and 9B, exemplary schematics of exemplary embodiments of a portion of a cable module 112 are illustrated. The cable module 112 may be consistent with a connector 900 disclosed herein. As shown in FIG. 9A, a connector 900 (also referred to herein as a "connector") facilitates transfer of electrical power between a power source of a charging station and an electric aircraft, such as a power source of the electric aircraft and/or electrical systems of the electric aircraft. In some cases, and without limitation, an energy source may include a battery and charging may include providing electrical power, such as an electrical current, to the battery.

In one or more embodiments, and still referring to FIG. 9A, connector 900 may include a distal end of a flexible tether 924 or a bundle of tethers, e.g., hose, tubing, cables, wires, and the like, attached to a charging unit, such as a charging station or charger. Connector 900 is configured to connect charging unit to an electric aircraft to create an electrical communication between charging unit and electric aircraft, as discussed further in this disclosure. Connector 900 may be configured to removably attach to a port of electric aircraft using, for example, a mating component 928. As used in this disclosure, a "port" is an interface for example of an interface configured to receive another component or an interface configured to transmit and/or receive signal on a computing device. For example, and without limitation, in the case of an electric aircraft port, the port interfaces with a number of conductors 908 and/or a cooling channel 920 by way of receiving connector 900. In the case of a computing device port, the port may provide an interface between a signal and a computing device. A connector may include a male component having a penetrative form and port may include a female component having a receptive form, receptive to the male component. Alternatively or additionally, connector may have a female component and port may have a male component. In some cases, connector may include multiple connections, which may make contact and/or communicate with associated mating components within port, when the connector is mated with the port.

With continued reference to FIG. 9A, connector 900 may include a casing 904. In some cases, casing 904 may protect internal components of connector 900. Casing 904 may be made from various materials, such as metal alloy, aluminum, steel, plastic, synthetic material, semi-synthetic material, polymer, and the like. In some embodiments, casing 904 may be monolithic. In other embodiments, casing 904 may include a plurality of assembled components. Casing 904 and/or connector 900 may be configured to mate with a port of an electric aircraft using a mating component 928. Mating component 928 may include a mechanical or electromechanical mechanism described in this disclosure. For example, without limitation mating may include an electromechanical device used to join electrical conductors and create an electrical circuit. In some cases, mating component 928 may include gendered mating components. Gendered mating components may include a male component, such as a plug, which is inserted within a female component, such as a socket. In some cases, mating between mating components may be removable. In some cases, mating between mating components may be permanent. In some cases, mating may be removable, but require a specialized tool or key for removal. Mating may be achieved by way of one or more of plug and socket mates, pogo pin contact, crown spring mates, and the like. In some cases, mating may be keyed to ensure proper alignment of connector 900. In some cases, mate may be lockable. In one or more embodiments, casing 904 may include controls 932. The controls 932 may be consistent with a user input device 156. Controls 932 may be actuated by a user to initiate, terminate, and/or modify parameters charging. For example, and without limitation, a button of controls 932 may be depressed by a user to initiate a transfer of electrical power from charging unit to electric aircraft. Controls 932 may include buttons, switches, slides, a touchscreen, joystick, and the like. In some embodiments, controls 932 may include a screen that displays information related to the charging of an energy source. For example, and without limitation, screen may display an amperage or voltage of electrical power being transferred to energy source of electric aircraft. Screen may also display a calculated amount of time until energy source is charged to a desired amount (e.g., desired state of charge). Screen may also display data detected by components, such as a sensor, of connector and/or electric aircraft. For example, and without limitation, screen may display a temperature of an energy source of electric aircraft. In an exemplary embodiment, a user may actuate, for example, a switch, of control 932 to initiate a cooling of a component of connector 900 and/or electric aircraft in response to displayed information and/or data on screen of connector 900. Initiating of a cooling of one or more embodiments of connector 900 may include a coolant source displacing a coolant within a cooling channel, as discussed further in this disclosure below. Controlling a transmission of electrical power and/or charging of an electric aircraft using a connector may be consistent with charging described in U.S. Nonprovisional application Ser. No. 17/405,840, filed on Aug. 18, 9021, and entitled "CONNECTOR AND METHODS OF USE FOR CHARGING AN ELECTRIC AIRCRAFT", U.S. Nonprovisional application Ser. No. 17/407,358, filed on Aug. 90, 9021, and entitled "CONNECTOR AND METHOD FOR USE FOR AUTHORIZING BATTERY CHARGING FOR AN ELECTRIC AIRCRAFT", U.S. Nonprovisional application Ser. No. 17/515,508, filed on Oct. 31, 9021, and entitled "CONNECTOR WITH AMBIENCE MONITORING CAPABILITY AND METHODS OF USE FOR CHARGING AN ELECTRIC AIRCRAFT", the entirety of each one of which is incorporated herein by reference.

With continued reference to FIG. 9A, mating component 928 of casing 904 may include a fastener. As used in this disclosure, a "fastener" is a physical component that is designed and/or configured to attach or fasten two or more components together. Connector 900 may include one or more attachment components or mechanisms, for example without limitation fasteners, threads, snaps, canted coil springs, and the like. In some cases, connector may be connected to port by way of one or more press fasteners. As used in this disclosure, a "press fastener" is a fastener that couples a first surface to a second surface when the two surfaces are pressed together. Some press fasteners include elements on the first surface that interlock with elements on the second surface; such fasteners include without limitation hook-and-loop fasteners such as VELCRO fasteners produced by Velcro Industries B.V. Limited Liability Company of Curacao Netherlands, and fasteners held together by a plurality of flanged or "mushroom"-shaped elements, such as 3M DUAL LOCK fasteners manufactured by 3M Company of Saint Paul, Minnesota. Press-fastener may also include adhesives, including reusable gel adhesives, GECKSKIN adhesives developed by the University of Massachusetts in Amherst, of Amherst, Massachusetts, or other reusable adhesives. Where press-fastener includes an adhesive, the adhesive may be entirely located on the first surface of the press-fastener or on the second surface of the press-fastener, allowing any surface that can adhere to the adhesive to serve as the corresponding surface. In some cases, connector may be connected to port by way of magnetic force. For example, connector may include one or more of a magnetic, a ferro-magnetic material, and/or an electromagnet. Fastener may be configured to provide removable attachment between connector 900 and port of electric aircraft. As used in this disclosure, "removable attachment" is an attributive term that refers to an attribute of one or more relata to be attached to and subsequently detached from another relata; removable attachment is a relation that is contrary to permanent attachment wherein two or more relata may be attached without any means for future detachment. Exemplary non-limiting methods of permanent attachment include certain uses of adhesives, glues, nails, engineering interference (i.e., press) fits, and the like. In some cases, detachment of two or more relata permanently attached may result in breakage of one or more of the two or more relata.

With continued reference to FIG. 9A, connector 900 may include a controller 940. Connector 900 may include one or more charging cables that each include a conductor 908, which has a distal end approximately located within connector 900 and a proximal end approximately located at an energy source of charging unit. As used in this disclosure, a "conductor" is a component that facilitates conduction. As used in this disclosure, "conduction" is a process by which one or more of heat and/or electricity is transmitted through a substance, for example, when there is a difference of effort (i.e., temperature or electrical potential) between adjoining regions. In some cases, conductor 908 may be configured to charge and/or recharge electric aircraft. For instance, conductor 908 may be connected to an energy source of a charging unit and conductor may be designed and/or configured to facilitate a specified amount of electrical power, current, or current type. For example, conductor 908 may include a direct current conductor. As used in this disclosure, a "direct current conductor" is a conductor configured to carry a direct current for recharging an energy source of electric aircraft. As used in this disclosure, "direct current" is one-directional flow of electric charge. In some cases, conductor may include an alternating current conductor. As used in this disclosure, an "alternating current conductor" is a conductor configured to carry an alternating current for recharging an energy source of electric aircraft. As used in this disclosure, an "alternating current" is a flow of electric charge that periodically reverse direction; in some cases, an alternating current may change its magnitude continuously with in time (e.g., sine wave).

In one or more embodiments, and still referring to FIG. 9A, conductor 908 may include a high-voltage conductor 912. In a non-limiting embodiment, high-voltage conductor 912 may be configured for a potential no less than 900 V. In some embodiments, high-voltage conductor may include a direct current (DC) conductor. High-voltage conductor 912 may include a DC conductor pin, which extends from casing 904 and allows for the flow of DC power into and out of the electric aircraft via port. In other embodiments, high-voltage conductor 912 may include an alternating current (AC) conductor. An AC conductor may include any component responsible for the flow of AC power into and out of the electric aircraft. The AC conductor may include a pin that extends from casing 904 that may allow for a transfer of electrical power between connector and power source of electrical aircraft. In some embodiments, a pin of high-voltage conductor 912 may include a live pin, such that the pin is the supply of DC or AC power. In other embodiments, pin of high-voltage conductor 912 may include a neutral pin, such that the pin is the return path for DC or AC power.

With continued reference to FIG. 9A, conductor may include a low-voltage conductor 916. In a non-limiting embodiment, low-voltage conductor 916 may be configured for a potential no greater than 900 V. Low-voltage conductor 916 may be configured for AC or DC current. In one or more embodiments, low-voltage conductor 916 may be used as an auxiliary charging connector to power auxiliary equipment of electric aircraft. In some embodiments, auxiliary equipment may only be powered using low-voltage conductor 916 such that auxiliary equipment is not powered after charging, thus, auxiliary equipment may be off during in-flight activities.

With continued reference to FIG. 9A, high-voltage conductor 912 and low-voltage conductor 916 may receive an electrical charging current from an energy source of charging unit In some cases, energy source may include a charging battery (i.e., a battery used for charging other batteries). A charging battery is notably contrasted with an electric aircraft energy source or battery, which is located for example upon electric aircraft. As used in this disclosure, an "electrical charging current" is a flow of electrical charge that facilitates an increase in stored electrical energy of an energy storage, such as without limitation a battery. Charging battery may include a plurality of batteries, battery modules, and/or battery cells. Charging battery may be configured to store a range of electrical energy, for example a range of between about 5 KWh and about 5,000 KWh. Energy source may house a variety of electrical components. In one embodiment, energy source may contain a solar inverter. Solar inverter may be configured to produce on-site power generation. In one embodiment, power generated from solar inverter may be stored in a charging battery. In some embodiments, charging battery may include a used electric aircraft battery no longer fit for service in an aircraft.

In some embodiments, and still referring to FIG. 9A, charging battery may have a continuous power rating of at least 350 kVA. In other embodiments, charging battery may have a continuous power rating of over 350 kVA. In some embodiments, charging battery may have a battery charge range up to 950 Vdc. In other embodiments, charging battery may have a battery charge range of over 950 Vdc. In some embodiments, charging battery may have a continuous charge current of at least 350 amps. In other embodiments, charging battery may have a continuous charge current of over 350 amps. In some embodiments, charging battery may have a boost charge current of at least 500 amps. In other embodiments, charging battery may have a boost charge current of over 500 amps. In some embodiments, charging battery may include any component with the capability of recharging an energy source of an electric aircraft. In some embodiments, charging battery may include a constant voltage charger, a constant current charger, a taper current charger, a pulsed current charger, a negative pulse charger, an IUI charger, a trickle charger, and a float charger.

In one or more embodiments, and still referring to FIG. 9A, conductor 908 may be an electrical conductor, for example, a wire and/or cable, as previously mentioned above in this disclosure. Exemplary conductor materials may include metals, such as without limitation copper, nickel, steel, and the like. In one or more embodiments, conductor may be disposed within an insulation, such as an insulation sleeve that conductor is at least partially disposed within. For example, and without limitation, conductor 908 may be covered by insulation except for at conductor pin, which may contact a component or interface of port of electric aircraft as part of mating component 928. As used in this disclosure, "communication" is an attribute wherein two or more relata interact with one another, for example within a specific domain or in a certain manner. In some cases, communication between two or more relata may be of a specific domain, such as without limitation electric communication, fluidic communication, informatic communication, mechanic communication, and the like. As used in this disclosure, "electric communication" is an attribute wherein two or more relata interact with one another by way of an electric current or electricity in general. As used in this disclosure, "informatic communication" is an attribute wherein two or more relata interact with one another by way of an information flow or information in general. As used in this disclosure, "mechanic communication" is an attribute wherein two or more relata interact with one another by way of mechanical means, for instance mechanic effort (e.g., force) and flow (e.g., velocity).

Now referring to FIG. 9B, in some embodiments, a charging unit may additionally include an alternating current to direct current converter configured to convert an electrical charging current from an alternating current. As used in this disclosure, an "analog current to direct current converter" is an electrical component that is configured to convert analog current to digital current. An analog current to direct current (AC-DC) converter may include an analog current to direct current power supply and/or transformer. In some cases, AC-DC converter may be located within an electric aircraft and conductors may provide an alternating current to the electric aircraft by way of conductors 908 and connector 900. Alternatively and/or additionally, in some cases, AC-DC converter may be located outside of electric aircraft and an electrical charging current may be provided by way of a direct current to the electric aircraft. In some cases, AC-DC converter may be used to recharge a charging batter. In some cases, AC-DC converter may be used to provide electrical power to one or more of coolant source 936, charging battery, and/or controller 940. In some embodiments, charging battery may have a connection to grid power component. Grid power component may be connected to an external electrical power grid. In some embodiments, grid power component may be configured to slowly charge one or more batteries in order to reduce strain on nearby electrical power grids. In one embodiment, grid power component may have an AC grid current of at least 450 amps. In some embodiments, grid power component may have an AC grid current of more or less than 450 amps. In one embodiment, grid power component may have an AC voltage connection of 480 Vac. In other embodiments, grid power component may have an AC voltage connection of above or below 480 Vac. In some embodiments, charging battery may provide power to the grid power component. In this configuration, charging battery may provide power to a surrounding electrical power grid.

With continued reference to FIG. 9B, a conductor 908 may include a control signal conductor configured to conduct a control signal. As used in this disclosure, a "control signal conductor" is a conductor configured to carry a control signal, such as a control signal between an electric aircraft and a charging unit. As used in this disclosure, a "control signal" is an electrical signal that is indicative of information. In this disclosure, "control pilot" is used interchangeably in this application with control signal. In some cases, a control signal may include an analog signal or a digital signal. In some cases, control signal may be communicated from one or more sensors, for example located within electric aircraft (e.g., within an electric aircraft battery) and/or located within connector 900. For example, in some cases, control signal may be associated with a battery within an electric aircraft. For example, control signal may include a battery sensor signal. As used in this disclosure, a "battery sensor signal" is a signal representative of a characteristic of a battery. In some cases, battery sensor signal may be representative of a characteristic of an electric aircraft battery, for example as electric aircraft battery is being recharged. In some versions, controller 940 may additionally include a sensor interface configured to receive a battery sensor signal. Sensor interface may include one or more ports, an analog to digital converter, and the like. Controller 940 may be further configured to control one or more of electrical charging current and coolant flow as a function of sensor signal from a sensor 944 and/or control signal. For example, controller 940 may control a charging battery as a function of a battery sensor signal and/or control signal. In some cases, battery sensor signal may be representative of battery temperature. In some cases, battery sensor signal may represent battery cell swell. In some cases, battery sensor signal may be representative of temperature of electric aircraft battery, for example temperature of one or more battery cells within an electric aircraft battery. In some cases, a sensor, a circuit, and/or a controller 940 may perform one or more signal processing steps on a signal. For instance, sensor, circuit or controller 940 may analyze, modify, and/or synthesize a signal in order to improve the signal, for instance by improving transmission, storage efficiency, or signal to noise ratio.

Figure 10:
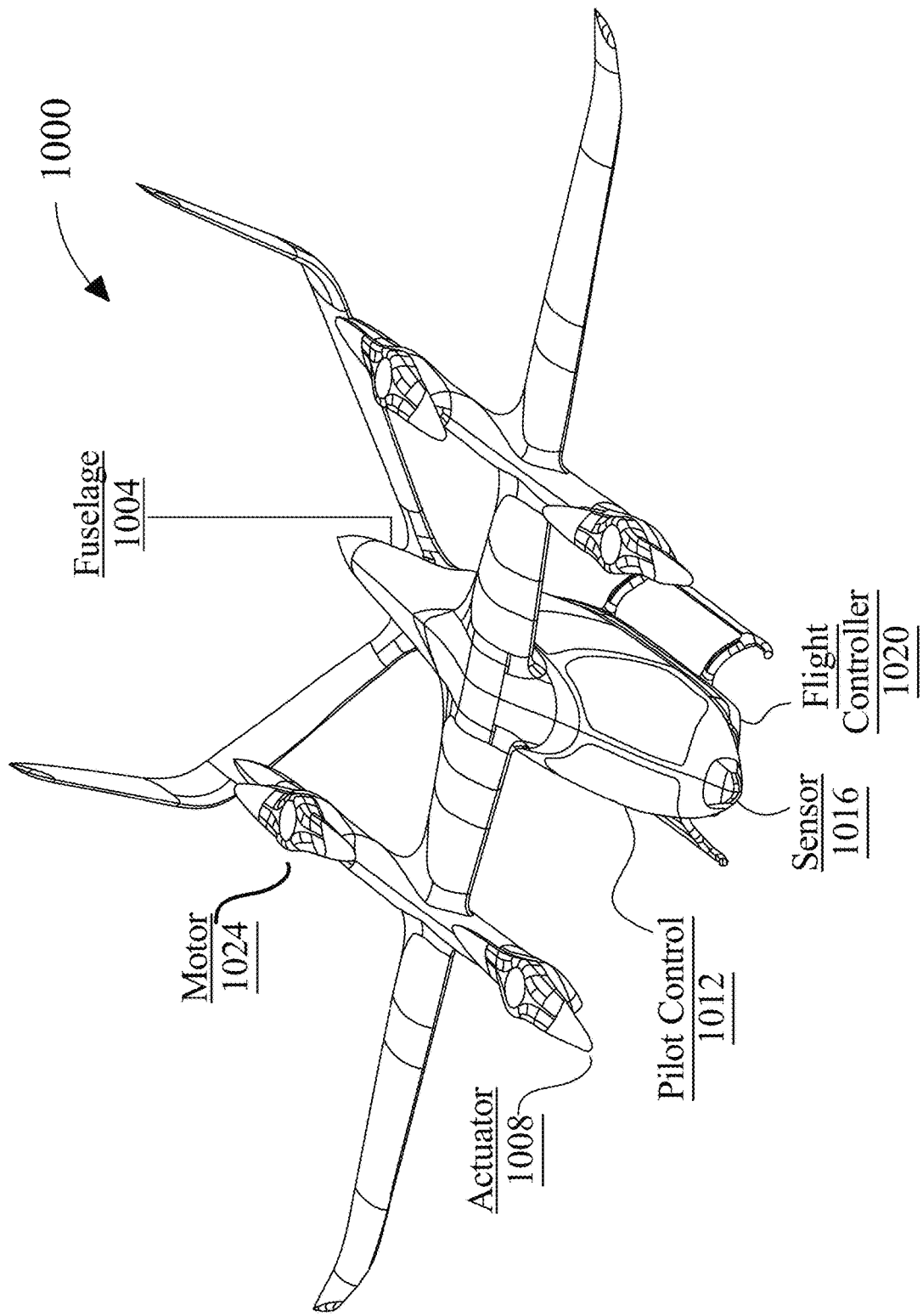
FIG. 10 is a schematic of an exemplary electric aircraft.

Referring now to FIG. 10, an exemplary embodiment of an aircraft 1000 is illustrated. Aircraft 1000 may include an electrically powered aircraft (i.e., electric aircraft). In some embodiments, electrically powered aircraft may be an electric vertical takeoff and landing (eVTOL) aircraft. Electric aircraft may be capable of rotor-based cruising flight, rotor-based takeoff, rotor-based landing, fixed-wing cruising flight, airplane-style takeoff, airplane-style landing, and/or any combination thereof. "Rotor-based flight," as described in this disclosure, is where the aircraft generated lift and propulsion by way of one or more powered rotors coupled with an engine, such as a quadcopter, multi-rotor helicopter, or other vehicle that maintains its lift primarily using downward thrusting propulsors. "Fixed-wing flight," as described in this disclosure, is where the aircraft is capable of flight using wings and/or foils that generate lift caused by the aircraft's forward airspeed and the shape of the wings and/or foils, such as airplane-style flight.

With continued reference to FIG. 10, aircraft 1000 may include a fuselage 1004. As used in this disclosure a "fuselage" is the main body of an aircraft, or in other words, the entirety of the aircraft except for the cockpit, nose, wings, empennage, nacelles, any and all control surfaces, and generally contains an aircraft's payload. Fuselage 1004 may comprise structural elements that physically support the shape and structure of an aircraft. Structural elements may take a plurality of forms, alone or in combination with other types. Structural elements may vary depending on the construction type of aircraft and specifically, the fuselage. Fuselage 1004 may comprise a truss structure. A truss structure may be used with a lightweight aircraft and may include welded aluminum tube trusses. A truss, as used herein, is an assembly of beams that create a rigid structure, often in combinations of triangles to create three-dimensional shapes. A truss structure may alternatively comprise titanium construction in place of aluminum tubes, or a combination thereof. In some embodiments, structural elements may comprise aluminum tubes and/or titanium beams. In an embodiment, and without limitation, structural elements may include an aircraft skin. Aircraft skin may be layered over the body shape constructed by trusses. Aircraft skin may comprise a plurality of materials such as aluminum, fiberglass, and/or carbon fiber, the latter of which will be addressed in greater detail later in this paper.

With continued reference to FIG. 10, aircraft 1000 may include a plurality of actuators 1008. Actuator 1008 may include any motor and/or propulsor described in this disclosure. In an embodiment, actuator 1008 may be mechanically coupled to an aircraft. As used herein, a person of ordinary skill in the art would understand "mechanically coupled" to mean that at least a portion of a device, component, or circuit is connected to at least a portion of the aircraft via a mechanical coupling. Said mechanical coupling can include, for example, rigid coupling, such as beam coupling, bellows coupling, bushed pin coupling, constant velocity, split-muff coupling, diaphragm coupling, disc coupling, donut coupling, elastic coupling, flexible coupling, fluid coupling, gear coupling, grid coupling, Hirth joints, hydrodynamic coupling, jaw coupling, magnetic coupling, Oldham coupling, sleeve coupling, tapered shaft lock, twin spring coupling, rag joint coupling, universal joints, or any combination thereof. As used in this disclosure an "aircraft" is vehicle that may fly. As a non-limiting example, aircraft may include airplanes, helicopters, airships, blimps, gliders, paramotors, and the like thereof. In an embodiment, mechanical coupling may be used to connect the ends of adjacent parts and/or objects of an electric aircraft. Further, in an embodiment, mechanical coupling may be used to join two pieces of rotating electric aircraft components.

With continued reference to FIG. 10, a plurality of actuators 1008 may be configured to produce a torque. As used in this disclosure a "torque" is a measure of force that causes an object to rotate about an axis in a direction. For example, and without limitation, torque may rotate an aileron and/or rudder to generate a force that may adjust and/or affect altitude, airspeed velocity, groundspeed velocity, direction during flight, and/or thrust. For example, plurality of actuators 1008 may include a component used to produce a torque that affects aircrafts' roll and pitch, such as without limitation one or more ailerons. An "aileron," as used in this disclosure, is a hinged surface which forms part of the trailing edge of a wing in a fixed wing aircraft, and which may be moved via mechanical means such as without limitation servomotors, mechanical linkages, or the like. As a further example, plurality of actuators 1008 may include a rudder, which may include, without limitation, a segmented rudder that produces a torque about a vertical axis. Additionally or alternatively, plurality of actuators 1008 may include other flight control surfaces such as propulsors, rotating flight controls, or any other structural features which can adjust movement of aircraft 1000. Plurality of actuators 1008 may include one or more rotors, turbines, ducted fans, paddle wheels, and/or other components configured to propel a vehicle through a fluid medium including, but not limited to air.

With continued reference to FIG. 10, plurality of actuators 1008 may include at least a propulsor component. As used in this disclosure a "propulsor component" or "propulsor" is a component and/or device used to propel a craft by exerting force on a fluid medium, which may include a gaseous medium such as air or a liquid medium such as water. In an embodiment, when a propulsor twists and pulls air behind it, it may, at the same time, push an aircraft forward with an amount of force and/or thrust. More air pulled behind an aircraft results in greater thrust with which the aircraft is pushed forward. Propulsor component may include any device or component that consumes electrical power on demand to propel an electric aircraft in a direction or other vehicle while on ground or in-flight. In an embodiment, propulsor component may include a puller component. As used in this disclosure a "puller component" is a component that pulls and/or tows an aircraft through a medium. As a non-limiting example, puller component may include a flight component such as a puller propeller, a puller motor, a puller propulsor, and the like. Additionally, or alternatively, puller component may include a plurality of puller flight components. In another embodiment, propulsor component may include a pusher component. As used in this disclosure a "pusher component" is a component that pushes and/or thrusts an aircraft through a medium. As a non-limiting example, pusher component may include a pusher component such as a pusher propeller, a pusher motor, a pusher propulsor, and the like. Additionally, or alternatively, pusher flight component may include a plurality of pusher flight components.

In another embodiment, and with continued reference to FIG. 10, propulsor may include a propeller, a blade, or any combination of the two. A propeller may function to convert rotary motion from an engine or other power source into a swirling slipstream which may push the propeller forwards or backwards. Propulsor may include a rotating power-driven hub, to which several radial airfoil-section blades may be attached, such that an entire whole assembly rotates about a longitudinal axis. As a non-limiting example, blade pitch of propellers may be fixed at a fixed angle, manually variable to a few set positions, automatically variable (e.g. a "constant-speed" type), and/or any combination thereof as described further in this disclosure. As used in this disclosure a "fixed angle" is an angle that is secured and/or substantially unmovable from an attachment point. For example, and without limitation, a fixed angle may be an angle of 2.2° inward and/or 1.7° forward. As a further non-limiting example, a fixed angle may be an angle of 3.6° outward and/or 2.7° backward. In an embodiment, propellers for an aircraft may be designed to be fixed to their hub at an angle similar to the thread on a screw makes an angle to the shaft; this angle may be referred to as a pitch or pitch angle which may determine a speed of forward movement as the blade rotates. Additionally or alternatively, propulsor component may be configured having a variable pitch angle. As used in this disclosure a "variable pitch angle" is an angle that may be moved and/or rotated. For example, and without limitation, propulsor component may be angled at a first angle of 3.3° inward, wherein propulsor component may be rotated and/or shifted to a second angle of 1.7° outward.

With continued reference to FIG. 10, propulsor may include a thrust element which may be integrated into the propulsor. Thrust element may include, without limitation, a device using moving or rotating foils, such as one or more rotors, an airscrew or propeller, a set of airscrews or propellers such as contra-rotating propellers, a moving or flapping wing, or the like. Further, a thrust element, for example, can include without limitation a marine propeller or screw, an impeller, a turbine, a pump-jet, a paddle or paddle-based device, or the like.

With continued reference to FIG. 10, plurality of actuators 1008 may include power sources, control links to one or more elements, fuses, and/or mechanical couplings used to drive and/or control any other flight component. Plurality of actuators 1008 may include a motor that operates to move one or more flight control components and/or one or more control surfaces, to drive one or more propulsors, or the like. A motor may be driven by direct current (DC) electric power and may include, without limitation, brushless DC electric motors, switched reluctance motors, induction motors, or any combination thereof. Alternatively or additionally, a motor may be driven by an inverter. A motor may also include electronic speed controllers, inverters, or other components for regulating motor speed, rotation direction, and/or dynamic braking.

With continued reference to FIG. 10, plurality of actuators 1008 may include an energy source. An energy source may include, for example, a generator, a photovoltaic device, a fuel cell such as a hydrogen fuel cell, direct methanol fuel cell, and/or solid oxide fuel cell, an electric energy storage device (e.g. a capacitor, an inductor, and/or a battery). An energy source may also include a battery cell, or a plurality of battery cells connected in series into a module and each module connected in series or in parallel with other modules. Configuration of an energy source containing connected modules may be designed to meet an energy or power requirement and may be designed to fit within a designated footprint in an electric aircraft in which system may be incorporated.

In an embodiment, and with continued reference to FIG. 10, an energy source may be used to provide a steady supply of electrical power to a load over a flight by an electric aircraft 1000. For example, energy source may be capable of providing sufficient power for "cruising" and other relatively low-energy phases of flight. An energy source may also be capable of providing electrical power for some higher-power phases of flight as well, particularly when the energy source is at a high SOC, as may be the case for instance during takeoff. In an embodiment, energy source may include an emergency power unit which may be capable of providing sufficient electrical power for auxiliary loads including without limitation, lighting, navigation, communications, de-icing, steering, or other systems requiring power or energy. Further, energy source may be capable of providing sufficient power for controlled descent and landing protocols, including, without limitation, hovering descent or runway landing. As used herein the energy source may have high power density where electrical power an energy source can usefully produce per unit of volume and/or mass is relatively high. As used in this disclosure, "electrical power" is a rate of electrical energy per unit time. An energy source may include a device for which power that may be produced per unit of volume and/or mass has been optimized, for instance at an expense of maximal total specific energy density or power capacity. Non-limiting examples of items that may be used as at least an energy source include batteries used for starting applications including Li ion batteries which may include NCA, NMC, Lithium iron phosphate (LiFePO4) and Lithium Manganese Oxide (LMO) batteries, which may be mixed with another cathode chemistry to provide more specific power if the application requires Li metal batteries, which have a lithium metal anode that provides high power on demand, Li ion batteries that have a silicon or titanite anode, energy source may be used, in an embodiment, to provide electrical power to an electric aircraft or drone, such as an electric aircraft vehicle, during moments requiring high rates of power output, including without limitation takeoff, landing, thermal de-icing and situations requiring greater power output for reasons of stability, such as high turbulence situations, as described in further detail below. A battery may include, without limitation a battery using nickel based chemistries such as nickel cadmium or nickel metal hydride, a battery using lithium ion battery chemistries such as a nickel cobalt aluminum (NCA), nickel manganese cobalt (NMC), lithium iron phosphate (LiFePO4), lithium cobalt oxide (LCO), and/or lithium manganese oxide (LMO), a battery using lithium polymer technology, lead-based batteries such as without limitation lead acid batteries, metal-air batteries, or any other suitable battery. Persons skilled in the art, upon reviewing the entirety of this disclosure, will be aware of various devices of components that may be used as an energy source.

With continued reference to FIG. 10, an energy source may include a plurality of energy sources, referred to herein as a module of energy sources. Module may include batteries connected in parallel or in series or a plurality of modules connected either in series or in parallel designed to satisfy both power and energy requirements. Connecting batteries in series may increase a potential of at least an energy source which may provide more power on demand. High potential batteries may require cell matching when high peak load is needed. As more cells are connected in strings, there may exist a possibility of one cell failing which may increase resistance in module and reduce overall power output as voltage of the module may decrease as a result of that failing cell. Connecting batteries in parallel may increase total current capacity by decreasing total resistance, and it also may increase overall amp-hour capacity. Overall energy and power outputs of at least an energy source may be based on individual battery cell performance or an extrapolation based on a measurement of at least an electrical parameter. In an embodiment where energy source includes a plurality of battery cells, overall power output capacity may be dependent on electrical parameters of each individual cell. If one cell experiences high self-discharge during demand, power drawn from at least an energy source may be decreased to avoid damage to a weakest cell. Energy source may further include, without limitation, wiring, conduit, housing, cooling system and battery management system. Persons skilled in the art will be aware, after reviewing the entirety of this disclosure, of many different components of an energy source. Exemplary energy sources are disclosed in detail in U.S. patent application Ser. No. 16/1048,157 and Ser. No. 16/048,140 both entitled "SYSTEM AND METHOD FOR HIGH ENERGY DENSITY BATTERY MODULE" by S. Donovan et al., which are incorporated in their entirety herein by reference.

With continued reference to FIG. 10, according to some embodiments, an energy source may include an emergency power unit (EPU) (i.e., auxiliary power unit). As used in this disclosure an "emergency power unit" is an energy source as described herein that is configured to power an essential system for a critical function in an emergency, for instance without limitation when another energy source has failed, is depleted, or is otherwise unavailable. Exemplary non-limiting essential systems include navigation systems, such as MFD, GPS, VOR receiver or directional gyro, and other essential flight components, such as propulsors.

With continued reference to FIG. 10, another exemplary actuator may include landing gear. Landing gear may be used for take-off and/or landing/Landing gear may be used to contact ground while aircraft 1000 is not in flight. Exemplary landing gear is disclosed in detail in U.S. patent application Ser. No. 17/196,719 entitled "SYSTEM FOR ROLLING LANDING GEAR" by R. Griffin et al., which is incorporated in its entirety herein by reference.

With continued reference to FIG. 10, aircraft 1000 may include a pilot control 1012, including without limitation, a hover control, a thrust control, an inceptor stick, a cyclic, and/or a collective control. As used in this disclosure a "collective control" or "collective" is a mechanical control of an aircraft that allows a pilot to adjust and/or control the pitch angle of the plurality of actuators 1008. For example and without limitation, collective control may alter and/or adjust the pitch angle of all of the main rotor blades collectively. For example, and without limitation pilot control 1012 may include a yoke control. As used in this disclosure a "yoke control" is a mechanical control of an aircraft to control the pitch and/or roll. For example and without limitation, yoke control may alter and/or adjust the roll angle of aircraft 1000 as a function of controlling and/or maneuvering ailerons. In an embodiment, pilot control 1012 may include one or more foot-brakes, control sticks, pedals, throttle levels, and the like thereof. In another embodiment, and without limitation, pilot control 1012 may be configured to control a principal axis of the aircraft. As used in this disclosure a "principal axis" is an axis in a body representing one three dimensional orientations. For example, and without limitation, principal axis or more yaw, pitch, and/or roll axis. Principal axis may include a yaw axis. As used in this disclosure a "yaw axis" is an axis that is directed towards the bottom of the aircraft, perpendicular to the wings. For example, and without limitation, a positive yawing motion may include adjusting and/or shifting the nose of aircraft 1000 to the right. Principal axis may include a pitch axis. As used in this disclosure a "pitch axis" is an axis that is directed towards the right laterally extending wing of the aircraft. For example, and without limitation, a positive pitching motion may include adjusting and/or shifting the nose of aircraft 1000 upwards. Principal axis may include a roll axis. As used in this disclosure a "roll axis" is an axis that is directed longitudinally towards the nose of the aircraft, parallel to the fuselage. For example, and without limitation, a positive rolling motion may include lifting the left and lowering the right wing concurrently.

With continued reference to FIG. 10, pilot control 1012 may be configured to modify a variable pitch angle. For example, and without limitation, pilot control 1012 may adjust one or more angles of attack of a propeller. As used in this disclosure an "angle of attack" is an angle between the chord of the propeller and the relative wind. For example, and without limitation angle of attack may include a propeller blade angled 3.2°. In an embodiment, pilot control 1012 may modify the variable pitch angle from a first angle of 2.71° to a second angle of 3.82°. Additionally or alternatively, pilot control 1012 may be configured to translate a pilot desired torque for flight component 1008. For example, and without limitation, pilot control 1012 may translate that a pilot's desired torque for a propeller be 160 lb. ft. of torque. As a further non-limiting example, pilot control 1012 may introduce a pilot's desired torque for a propulsor to be 290 lb. ft. of torque. Additional disclosure related to pilot control 1012 may be found in U.S. patent application Ser. No. 17/001,845 and Ser. No. 16/1,029,206 both of which are entitled "A HOVER AND THRUST CONTROL ASSEMBLY FOR DUAL-MODE AIRCRAFT" by C. Spiegel et al., which are incorporated in their entirety herein by reference.

With continued reference to FIG. 10, aircraft 1000 may include a loading system. A loading system may include a system configured to load an aircraft of either cargo or personnel. For instance, some exemplary loading systems may include a swing nose, which is configured to swing the nose of aircraft 1000 of the way thereby allowing direct access to a cargo bay located behind the nose. A notable exemplary swing nose aircraft is Boeing 747. Additional disclosure related to loading systems can be found in U.S. patent application Ser. No. 17/137,594 entitled "SYSTEM AND METHOD FOR LOADING AND SECURING PAYLOAD IN AN AIRCRAFT" by R. Griffin et al., entirety of which in incorporated herein by reference.

With continued reference to FIG. 10, aircraft 1000 may include a sensor 1016. Sensor 1016 may include any sensor or noise monitoring circuit described in this disclosure, for instance in reference to FIGS. 1-10. Sensor 1016 may be configured to sense a characteristic of pilot control 1012. Sensor may be a device, module, and/or subsystem, utilizing any hardware, software, and/or any combination thereof to sense a characteristic and/or changes thereof, in an instant environment, for instance without limitation a pilot control 1012, which the sensor is proximal to or otherwise in a sensed communication with, and transmit information associated with the characteristic, for instance without limitation digitized data. Sensor 1016 may be mechanically and/or communicatively coupled to aircraft 1000, including, for instance, to at least a pilot control 1012. Sensor 1016 may be configured to sense a characteristic associated with at least a pilot control 1012. An environmental sensor may include without limitation one or more sensors used to detect ambient temperature, barometric pressure, and/or air velocity, one or more motion sensors which may include without limitation gyroscopes, accelerometers, inertial measurement unit (IMU), and/or magnetic sensors, one or more humidity sensors, one or more oxygen sensors, or the like. Additionally or alternatively, sensor 1016 may include at least a geospatial sensor. Sensor 1016 may be located inside an aircraft; and/or be included in and/or attached to at least a portion of the aircraft. Sensor may include one or more proximity sensors, displacement sensors, vibration sensors, and the like thereof. Sensor may be used to monitor the status of aircraft 1000 for both critical and non-critical functions. Sensor may be incorporated into vehicle or aircraft or be remote.

With continued reference to FIG. 10, in some embodiments, sensor 1016 may be configured to sense a characteristic associated with any pilot control described in this disclosure. Non-limiting examples of a sensor 1016 may include an inertial measurement unit (IMU), an accelerometer, a gyroscope, a proximity sensor, a pressure sensor, a light sensor, a pitot tube, an air speed sensor, a position sensor, a speed sensor, a switch, a thermometer, a strain gauge, an acoustic sensor, and an electrical sensor. In some cases, sensor 1016 may sense a characteristic as an analog measurement, for instance, yielding a continuously variable electrical potential indicative of the sensed characteristic. In these cases, sensor 1016 may additionally comprise an analog to digital converter (ADC) as well as any additional circuitry, such as without limitation a Whetstone bridge, an amplifier, a filter, and the like. For instance, in some cases, sensor 1016 may comprise a strain gage configured to determine loading of one or flight components, for instance landing gear. Strain gage may be included within a circuit comprising a Whetstone bridge, an amplified, and a band-pass filter to provide an analog strain measurement signal having a high signal to noise ratio, which characterizes strain on a landing gear member. An ADC may then digitize analog signal produces a digital signal that can then be transmitted other systems within aircraft 1000, for instance without limitation a computing system, a pilot display, and a memory component. Alternatively or additionally, sensor 1016 may sense a characteristic of a pilot control 1012 digitally. For instance in some embodiments, sensor 1016 may sense a characteristic through a digital means or digitize a sensed signal natively. In some cases, for example, sensor 1016 may include a rotational encoder and be configured to sense a rotational position of a pilot control; in this case, the rotational encoder digitally may sense rotational "clicks" by any known method, such as without limitation magnetically, optically, and the like.

With continued reference to FIG. 10, electric aircraft 1000 may include at least a motor 1024, which may be mounted on a structural feature of the aircraft. Design of motor 1024 may enable it to be installed external to structural member (such as a boom, nacelle, or fuselage) for easy maintenance access and to minimize accessibility requirements for the structure; this may improve structural efficiency by requiring fewer large holes in the mounting area. In some embodiments, motor 1024 may include two main holes in top and bottom of mounting area to access bearing cartridge. Further, a structural feature may include a component of electric aircraft 1000. For example, and without limitation structural feature may be any portion of a vehicle incorporating motor 1024, including any vehicle as described in this disclosure. As a further non-limiting example, a structural feature may include without limitation a wing, a spar, an outrigger, a fuselage, or any portion thereof; persons skilled in the art, upon reviewing the entirety of this disclosure, will be aware of many possible features that may function as at least a structural feature. At least a structural feature may be constructed of any suitable material or combination of materials, including without limitation metal such as aluminum, titanium, steel, or the like, polymer materials or composites, fiberglass, carbon fiber, wood, or any other suitable material. As a non-limiting example, at least a structural feature may be constructed from additively manufactured polymer material with a carbon fiber exterior; aluminum parts or other elements may be enclosed for structural strength, or for purposes of supporting, for instance, vibration, torque or shear stresses imposed by at least propulsor 1008. Persons skilled in the art, upon reviewing the entirety of this disclosure, will be aware of various materials, combinations of materials, and/or constructions techniques.

With continued reference to FIG. 10, electric aircraft 1000 may include a vertical takeoff and landing aircraft (eVTOL). As used herein, a vertical take-off and landing (eVTOL) aircraft is one that can hover, take off, and land vertically. An eVTOL, as used herein, is an electrically powered aircraft typically using an energy source, of a plurality of energy sources to power the aircraft. In order to optimize the power and energy necessary to propel the aircraft. eVTOL may be capable of rotor-based cruising flight, rotor-based takeoff, rotor-based landing, fixed-wing cruising flight, airplane-style takeoff, airplane-style landing, and/or any combination thereof. Rotor-based flight, as described herein, is where the aircraft generated lift and propulsion by way of one or more powered rotors coupled with an engine, such as a "quadcopter," multi-rotor helicopter, or other vehicle that maintains its lift primarily using downward thrusting propulsors. Fixed-wing flight, as described herein, is where the aircraft is capable of flight using wings and/or foils that generate life caused by the aircraft's forward airspeed and the shape of the wings and/or foils, such as airplane-style flight.

With continued reference to FIG. 10, a number of aerodynamic forces may act upon the electric aircraft 1000 during flight. Forces acting on electric aircraft 1000 during flight may include, without limitation, thrust, the forward force produced by the rotating element of the electric aircraft 1000 and acts parallel to the longitudinal axis. Another force acting upon electric aircraft 1000 may be, without limitation, drag, which may be defined as a rearward retarding force which is caused by disruption of airflow by any protruding surface of the electric aircraft 1000 such as, without limitation, the wing, rotor, and fuselage. Drag may oppose thrust and acts rearward parallel to the relative wind. A further force acting upon electric aircraft 1000 may include, without limitation, weight, which may include a combined load of the electric aircraft 1000 itself, crew, baggage, and/or fuel. Weight may pull electric aircraft 1000 downward due to the force of gravity. An additional force acting on electric aircraft 1000 may include, without limitation, lift, which may act to oppose the downward force of weight and may be produced by the dynamic effect of air acting on the airfoil and/or downward thrust from the propulsor 1008 of the electric aircraft. Lift generated by the airfoil may depend on speed of airflow, density of air, total area of an airfoil and/or segment thereof, and/or an angle of attack between air and the airfoil. For example, and without limitation, electric aircraft 1000 are designed to be as lightweight as possible. Reducing the weight of the aircraft and designing to reduce the number of components is essential to optimize the weight. To save energy, it may be useful to reduce weight of components of electric aircraft 1000, including without limitation propulsors and/or propulsion assemblies. In an embodiment, motor 1024 may eliminate need for many external structural features that otherwise might be needed to join one component to another component. Motor 1024 may also increase energy efficiency by enabling a lower physical propulsor profile, reducing drag and/or wind resistance. This may also increase durability by lessening the extent to which drag and/or wind resistance add to forces acting on electric aircraft 1000 and/or propulsors.

Figure 11:
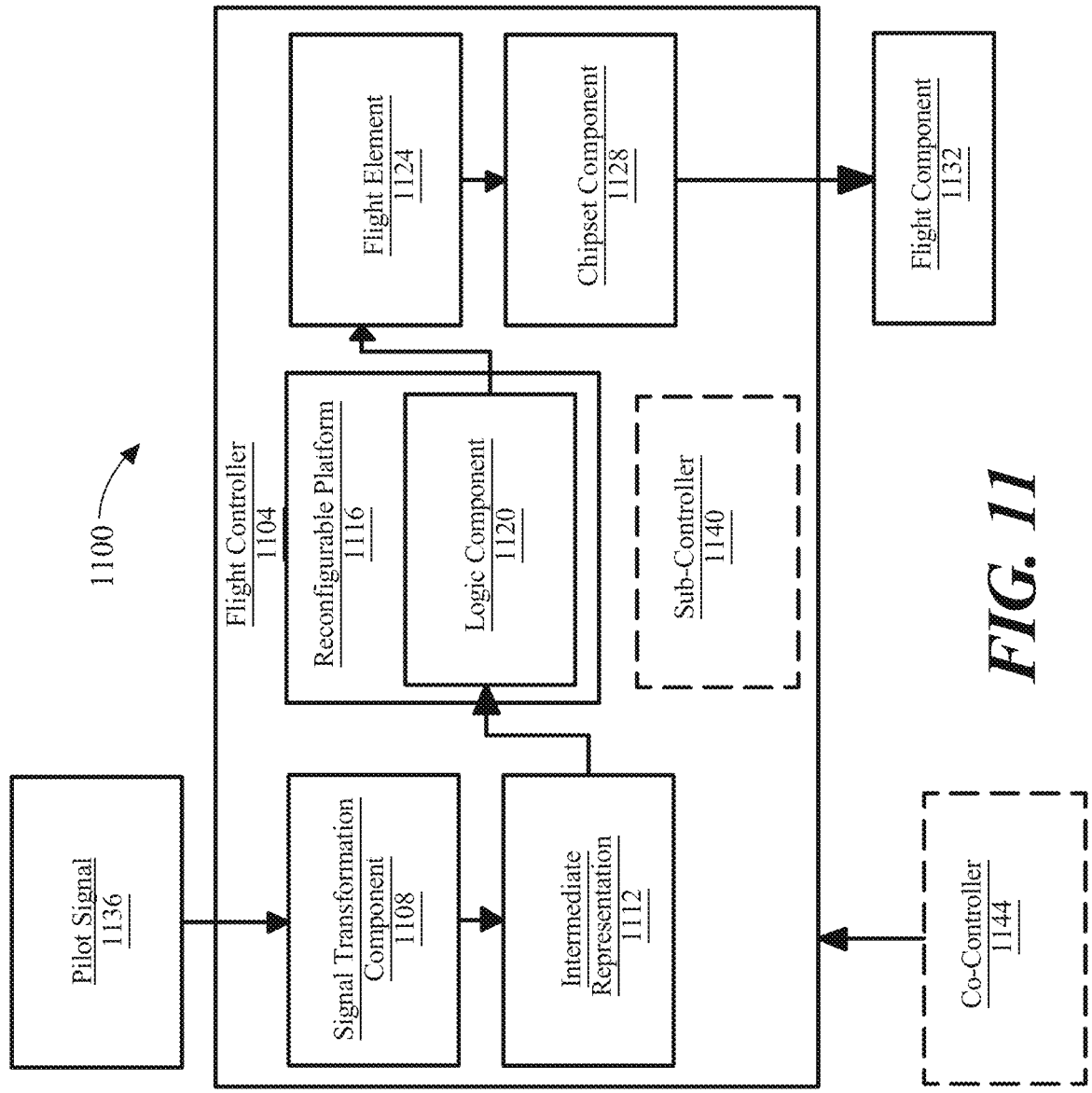
FIG. 11 is a block diagram depicting an exemplary flight controller in accordance with one or more embodiments of the present disclosure.

Now referring to FIG. 11, an exemplary embodiment 1100 of a flight controller 1104 is illustrated. As used in this disclosure a "flight controller" is a computing device of a plurality of computing devices dedicated to data storage, security, distribution of traffic for load balancing, and flight instruction. Flight controller 1104 may include and/or communicate with any computing device as described in this disclosure, including without limitation a microcontroller, microprocessor, digital signal processor (DSP) and/or system on a chip (SoC) as described in this disclosure. Further, flight controller 1104 may include a single computing device operating independently, or may include two or more computing device operating in concert, in parallel, sequentially or the like; two or more computing devices may be included together in a single computing device or in two or more computing devices. In embodiments, flight controller 1104 may be installed in an aircraft, may control the aircraft remotely, and/or may include an element installed in the aircraft and a remote element in communication therewith.

In an embodiment, and still referring to FIG. 11, flight controller 1104 may include a signal transformation component 1108. As used in this disclosure a "signal transformation component" is a component that transforms and/or converts a first signal to a second signal, wherein a signal may include one or more digital and/or analog signals. For example, and without limitation, signal transformation component 1108 may be configured to perform one or more operations such as preprocessing, lexical analysis, parsing, semantic analysis, and the like thereof. In an embodiment, and without limitation, signal transformation component 1108 may include one or more analog-to-digital convertors that transform a first signal of an analog signal to a second signal of a digital signal. For example, and without limitation, an analog-to-digital converter may convert an analog input signal to a 9-bit binary digital representation of that signal. In another embodiment, signal transformation component 1108 may include transforming one or more low-level languages such as, but not limited to, machine languages and/or assembly languages. For example, and without limitation, signal transformation component 1108 may include transforming a binary language signal to an assembly language signal. In an embodiment, and without limitation, signal transformation component 1108 may include transforming one or more high-level languages and/or formal languages such as but not limited to alphabets, strings, and/or languages. For example, and without limitation, high-level languages may include one or more system languages, scripting languages, domain-specific languages, visual languages, esoteric languages, and the like thereof. As a further non-limiting example, high-level languages may include one or more algebraic formula languages, business data languages, string and list languages, object-oriented languages, and the like thereof.

Still referring to FIG. 11, signal transformation component 1108 may be configured to optimize an intermediate representation 1112. As used in this disclosure an "intermediate representation" is a data structure and/or code that represents the input signal. Signal transformation component 1108 may optimize intermediate representation as a function of a data-flow analysis, dependence analysis, alias analysis, pointer analysis, escape analysis, and the like thereof. In an embodiment, and without limitation, signal transformation component 1108 may optimize intermediate representation 1112 as a function of one or more inline expansions, dead code eliminations, constant propagation, loop transformations, and/or automatic parallelization functions. In another embodiment, signal transformation component 1108 may optimize intermediate representation as a function of a machine dependent optimization such as a peephole optimization, wherein a peephole optimization may rewrite short sequences of code into more efficient sequences of code. Signal transformation component 1108 may optimize intermediate representation to generate an output language, wherein an "output language," as used herein, is the native machine language of flight controller 1104. For example, and without limitation, native machine language may include one or more binary and/or numerical languages.

In an embodiment, and without limitation, signal transformation component 1108 may include transform one or more inputs and outputs as a function of an error correction code. An error correction code, also known as error correcting code (ECC), is an encoding of a message or lot of data using redundant information, permitting recovery of corrupted data. An ECC may include a block code, in which information is encoded on fixed-size packets and/or blocks of data elements such as symbols of predetermined size, bits, or the like. Reed-Solomon coding, in which message symbols within a symbol set having q symbols are encoded as coefficients of a polynomial of degree less than or equal to a natural number k, over a finite field/with q elements; strings so encoded have a minimum hamming distance of k+1, and permit correction of (q−k−1)/2 erroneous symbols. Block code may alternatively or additionally be implemented using Golay coding, also known as binary Golay coding, Bose-Chaudhuri, Hocquenghuem (BCH) coding, multidimensional parity-check coding, and/or Hamming codes. An ECC may alternatively or additionally be based on a convolutional code.

In an embodiment, and still referring to FIG. 11, flight controller 1104 may include a reconfigurable hardware platform 1116. A "reconfigurable hardware platform," as used herein, is a component and/or unit of hardware that may be reprogrammed, such that, for instance, a data path between elements such as logic gates or other digital circuit elements may be modified to change an algorithm, state, logical sequence, or the like of the component and/or unit. This may be accomplished with such flexible high-speed computing fabrics as field-programmable gate arrays (FPGAs), which may include a grid of interconnected logic gates, connections between which may be severed and/or restored to program in modified logic. Reconfigurable hardware platform 1116 may be reconfigured to enact any algorithm and/or algorithm selection process received from another computing device and/or created using machine-learning processes.

Still referring to FIG. 11, reconfigurable hardware platform 1116 may include a logic component 1120. As used in this disclosure a "logic component" is a component that executes instructions on output language. For example, and without limitation, logic component may perform basic arithmetic, logic, controlling, input/output operations, and the like thereof. Logic component 1120 may include any suitable processor, such as without limitation a component incorporating logical circuitry for performing arithmetic and logical operations, such as an arithmetic and logic unit (ALU), which may be regulated with a state machine and directed by operational inputs from memory and/or sensors; logic component 1120 may be organized according to Von Neumann and/or Harvard architecture as a non-limiting example. Logic component 1120 may include, incorporate, and/or be incorporated in, without limitation, a microcontroller, microprocessor, digital signal processor (DSP), Field Programmable Gate Array (FPGA), Complex Programmable Logic Device (CPLD), Graphical Processing Unit (GPU), general purpose GPU, Tensor Processing Unit (TPU), analog or mixed signal processor, Trusted Platform Module (TPM), a floating-point unit (FPU), and/or system on a chip (SoC). In an embodiment, logic component 1120 may include one or more integrated circuit microprocessors, which may contain one or more central processing units, central processors, and/or main processors, on a single metal-oxide-semiconductor chip. Logic component 1120 may be configured to execute a sequence of stored instructions to be performed on the output language and/or intermediate representation 1112. Logic component 1120 may be configured to fetch and/or retrieve the instruction from a memory cache, wherein a "memory cache," as used in this disclosure, is a stored instruction set on flight controller 1104. Logic component 1120 may be configured to decode the instruction retrieved from the memory cache to opcodes and/or operands. Logic component 1120 may be configured to execute the instruction on intermediate representation 1112 and/or output language. For example, and without limitation, logic component 1120 may be configured to execute an addition operation on intermediate representation 1112 and/or output language.

In an embodiment, and without limitation, logic component 1120 may be configured to calculate a flight element 1124. As used in this disclosure a "flight element" is an element of datum denoting a relative status of aircraft. For example, and without limitation, flight element 1124 may denote one or more torques, thrusts, airspeed velocities, forces, altitudes, groundspeed velocities, directions during flight, directions facing, forces, orientations, and the like thereof. For example, and without limitation, flight element 1124 may denote that aircraft is cruising at an altitude and/or with a sufficient magnitude of forward thrust. As a further non-limiting example, flight status may denote that is building thrust and/or groundspeed velocity in preparation for a takeoff. As a further non-limiting example, flight element 1124 may denote that aircraft is following a flight path accurately and/or sufficiently.

Still referring to FIG. 11, flight controller 1104 may include a chipset component 1128. As used in this disclosure a "chipset component" is a component that manages data flow. In an embodiment, and without limitation, chipset component 1128 may include a northbridge data flow path, wherein the northbridge dataflow path may manage data flow from logic component 1120 to a high-speed device and/or component, such as a RAM, graphics controller, and the like thereof. In another embodiment, and without limitation, chipset component 1128 may include a southbridge data flow path, wherein the southbridge dataflow path may manage data flow from logic component 1120 to lower-speed peripheral buses, such as a peripheral component interconnect (PCI), industry standard architecture (ICA), and the like thereof. In an embodiment, and without limitation, southbridge data flow path may include managing data flow between peripheral connections such as ethernet, USB, audio devices, and the like thereof. Additionally or alternatively, chipset component 1128 may manage data flow between logic component 1120, memory cache, and a flight component 1132. As used in this disclosure a "flight component" is a portion of an aircraft that can be moved or adjusted to affect one or more flight elements. For example, flight component 1432 may include a component used to affect the aircrafts' roll and pitch which may comprise one or more ailerons. As a further example, flight component 1132 may include a rudder to control yaw of an aircraft. In an embodiment, chipset component 1128 may be configured to communicate with a plurality of flight components as a function of flight element 1124. For example, and without limitation, chipset component 1128 may transmit to an aircraft rotor to reduce torque of a first lift propulsor and increase the forward thrust produced by a pusher component to perform a flight maneuver.

In an embodiment, and still referring to FIG. 11, flight controller 1104 may be configured generate an autonomous function. As used in this disclosure an "autonomous function" is a mode and/or function of flight controller 1104 that controls aircraft automatically. For example, and without limitation, autonomous function may perform one or more aircraft maneuvers, take offs, landings, altitude adjustments, flight leveling adjustments, turns, climbs, and/or descents. As a further non-limiting example, autonomous function may adjust one or more airspeed velocities, thrusts, torques, and/or groundspeed velocities. As a further non-limiting example, autonomous function may perform one or more flight path corrections and/or flight path modifications as a function of flight element 1124. In an embodiment, autonomous function may include one or more modes of autonomy such as, but not limited to, autonomous mode, semi-autonomous mode, and/or non-autonomous mode. As used in this disclosure "autonomous mode" is a mode that automatically adjusts and/or controls aircraft and/or the maneuvers of aircraft in its entirety. For example, autonomous mode may denote that flight controller 1104 will adjust the aircraft. As used in this disclosure a "semi-autonomous mode" is a mode that automatically adjusts and/or controls a portion and/or section of aircraft. For example, and without limitation, semi-autonomous mode may denote that a pilot will control the propulsors, wherein flight controller 1104 will control the ailerons and/or rudders. As used in this disclosure "non-autonomous mode" is a mode that denotes a pilot will control aircraft and/or maneuvers of aircraft in its entirety.

In an embodiment, and still referring to FIG. 11, flight controller 1104 may generate autonomous function as a function of an autonomous machine-learning model. As used in this disclosure an "autonomous machine-learning model" is a machine-learning model to produce an autonomous function output given flight element 1124 and a pilot signal 1136 as inputs; this is in contrast to a non-machine learning software program where the commands to be executed are determined in advance by a user and written in a programming language. As used in this disclosure a "pilot signal" is an element of datum representing one or more functions a pilot is controlling and/or adjusting. For example, pilot signal 1136 may denote that a pilot is controlling and/or maneuvering ailerons, wherein the pilot is not in control of the rudders and/or propulsors. In an embodiment, pilot signal 1136 may include an implicit signal and/or an explicit signal. For example, and without limitation, pilot signal 1136 may include an explicit signal, wherein the pilot explicitly states there is a lack of control and/or desire for autonomous function. As a further non-limiting example, pilot signal 1136 may include an explicit signal directing flight controller 1104 to control and/or maintain a portion of aircraft, a portion of the flight plan, the entire aircraft, and/or the entire flight plan. As a further non-limiting example, pilot signal 1136 may include an implicit signal, wherein flight controller 1104 detects a lack of control such as by a malfunction, torque alteration, flight path deviation, and the like thereof. In an embodiment, and without limitation, pilot signal 1136 may include one or more explicit signals to reduce torque, and/or one or more implicit signals that torque may be reduced due to reduction of airspeed velocity. In an embodiment, and without limitation, pilot signal 1136 may include one or more local and/or global signals. For example, and without limitation, pilot signal 1136 may include a local signal that is transmitted by a pilot and/or crew member. As a further non-limiting example, pilot signal 1136 may include a global signal that is transmitted by air traffic control and/or one or more remote users that are in communication with the pilot of aircraft. In an embodiment, pilot signal 1136 may be received as a function of a tri-state bus and/or multiplexor that denotes an explicit pilot signal should be transmitted prior to any implicit or global pilot signal.

Still referring to FIG. 11, autonomous machine-learning model may include one or more autonomous machine-learning processes such as supervised, unsupervised, or reinforcement machine-learning processes that flight controller 1104 and/or a remote device may or may not use in the generation of autonomous function. As used in this disclosure "remote device" is an external device to flight controller 1104. Additionally or alternatively, autonomous machine-learning model may include one or more autonomous machine-learning processes that a field-programmable gate array (FPGA) may or may not use in the generation of autonomous function. Autonomous machine-learning process may include, without limitation machine learning processes such as simple linear regression, multiple linear regression, polynomial regression, support vector regression, ridge regression, lasso regression, elasticnet regression, decision tree regression, random forest regression, logistic regression, logistic classification, K-nearest neighbors, support vector machines, kernel support vector machines, naïve bayes, decision tree classification, random forest classification, K-means clustering, hierarchical clustering, dimensionality reduction, principal component analysis, linear discriminant analysis, kernel principal component analysis, Q-learning, State Action Reward State Action (SARSA), Deep-Q network, Markov decision processes, Deep Deterministic Policy Gradient (DDPG), or the like thereof.

In an embodiment, and still referring to FIG. 11, autonomous machine learning model may be trained as a function of autonomous training data, wherein autonomous training data may correlate a flight element, pilot signal, and/or simulation data to an autonomous function. For example, and without limitation, a flight element of an airspeed velocity, a pilot signal of limited and/or no control of propulsors, and a simulation data of required airspeed velocity to reach the destination may result in an autonomous function that includes a semi-autonomous mode to increase thrust of the propulsors. Autonomous training data may be received as a function of user-entered valuations of flight elements, pilot signals, simulation data, and/or autonomous functions. Flight controller 1104 may receive autonomous training data by receiving correlations of flight element, pilot signal, and/or simulation data to an autonomous function that were previously received and/or determined during a previous iteration of generation of autonomous function. Autonomous training data may be received by one or more remote devices and/or FPGAs that at least correlate a flight element, pilot signal, and/or simulation data to an autonomous function. Autonomous training data may be received in the form of one or more user-entered correlations of a flight element, pilot signal, and/or simulation data to an autonomous function.

Still referring to FIG. 11, flight controller 1104 may receive autonomous machine-learning model from a remote device and/or FPGA that utilizes one or more autonomous machine learning processes, wherein a remote device and an FPGA is described above in detail. For example, and without limitation, a remote device may include a computing device, external device, processor, FPGA, microprocessor and the like thereof. Remote device and/or FPGA may perform the autonomous machine-learning process using autonomous training data to generate autonomous function and transmit the output to flight controller 1104. Remote device and/or FPGA may transmit a signal, bit, datum, or parameter to flight controller 1104 that at least relates to autonomous function. Additionally or alternatively, the remote device and/or FPGA may provide an updated machine-learning model. For example, and without limitation, an updated machine-learning model may be comprised of a firmware update, a software update, an autonomous machine-learning process correction, and the like thereof. As a non-limiting example a software update may incorporate a new simulation data that relates to a modified flight element. Additionally or alternatively, the updated machine learning model may be transmitted to the remote device and/or FPGA, wherein the remote device and/or FPGA may replace the autonomous machine-learning model with the updated machine-learning model and generate the autonomous function as a function of the flight element, pilot signal, and/or simulation data using the updated machine-learning model. The updated machine-learning model may be transmitted by the remote device and/or FPGA and received by flight controller 1104 as a software update, firmware update, or corrected autonomous machine-learning model. For example, and without limitation autonomous machine learning model may utilize a neural net machine-learning process, wherein the updated machine-learning model may incorporate a gradient boosting machine-learning process.

Still referring to FIG. 11, flight controller 1104 may include, be included in, and/or communicate with a mobile device such as a mobile telephone or smartphone. Further, flight controller may communicate with one or more additional devices as described below in further detail via a network interface device. The network interface device may be utilized for commutatively connecting a flight controller to one or more of a variety of networks, and one or more devices. Examples of a network interface device include, but are not limited to, a network interface card (e.g., a mobile network interface card, a LAN card), a modem, and any combination thereof. Examples of a network include, but are not limited to, a wide area network (e.g., the Internet, an enterprise network), a local area network (e.g., a network associated with an office, a building, a campus or other relatively small geographic space), a telephone network, a data network associated with a telephone/voice provider (e.g., a mobile communications provider data and/or voice network), a direct connection between two computing devices, and any combinations thereof. The network may include any network topology and can may employ a wired and/or a wireless mode of communication.

In an embodiment, and still referring to FIG. 11, flight controller 1104 may include, but is not limited to, for example, a cluster of flight controllers in a first location and a second flight controller or cluster of flight controllers in a second location. Flight controller 1104 may include one or more flight controllers dedicated to data storage, security, distribution of traffic for load balancing, and the like. Flight controller 1104 may be configured to distribute one or more computing tasks as described below across a plurality of flight controllers, which may operate in parallel, in series, redundantly, or in any other manner used for distribution of tasks or memory between computing devices. For example, and without limitation, flight controller 1104 may implement a control algorithm to distribute and/or command the plurality of flight controllers. As used in this disclosure a "control algorithm" is a finite sequence of well-defined computer implementable instructions that may determine the flight component of the plurality of flight components to be adjusted. For example, and without limitation, control algorithm may include one or more algorithms that reduce and/or prevent aviation asymmetry. As a further non-limiting example, control algorithms may include one or more models generated as a function of a software including, but not limited to Simulink by MathWorks, Natick, Massachusetts, USA. In an embodiment, and without limitation, control algorithm may be configured to generate an auto-code, wherein an "auto-code," is used herein, is a code and/or algorithm that is generated as a function of the one or more models and/or software's. In another embodiment, control algorithm may be configured to produce a segmented control algorithm. As used in this disclosure a "segmented control algorithm" is control algorithm that has been separated and/or parsed into discrete sections. For example, and without limitation, segmented control algorithm may parse control algorithm into two or more segments, wherein each segment of control algorithm may be performed by one or more flight controllers operating on distinct flight components.

In an embodiment, and still referring to FIG. 11, control algorithm may be configured to determine a segmentation boundary as a function of segmented control algorithm. As used in this disclosure a "segmentation boundary" is a limit and/or delineation associated with the segments of the segmented control algorithm. For example, and without limitation, segmentation boundary may denote that a segment in the control algorithm has a first starting section and/or a first ending section. As a further non-limiting example, segmentation boundary may include one or more boundaries associated with an ability of flight component 1132. In an embodiment, control algorithm may be configured to create an optimized signal communication as a function of segmentation boundary. For example, and without limitation, optimized signal communication may include identifying the discrete timing required to transmit and/or receive the one or more segmentation boundaries. In an embodiment, and without limitation, creating optimized signal communication further comprises separating a plurality of signal codes across the plurality of flight controllers.

For example, and without limitation the plurality of flight controllers may include one or more formal networks, wherein formal networks transmit data along an authority chain and/or are limited to task-related communications. As a further non-limiting example, communication network may include informal networks, wherein informal networks transmit data in any direction. In an embodiment, and without limitation, the plurality of flight controllers may include a chain path, wherein a "chain path," as used herein, is a linear communication path comprising a hierarchy that data may flow through. In an embodiment, and without limitation, the plurality of flight controllers may include an all-channel path, wherein an "all-channel path," as used herein, is a communication path that is not restricted to a particular direction. For example, and without limitation, data may be transmitted upward, downward, laterally, and the like thereof. In an embodiment, and without limitation, the plurality of flight controllers may include one or more neural networks that assign a weighted value to a transmitted datum. For example, and without limitation, a weighted value may be assigned as a function of one or more signals denoting that a flight component is malfunctioning and/or in a failure state.

Still referring to FIG. 11, the plurality of flight controllers may include a master bus controller. As used in this disclosure a "master bus controller" is one or more devices and/or components that are connected to a bus to initiate a direct memory access transaction, wherein a bus is one or more terminals in a bus architecture. Master bus controller may communicate using synchronous and/or asynchronous bus control protocols. In an embodiment, master bus controller may include flight controller 1104. In another embodiment, master bus controller may include one or more universal asynchronous receiver-transmitters (UART). For example, and without limitation, master bus controller may include one or more bus architectures that allow a bus to initiate a direct memory access transaction from one or more buses in the bus architectures. As a further non-limiting example, master bus controller may include one or more peripheral devices and/or components to communicate with another peripheral device and/or component and/or the master bus controller. In an embodiment, master bus controller may be configured to perform bus arbitration. As used in this disclosure "bus arbitration" is method and/or scheme to prevent multiple buses from attempting to communicate with and/or connect to master bus controller. For example and without limitation, bus arbitration may include one or more schemes such as a small computer interface system, wherein a small computer interface system is a set of standards for physical connecting and transferring data between peripheral devices and master bus controller by defining commands, protocols, electrical, optical, and/or logical interfaces. In an embodiment, master bus controller may receive intermediate representation 1112 and/or output language from logic component 1120, wherein output language may include one or more analog-to-digital conversions, low bit rate transmissions, message encryptions, digital signals, binary signals, logic signals, analog signals, and the like thereof described above in detail.

Still referring to FIG. 11, master bus controller may communicate with a slave bus. As used in this disclosure a "slave bus" is one or more peripheral devices and/or components that initiate a bus transfer. For example, and without limitation, slave bus may receive one or more controls and/or asymmetric communications from master bus controller, wherein slave bus transfers data stored to master bus controller. In an embodiment, and without limitation, slave bus may include one or more internal buses, such as but not limited to a/an internal data bus, memory bus, system bus, front-side bus, and the like thereof. In another embodiment, and without limitation, slave bus may include one or more external buses such as external flight controllers, external computers, remote devices, printers, aircraft computer systems, flight control systems, and the like thereof.

In an embodiment, and still referring to FIG. 11, control algorithm may optimize signal communication as a function of determining one or more discrete timings. For example, and without limitation master bus controller may synchronize timing of the segmented control algorithm by injecting high priority timing signals on a bus of the master bus control. As used in this disclosure a "high priority timing signal" is information denoting that the information is important. For example, and without limitation, high priority timing signal may denote that a section of control algorithm is of high priority and should be analyzed and/or transmitted prior to any other sections being analyzed and/or transmitted. In an embodiment, high priority timing signal may include one or more priority packets. As used in this disclosure a "priority packet" is a formatted unit of data that is communicated between the plurality of flight controllers. For example, and without limitation, priority packet may denote that a section of control algorithm should be used and/or is of greater priority than other sections.

Still referring to FIG. 11, flight controller 1104 may also be implemented using a "shared nothing" architecture in which data is cached at the worker, in an embodiment, this may enable scalability of aircraft and/or computing device. Flight controller 1104 may include a distributer flight controller. As used in this disclosure a "distributer flight controller" is a component that adjusts and/or controls a plurality of flight components as a function of a plurality of flight controllers. For example, distributer flight controller may include a flight controller that communicates with a plurality of additional flight controllers and/or clusters of flight controllers. In an embodiment, distributed flight control may include one or more neural networks. For example, neural network also known as an artificial neural network, is a network of "nodes," or data structures having one or more inputs, one or more outputs, and a function determining outputs based on inputs. Such nodes may be organized in a network, such as without limitation a convolutional neural network, including an input layer of nodes, one or more intermediate layers, and an output layer of nodes. Connections between nodes may be created via the process of "training" the network, in which elements from a training dataset are applied to the input nodes, a suitable training algorithm (such as Levenberg-Marquardt, conjugate gradient, simulated annealing, or other algorithms) is then used to adjust the connections and weights between nodes in adjacent layers of the neural network to produce the desired values at the output nodes. This process is sometimes referred to as deep learning.

Still referring to FIG. 11, a node may include, without limitation a plurality of inputs x/that may receive numerical values from inputs to a neural network containing the node and/or from other nodes. Node may perform a weighted sum of inputs using weights $w_i$ that are multiplied by respective inputs $x_i$. Additionally or alternatively, a bias b may be added to the weighted sum of the inputs such that an offset is added to each unit in the neural network layer that is independent of the input to the layer. The weighted sum may then be input into a function φ, which may generate one or more outputs y. Weight $w_i$ applied to an input $x_i$ may indicate whether the input is "excitatory," indicating that it has strong influence on the one or more outputs y, for instance by the corresponding weight having a large numerical value, and/or a "inhibitory," indicating it has a weak effect influence on the one more inputs y, for instance by the corresponding weight having a small numerical value. The values of weights $w_i$ may be determined by training a neural network using training data, which may be performed using any suitable process as described above. In an embodiment, and without limitation, a neural network may receive semantic units as inputs and output vectors representing such semantic units according to weights $w_i$ that are derived using machine-learning processes as described in this disclosure.

Still referring to FIG. 11, flight controller may include a sub-controller 1140. As used in this disclosure a "sub-controller" is a controller and/or component that is part of a distributed controller as described above; for instance, flight controller 1104 may be and/or include a distributed flight controller made up of one or more sub-controllers. For example, and without limitation, sub-controller 1140 may include any controllers and/or components thereof that are similar to distributed flight controller and/or flight controller as described above. Sub-controller 1140 may include any component of any flight controller as described above. Sub-controller 1140 may be implemented in any manner suitable for implementation of a flight controller as described above. As a further non-limiting example, sub-controller 1140 may include one or more processors, logic components and/or computing devices capable of receiving, processing, and/or transmitting data across the distributed flight controller as described above. As a further non-limiting example, sub-controller 1140 may include a controller that receives a signal from a first flight controller and/or first distributed flight controller component and transmits the signal to a plurality of additional sub-controllers and/or flight components.

Still referring to FIG. 11, flight controller may include a co-controller 1144. As used in this disclosure a "co-controller" is a controller and/or component that joins flight controller 1104 as components and/or nodes of a distributer flight controller as described above. For example, and without limitation, co-controller 1144 may include one or more controllers and/or components that are similar to flight controller 1104. As a further non-limiting example, co-controller 1144 may include any controller and/or component that joins flight controller 1104 to distributer flight controller. As a further non-limiting example, co-controller 1144 may include one or more processors, logic components and/or computing devices capable of receiving, processing, and/or transmitting data to and/or from flight controller 1104 to distributed flight control system. Co-controller 1144 may include any component of any flight controller as described above. Co-controller 1144 may be implemented in any manner suitable for implementation of a flight controller as described above.

In an embodiment, and with continued reference to FIG. 11, flight controller 1104 may be designed and/or configured to perform any method, method step, or sequence of method steps in any embodiment described in this disclosure, in any order and with any degree of repetition. For instance, flight controller 1104 may be configured to perform a single step or sequence repeatedly until a desired or commanded outcome is achieved; repetition of a step or a sequence of steps may be performed iteratively and/or recursively using outputs of previous repetitions as inputs to subsequent repetitions, aggregating inputs and/or outputs of repetitions to produce an aggregate result, reduction or decrement of one or more variables such as global variables, and/or division of a larger processing task into a set of iteratively addressed smaller processing tasks. Flight controller may perform any step or sequence of steps as described in this disclosure in parallel, such as simultaneously and/or substantially simultaneously performing a step two or more times using two or more parallel threads, processor cores, or the like; division of tasks between parallel threads and/or processes may be performed according to any protocol suitable for division of tasks between iterations. Persons skilled in the art, upon reviewing the entirety of this disclosure, will be aware of various ways in which steps, sequences of steps, processing tasks, and/or data may be subdivided, shared, or otherwise dealt with using iteration, recursion, and/or parallel processing.

Figure 12:
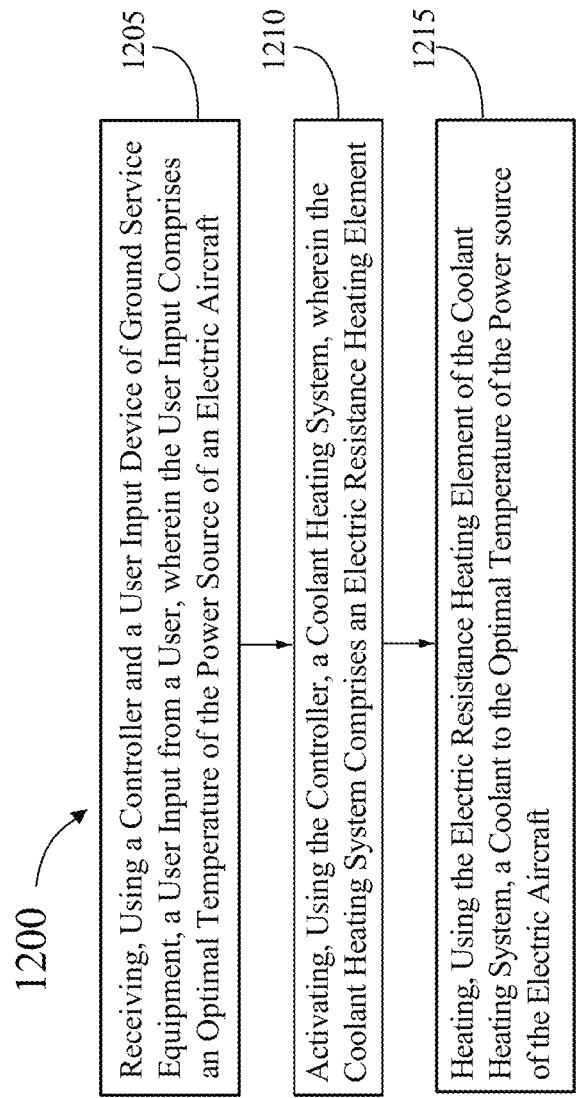
FIG. 12 is a flow diagram illustrating another exemplary method for controlling thermal energy of a coolant.

Referring now to FIG. 12, a flow diagram of an exemplary method 1200 for controlling thermal energy of a coolant is illustrated. The method 1200 includes a step 1205 of receiving, using a controller and a user input device of ground service equipment, a user input from a user, wherein the user input may include an optimal temperature of a power source of an electric aircraft. The method 1200 includes a step 1210 of activating, using the controller, a coolant heating system of the ground service equipment, wherein the coolant heating system may include an electric resistance heating element. The method 1200 includes a step 1215 of heating, using the coolant heating system, a coolant to the optimal temperature of the power source of the electric aircraft. In some embodiments, the ground service equipment may further include a coolant cooling system configured to remove thermal energy from the coolant. In some embodiments, the ground service equipment may further include a positive pressure pump, wherein the positive pressure pump may be configured to pump the coolant into the power source of the electric aircraft. In some embodiments, the ground service equipment may further include a negative pressure pump, wherein the negative pressure pump may be configured to pump the coolant out from the power source of the electric aircraft. In some embodiments, the ground service equipment may further include a deionizing filter, wherein the deionizing filter is in fluid communication with the coolant source. In some embodiments, the method 1200 may further include controlling, using the controller, a valve communicatively connected to the controller as a function of the user input from the user input device. In some embodiments, the method 1200 may further include opening, using the controller, the valve to allow a coolant flow as a function of the user input, and closing, using the controller, the valve to stop the coolant flow as a function of the user input. In some embodiments, the method 1200 may further include receiving, using the controller, the user input from the user, wherein the user input may include the optimal temperature of the coolant, and activating, using the controller, the coolant heating system to increase the thermal energy of the coolant to the optimal temperature. In some embodiments, the method 1200 may further include controlling, using the controller, the coolant heating system to increase the thermal energy of the coolant to a predetermined temperature. In some embodiments, the method 1200 may further include receiving, using the controller, the user input from the user, wherein the user input may include an optimal flow rate of the coolant, and activating, using the controller, the positive pressure pump to pump the coolant into the power source of the electric aircraft at the optimal flow rate. In some embodiments, the electric aircraft may further include at least a sensor, wherein the at least a sensor may include a temperature sensor. In some embodiments, the at least a sensor may further include a flow sensor. In some embodiments, the method 1200 may further include receiving, using the controller, a temperature of the coolant from the at least a sensor, wherein the at least a sensor may be communicatively connected to the coolant source of the ground service equipment. In some embodiments, the method 1200 may further include receiving, using the controller, a temperature of the power source of the electric aircraft from the at least a sensor, wherein the at least a sensor may be communicatively connected to the power source. In some embodiments, the method 1200 may further include controlling, using the controller, the coolant heating system as a function of the temperature of the power source and the predetermined temperature. In some embodiments, the ground service equipment and the electric aircraft may further include a display device communicatively connected to the controller, and the method 1200 may further include displaying, using the controller, the temperature of the power source on the display device, and the temperature of the coolant on the display device. In some embodiments, the method 1200 may further include displaying, using the controller, a heating status of the coolant on the display device. In some embodiments, the ground service equipment may further include a cable module configured to deliver the coolant from the ground service equipment to the electric aircraft. In some embodiments, the ground service equipment may further include a spent coolant reservoir. These may be implemented as disclosed with respect to FIGS. 1-11.

It is to be noted that any one or more of the aspects and embodiments described herein may be conveniently implemented using one or more machines (e.g., one or more computing devices that are utilized as a user computing device for an electronic document, one or more server devices, such as a document server, etc.) programmed according to the teachings of the present specification, as will be apparent to those of ordinary skill in the computer art. Appropriate software coding can readily be prepared by skilled programmers based on the teachings of the present disclosure, as will be apparent to those of ordinary skill in the software art. Aspects and implementations discussed above employing software and/or software modules may also include appropriate hardware for assisting in the implementation of the machine executable instructions of the software and/or software module.

Such software may be a computer program product that employs a machine-readable storage medium. A machine-readable storage medium may be any medium that is capable of storing and/or encoding a sequence of instructions for execution by a machine (e.g., a computing device) and that causes the machine to perform any one of the methodologies and/or embodiments described herein. Examples of a machine-readable storage medium include, but are not limited to, a magnetic disk, an optical disc (e.g., CD, CD-R, DVD, DVD-R, etc.), a magneto-optical disk, a read-only memory "ROM" device, a random access memory "RAM" device, a magnetic card, an optical card, a solid-state memory device, an EPROM, an EEPROM, and any combinations thereof. A machine-readable medium, as used herein, is intended to include a single medium as well as a collection of physically separate media, such as, for example, a collection of compact discs or one or more hard disk drives in combination with a computer memory. As used herein, a machine-readable storage medium does not include transitory forms of signal transmission.

Such software may also include information (e.g., data) carried as a data signal on a data carrier, such as a carrier wave. For example, machine-executable information may be included as a data-carrying signal embodied in a data carrier in which the signal encodes a sequence of instruction, or portion thereof, for execution by a machine (e.g., a computing device) and any related information (e.g., data structures and data) that causes the machine to perform any one of the methodologies and/or embodiments described herein.

Examples of a computing device include, but are not limited to, an electronic book reading device, a computer workstation, a terminal computer, a server computer, a handheld device (e.g., a tablet computer, a smartphone, etc.), a web appliance, a network router, a network switch, a network bridge, any machine capable of executing a sequence of instructions that specify an action to be taken by that machine, and any combinations thereof. In one example, a computing device may include and/or be included in a kiosk.

Figure 13:
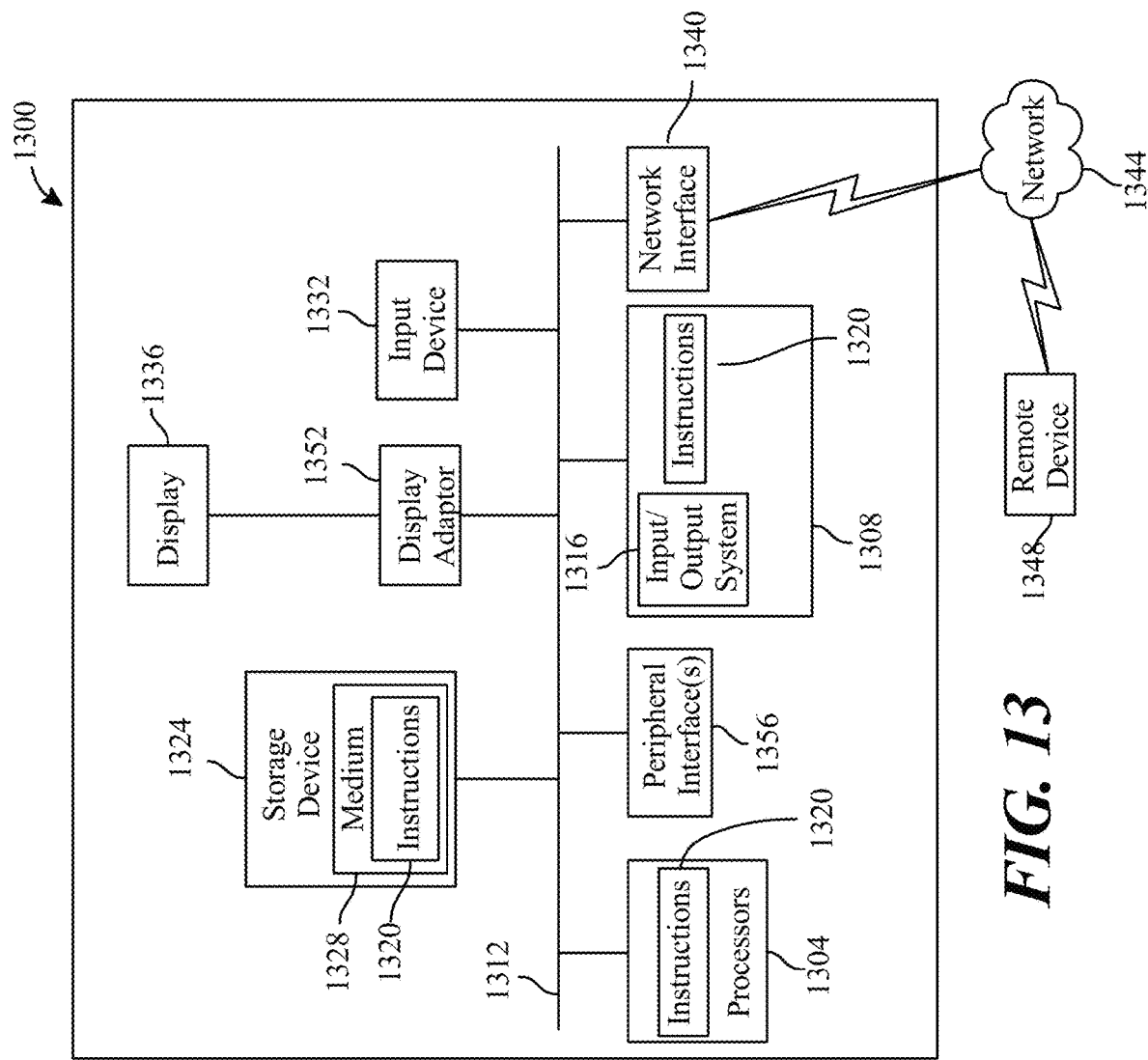
FIG. 13 is a block diagram of a computing system that can be used to implement any one or more of the methodologies disclosed herein and any one or more portions thereof.

FIG. 13 shows a diagrammatic representation of one embodiment of a computing device in the exemplary form of a computer system 1300 within which a set of instructions for causing a control system to perform any one or more of the aspects and/or methodologies of the present disclosure may be executed. It is also contemplated that multiple computing devices may be utilized to implement a specially configured set of instructions for causing one or more of the devices to perform any one or more of the aspects and/or methodologies of the present disclosure. Computer system 1300 includes a processor 1304 and a memory 1308 that communicate with each other, and with other components, via a bus 1312. Bus 1312 may include any of several types of bus structures including, but not limited to, a memory bus, a memory controller, a peripheral bus, a local bus, and any combinations thereof, using any of a variety of bus architectures.

Processor 1304 may include any suitable processor, such as without limitation a processor incorporating logical circuitry for performing arithmetic and logical operations, such as an arithmetic and logic unit (ALU), which may be regulated with a state machine and directed by operational inputs from memory and/or sensors; processor 1304 may be organized according to Von Neumann and/or Harvard architecture as a non-limiting example. Processor 1304 may include, incorporate, and/or be incorporated in, without limitation, a microcontroller, microprocessor, digital signal processor (DSP), Field Programmable Gate Array (FPGA), Complex Programmable Logic Device (CPLD), Graphical Processing Unit (GPU), general purpose GPU, Tensor Processing Unit (TPU), analog or mixed signal processor, Trusted Platform Module (TPM), a floating point unit (FPU), and/or system on a chip (SoC).

Memory 1308 may include various components (e.g., machine-readable media) including, but not limited to, a random-access memory component, a read only component, and any combinations thereof. In one example, a basic input/output system 1316 (BIOS), including basic routines that help to transfer information between elements within computer system 1300, such as during start-up, may be stored in memory 1308. Memory 1308 may also include (e.g., stored on one or more machine-readable media) instructions (e.g., software) 1320 embodying any one or more of the aspects and/or methodologies of the present disclosure. In another example, memory 1308 may further include any number of program modules including, but not limited to, an operating system, one or more application programs, other program modules, program data, and any combinations thereof.

Computer system 1300 may also include a storage device 1324. Examples of a storage device (e.g., storage device 1324) include, but are not limited to, a hard disk drive, a magnetic disk drive, an optical disc drive in combination with an optical medium, a solid-state memory device, and any combinations thereof. Storage device 1324 may be connected to bus 1312 by an appropriate interface (not shown). Example interfaces include, but are not limited to, SCSI, advanced technology attachment (ATA), serial ATA, universal serial bus (USB), IEEE 1394 (FIREWIRE), and any combinations thereof. In one example, storage device 1324 (or one or more components thereof) may be removably interfaced with computer system 1300 (e.g., via an external port connector (not shown)). Particularly, storage device 1324 and an associated machine-readable medium 1328 may provide nonvolatile and/or volatile storage of machine-readable instructions, data structures, program modules, and/or other data for computer system 1300. In one example, software 1320 may reside, completely or partially, within machine-readable medium 1328. In another example, software 1320 may reside, completely or partially, within processor 1304.

Computer system 1300 may also include an input device 1332. In one example, a user of computer system 1300 may enter commands and/or other information into computer system 1300 via input device 1332. Examples of an input device 1332 include, but are not limited to, an alpha-numeric input device (e.g., a keyboard), a pointing device, a joystick, a gamepad, an audio input device (e.g., a microphone, a voice response system, etc.), a cursor control device (e.g., a mouse), a touchpad, an optical scanner, a video capture device (e.g., a still camera, a video camera), a touchscreen, and any combinations thereof. Input device 1332 may be interfaced to bus 1312 via any of a variety of interfaces (not shown) including, but not limited to, a serial interface, a parallel interface, a game port, a USB interface, a FIREWIRE interface, a direct interface to bus 1312, and any combinations thereof. Input device 1332 may include a touch screen interface that may be a part of or separate from display 1336, discussed further below. Input device 1332 may be utilized as a user selection device for selecting one or more graphical representations in a graphical interface as described above.

A user may also input commands and/or other information to computer system 1300 via storage device 1324 (e.g., a removable disk drive, a flash drive, etc.) and/or network interface device 1340. A network interface device, such as network interface device 1340, may be utilized for connecting computer system 1300 to one or more of a variety of networks, such as network 1344, and one or more remote devices 1348 connected thereto. Examples of a network interface device include, but are not limited to, a network interface card (e.g., a mobile network interface card, a LAN card), a modem, and any combination thereof. Examples of a network include, but are not limited to, a wide area network (e.g., the Internet, an enterprise network), a local area network (e.g., a network associated with an office, a building, a campus or other relatively small geographic space), a telephone network, a data network associated with a telephone/voice provider (e.g., a mobile communications provider data and/or voice network), a direct connection between two computing devices, and any combinations thereof. A network, such as network 1344, may employ a wired and/or a wireless mode of communication. In general, any network topology may be used. Information (e.g., data, software 1320, etc.) may be communicated to and/or from computer system 1300 via network interface device 1340.

Computer system 1300 may further include a video display adapter 1352 for communicating a displayable image to a display device, such as display device 1336. Examples of a display device include, but are not limited to, a liquid crystal display (LCD), a cathode ray tube (CRT), a plasma display, a light emitting diode (LED) display, and any combinations thereof. Display adapter 1352 and display device 1336 may be utilized in combination with processor 1304 to provide graphical representations of aspects of the present disclosure. In addition to a display device, computer system 1300 may include one or more other peripheral output devices including, but not limited to, an audio speaker, a printer, and any combinations thereof. Such peripheral output devices may be connected to bus 1312 via a peripheral interface 1356. Examples of a peripheral interface include, but are not limited to, a serial port, a USB connection, a FIREWIRE connection, a parallel connection, and any combinations thereof.

The foregoing has been a detailed description of illustrative embodiments of the invention. Various modifications and additions can be made without departing from the spirit and scope of this invention. Features of each of the various embodiments described above may be combined with features of other described embodiments as appropriate in order to provide a multiplicity of feature combinations in associated new embodiments. Furthermore, while the foregoing describes a number of separate embodiments, what has been described herein is merely illustrative of the application of the principles of the present invention. Additionally, although particular methods herein may be illustrated and/or described as being performed in a specific order, the ordering is highly variable within ordinary skill to achieve methods and systems according to the present disclosure. Accordingly, this description is meant to be taken only by way of example, and not to otherwise limit the scope of this invention.

Exemplary embodiments have been disclosed above and illustrated in the accompanying drawings. It will be understood by those skilled in the art that various changes, omissions and additions may be made to that which is specifically disclosed herein without departing from the spirit and scope of the present invention.

What is claimed is:

1. A thermal management system comprising:
   ground service equipment, wherein the ground service equipment is configured to manage a temperature of a power source of an electric aircraft and comprises a coolant source, wherein the coolant source comprises a reservoir containing a coolant, and wherein the ground service equipment further comprises a spent coolant reservoir;
   a controller communicatively connected to the ground service equipment, wherein the controller is configured to:
      in response to a temperature of the coolant being higher than a predetermined temperature, activate a coolant cooling system configured to remove thermal energy of the coolant to the predetermined temperature, wherein the coolant cooling system includes one or more of a fan, a heat exchanger, a heat sink, or a chiller.

2. The system of claim 1, wherein in response to the temperature of the coolant being lower than the predetermined temperature, the controller activates a coolant heating system configured to increase thermal energy of the coolant to the predetermined temperature.

3. The system of claim 1, wherein the ground service equipment further comprises a positive pressure pump, wherein the positive pressure pump is configured to pump the coolant into the power source of the electric aircraft.

4. The system of claim 1, wherein the ground service equipment further comprises a negative pressure pump, wherein the negative pressure pump is configured to pump the coolant out from the power source of the electric aircraft.

5. The system of claim 1, wherein the ground service equipment further comprises a deionizing filter, wherein the deionizing filter is in fluidic communication with the coolant source.

6. The system of claim 1, wherein the controller is further configured to:
   receive a user input from a user, wherein the user input comprises the predetermined temperature of the coolant; and
   activate the coolant heating system to increase the thermal energy of the coolant to the predetermined temperature.

7. The system of claim 1, wherein the controller is further configured to:
   receive a user input from the user, wherein the user input comprises a predetermined flow rate of the coolant; and
   activate a positive pressure pump to pump the coolant into the power source of the electric aircraft at the predetermined flow rate.

8. The system of claim 1, wherein the system further comprises at least a sensor, wherein the at least a sensor comprises a temperature sensor.

9. The system of claim 8, wherein the at least a sensor further comprises a flow sensor.

10. The system of claim 8, wherein the at least a sensor is communicatively connected to the coolant source of the ground service equipment and configure to measure the temperature of the coolant.

11. The system of claim 8, wherein the at least a sensor is communicatively connected to the power source and configured to measure the temperature of the power source.

12. The system of claim 9, wherein the controller is further configured to control the coolant heating system as a function of the temperature of the power source and the predetermined temperature of the coolant.

13. The system of claim 8, wherein:
   the system further comprises a display device communicatively connected to the controller; and
   the controller is further configured to display:
      the temperature of the power source on the display device; and
      the temperature of the coolant on the display device.

14. The system of claim 13, wherein the controller is further configured to display a heating status of the coolant on the display device.

15. The system of claim 1, wherein the ground service equipment further comprises a cable module configured to deliver the coolant from the ground service equipment to the electric aircraft.

16. The system of claim 1, further including a pump communicatively connected to the controller and configured to apply a negative pressure to pull at least a portion of the coolant out of the battery system of the electric aircraft after a thermal management of the battery system is complete and prior to operation of the aircraft.

17. The system of claim 1, further including a pump communicatively connected to the controller and configured to apply a negative pressure to pull the coolant out of the power source of the electric aircraft for removing the coolant from the electric aircraft, wherein the removal occurs after the charging of the electric aircraft is completed.

18. The system of claim 1, further including a pump communicatively connected to the controller and configured to purge at least a portion of the coolant from the electric aircraft into the spent coolant reservoir.

19. A method for thermal energy management using ground service equipment configured to manage a temperature of a power source of an electric aircraft, the ground service equipment including a coolant source containing a coolant, the ground service equipment further including a spent coolant reservoir, wherein the method comprises:
   in response to a temperature of the coolant being higher than a predetermined temperature of the coolant, activating, using a controller communicatively connected to the ground service equipment, a coolant cooling system of the ground service equipment; and
   using the coolant cooling system, removing thermal energy of the coolant to the predetermined temperature of the coolant, wherein the coolant cooling system includes one or more of a fan, a heat exchanger, a heat sink, or a chiller.

* * * * *

UNITED STATES PATENT AND TRADEMARK OFFICE
CERTIFICATE OF CORRECTION

Page 1 of 1

PATENT NO. : 12,116,146 B2
APPLICATION NO. : 18/121788
DATED : October 15, 2024
INVENTOR(S) : John Charles Palombini and Jake Pill It is certified that error appears in the above-identified patent and that said Letters Patent is hereby corrected as shown below:

In the Claims

In Column 59, Claim 12, Line 35, delete "claim 9," and insert -- claim 2, --, therefor.

Signed and Sealed this
Thirty-first Day of December, 2024

Derrick Brent
*Acting Director of the United States Patent and Trademark Office*